(12) United States Patent
Buth

(10) Patent No.: US 9,477,539 B2
(45) Date of Patent: Oct. 25, 2016

(54) MULTI-APPLICATION WORKFLOW INTEGRATION

(71) Applicant: Steven L. Buth, Bellevue, WA (US)

(72) Inventor: Steven L. Buth, Bellevue, WA (US)

(73) Assignees: Steven L. Buth, Bellevue, WA (US); Diane Kristen Buth, Bellevue, WA (US)

( * ) Notice: Subject to any disclaimer, the term of this patent is extended or adjusted under 35 U.S.C. 154(b) by 0 days.

(21) Appl. No.: 15/056,834

(22) Filed: Feb. 29, 2016

(65) Prior Publication Data

US 2016/0179594 A1 Jun. 23, 2016

Related U.S. Application Data

(63) Continuation of application No. 13/962,813, filed on Aug. 8, 2013, now Pat. No. 9,286,146.

(60) Provisional application No. 61/681,500, filed on Aug. 9, 2012.

(51) Int. Cl.
*G06F 15/16* (2006.01)
*G06F 9/54* (2006.01)
*G06Q 10/10* (2012.01)

(52) U.S. Cl.
CPC .............. *G06F 9/546* (2013.01); *G06F 9/541* (2013.01); *G06Q 10/103* (2013.01)

(58) Field of Classification Search
CPC ............. H04L 12/582; H04L 12/5862; H04L 29/06326; H04L 65/4092; H04L 67/306
USPC ................................ 709/204, 222, 200, 217
See application file for complete search history.

(56) References Cited

U.S. PATENT DOCUMENTS

| | | |
|---|---|---|
| 7,996,373 B1 | 8/2011 | Zoppas et al. |
| 2004/0240624 A1 | 12/2004 | Shiibashi et al. |
| 2005/0131750 A1 | 6/2005 | Kogan et al. |
| 2005/0132048 A1 | 6/2005 | Kogan et al. |
| 2005/0198021 A1 | 9/2005 | Wilcox et al. |
| 2005/0228803 A1 | 10/2005 | Farmer et al. |
| 2006/0294051 A1 | 12/2006 | Kapadia et al. |
| 2006/0294578 A1 | 12/2006 | Burke et al. |
| 2007/0130152 A1 | 6/2007 | Kosov et al. |
| 2007/0157165 A1 | 7/2007 | Kim |
| 2008/0071844 A1 | 3/2008 | Gopal et al. |
| 2008/0155014 A1 | 6/2008 | Gaffga |

(Continued)

*Primary Examiner* — El Hadji Sall
(74) *Attorney, Agent, or Firm* — Seed IP Law Group PLLC

(57) ABSTRACT

Techniques are described for managing interactions between workflows being performed by different applications, such as to enable a combination of multiple workflows in multiple applications of different types to aggregate varying capabilities available from the different types of applications. In some situations, an integrated workflow is created by separating portions of its functionality into multiple constituent workflows that is each performed by a different application and that initiate one or more inter-workflow interactions between the constituent workflows as they are performed (e.g., for one of the constituent workflows to, while it is being performed, invoke another constituent workflow in order to begin its performance). As one non-limiting example, the multiple applications of different types may include a least an enterprise business application program that provides various core business functions, and a desktop collaborative application program that provides various user activity management capabilities.

20 Claims, 56 Drawing Sheets

(18 of 56 Drawing Sheet(s) Filed in Color)

(56) References Cited

U.S. PATENT DOCUMENTS

| | | | |
|---|---|---|---|
| 2008/0155561 A1 | 6/2008 | Gaffga | |
| 2009/0183063 A1 | 7/2009 | Malkin et al. | |
| 2010/0205616 A1 | 8/2010 | Lai et al. | |
| 2010/0223557 A1 | 9/2010 | Kenney et al. | |
| 2011/0320366 A1 | 12/2011 | Lalji et al. | |

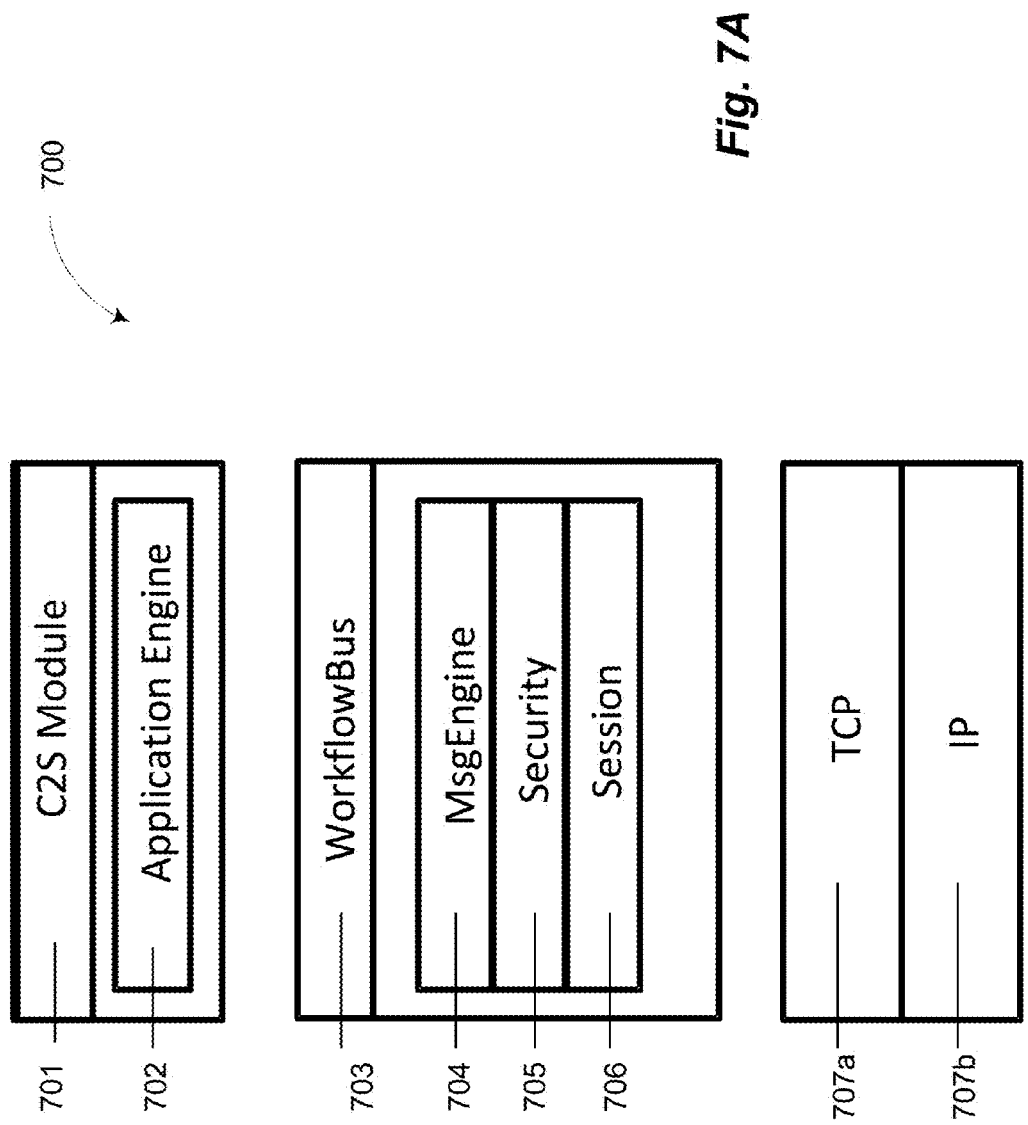

*Fig. 9A*

First set up a standard SharePoint Online site

Configuration Screen for C2S Custom Module in SharePoint

*Fig. 9D*

Site Settings Administration Page

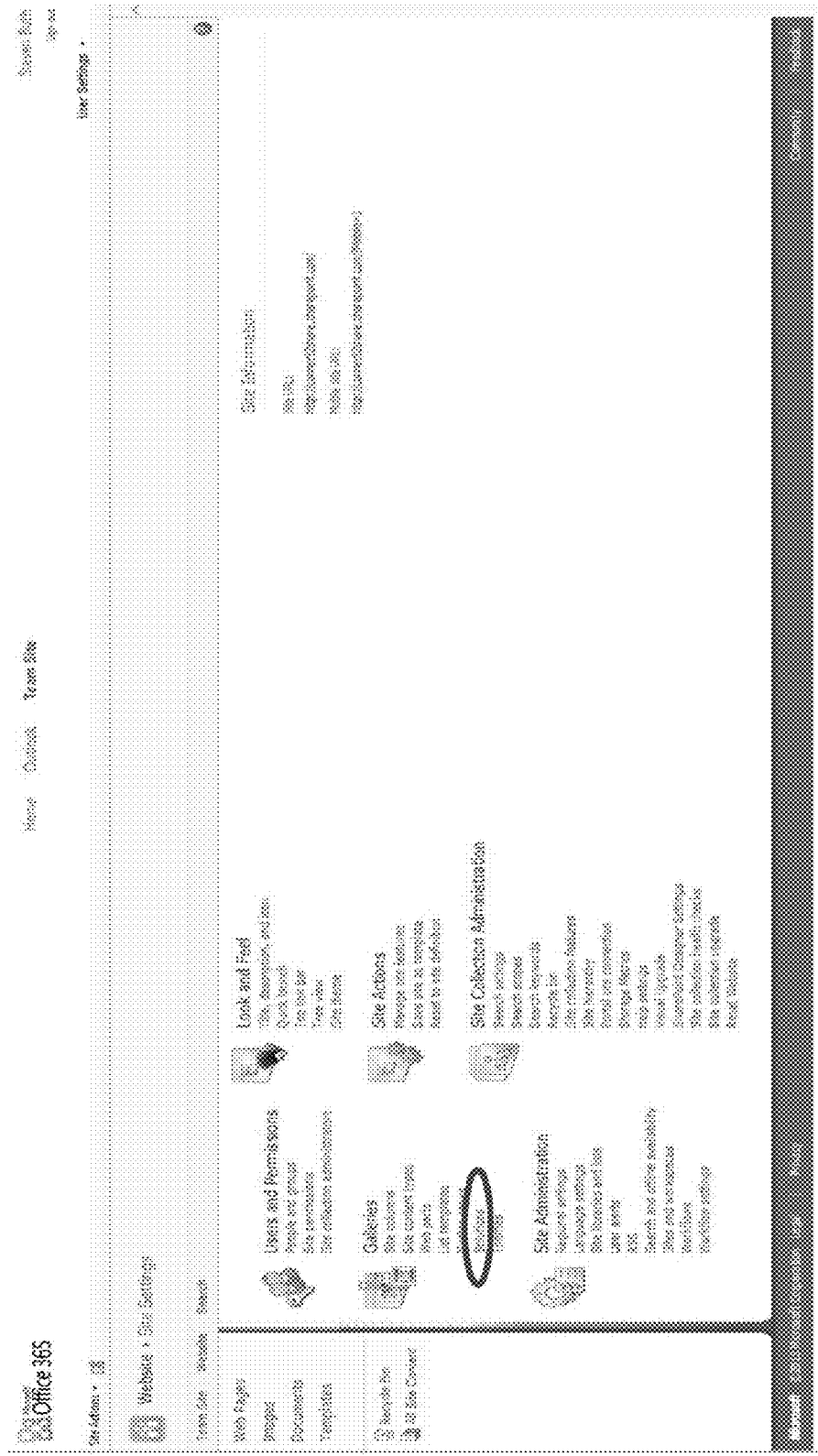

Fig. 9F

Connect2Share Custom Solution Installed at the Site Collection Level

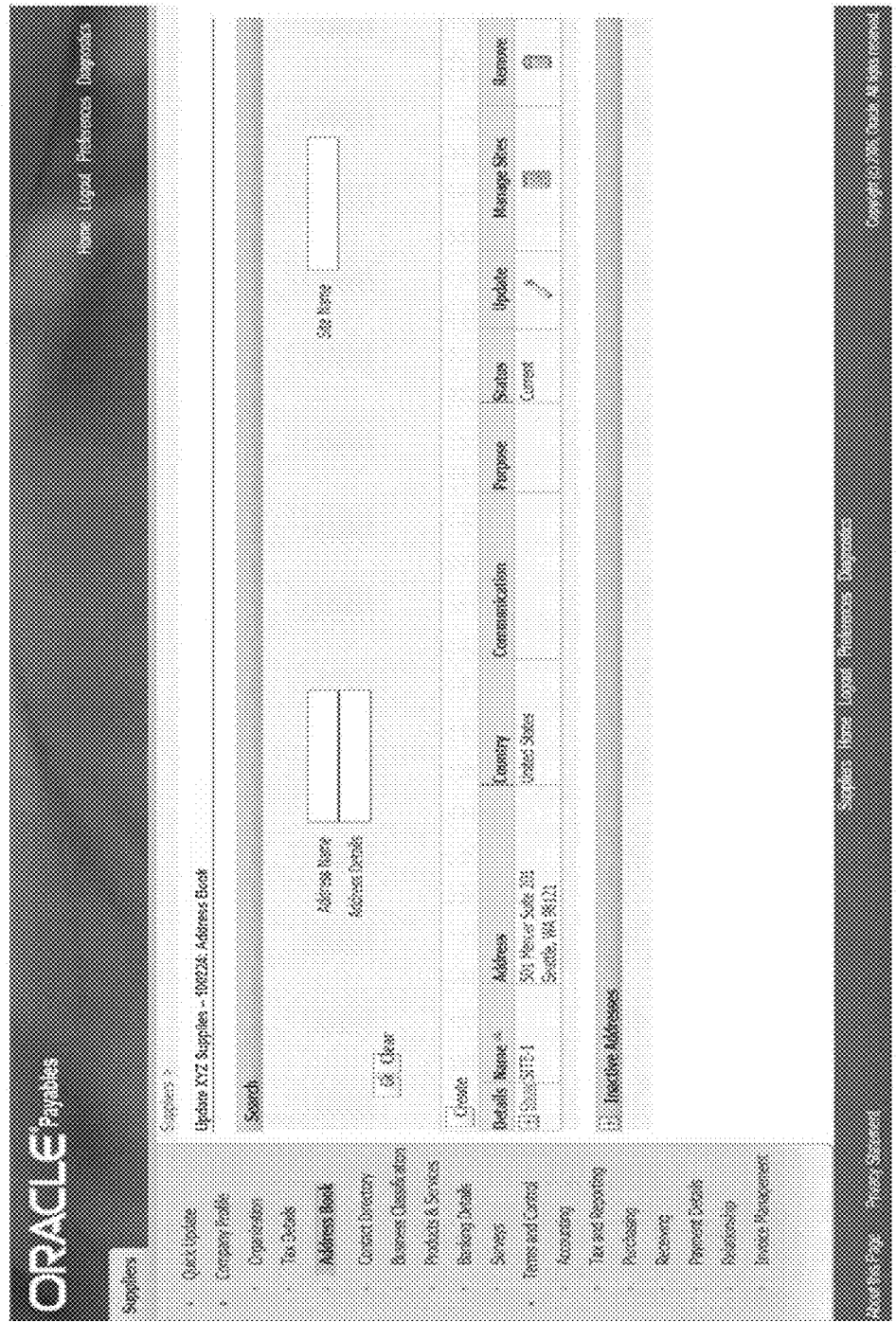

Selecting Supplier Approval Workflow in OES Client System 107 connected to OES System 114 SharePoint, C2S System 116 and EB System 118 Oracle Editing Vendor Request Workflow in OES Client System 107 connected to OES System 114 SharePoint, C2S System 116 and EB System 118 Oracle displaying C2S Custom module

MULTI-APPLICATION WORKFLOW INTEGRATION

CROSS REFERENCE TO RELATED APPLICATIONS

This application claims the benefit of U.S. Provisional Patent Application No. 61/681,500, filed Aug. 9, 2012 and entitled "Application Integration Techniques," which is hereby incorporated by reference in its entirety.

TECHNICAL FIELD

The following disclosure relates generally to techniques for managing interactions between workflows being performed by different applications, such as to integrate a workflow being performed by an enterprise business application program with a workflow being performed by a desktop collaborative application program.

BACKGROUND

There are various large enterprise business applications like Oracle, SAP, PeopleSoft, etc. that support transactions in core business functions such as financials, manufacturing, transportation, purchasing, human resources, etc. These systems may be scalable, and auditable, but typically lack flexibility and ease of use. Standard desktop applications such as Microsoft's Word, Excel, PowerPoint, SharePoint, etc. may in some situations have advantages in ease of use and flexibility, but may lack capabilities available in large enterprise business applications.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 7A-7D illustrate examples of a conceptual, logical and messaging architecture and corresponding examples for use in some embodiments.

DETAILED DESCRIPTION

Figure 1:
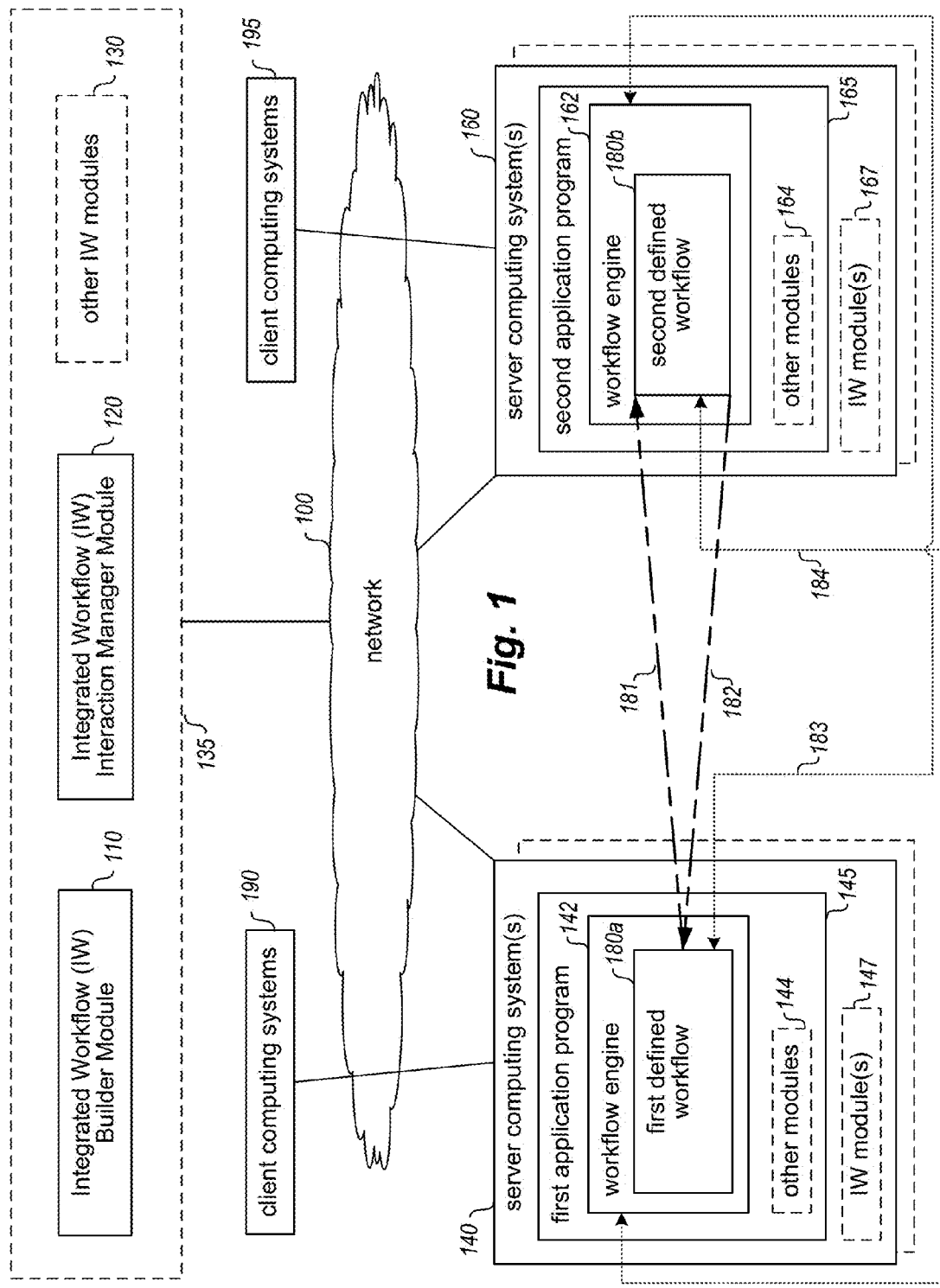
FIG. 1 is a network diagram illustrating an example embodiment of modules that perform automated operations to manage interactions between workflows being performed by different applications.

Techniques are described for managing interactions between workflows being performed by different applications, such as to enable a combination of multiple workflows in multiple applications of different types to aggregate varying capabilities available from the different types of applications. In some embodiments, an integrated workflow is created by separating portions of its functionality into multiple constituent workflows that is each performed by a different application and that initiate one or more inter-workflow interactions between the constituent workflows as they are performed (e.g., for one of the constituent workflows to, while it is being performed, invoke another constituent workflow in order to begin its performance). As one non-limiting example, the multiple applications of different types may include a least an enterprise business application program that provides various core business functions and includes a workflow engine to perform defined workflows within the enterprise business application program, and a desktop collaborative application program that provides various user activity management capabilities and includes a workflow engine to perform defined workflows within the desktop collaborative application program. Additional details related to managing interactions between workflows being performed by different applications are described below, and some or all of the described techniques are performed in at least some embodiments by automated operations of an Integrated Workflow ("IW") Inter-Connector system.

The IW Inter-Connector system may perform a variety of types of functionality in various embodiments as part of enabling interactions between workflows being performed by different applications. For example, in some embodiments, the IW Inter-Connector system may include one or more IW Builder modules that perform automated operations to create integrated workflows for users, such as to provide a GUI (graphical user interface) or other mechanism via which a user may specify a plurality of defined steps and types of capabilities for a particular integrated workflow, to separate the plurality of defined steps and types of capabilities into multiple subsets that each include at least one of the defined steps and one of the types of capabilities, and to create a distinct constituent workflow for each of the multiple subsets to be performed in a distinct application, with the various constituent workflows for the particular integrated workflow being configured to perform one or more inter-workflow interactions as they are performed. In addition, in some embodiments, the IW Inter-Connector system may include one or more IW Interaction Manager modules that manage inter-workflow interactions between multiple constituent workflows of an integrated workflow, such as to determine whether to authorize a particular inter-workflow interaction, to encrypt or otherwise secure information and/or communications sent between multiple constituent workflows as part of an inter-workflow interaction, to enable or prevent use of particular APIs (application programming interfaces) provided by particular applications that perform constituent workflows, etc. In at least some embodiments, the IW Inter-Connector system may further include one or more other types of modules to provide other types of functionality. Additional details related to functionality of embodiments of the IW Inter-Connector system are included below.

As one illustrative example, a first defined constituent workflow being performed in a first application program of a first type may perform various defined steps of the first workflow that use various capabilities of the first application program, including to send one or more electronic communications over one or more networks to a second application program of a second type. In some embodiments, one or more IW Interaction Manager modules may manage the sending of the electronic communication(s), such as to have a first IW Interaction Manager module copy associated with the first application program that receives, authorizes and encrypts the electronic communication(s) and forwards them over one or more networks to a second IW Interaction Manager module copy associated with the second application program that receives and decrypts the electronic communication(s) before providing them to the second application program. In response to receipt of the electronic communication(s), the second application program may initiate performance of a second defined constituent workflow in the second application program (with the first and second constituent workflows being part of the same integrated workflow), including to perform various defined steps of the second workflow that use various capabilities of the second application program. Upon completion, the second defined workflow may provide a response to the first defined workflow via one or more response electronic communications over the one or more networks to the first application program, optionally via one or more IW Interaction Manager module copies in a manner similar to the initial electronic communications, such as to include response information that is gathered or otherwise generated by the performance of the second defined workflow (e.g., based on retrieval of stored data, based on information obtained from one or more users of the second application program via electronic interactions with them, etc.). In response to receipt of the response electronic communications, the first application program may initiate further performance of the first defined workflow in the first application program, such as to perform additional defined steps of the first defined workflow that depend on or otherwise use the response from the second defined workflow. In this manner, performance of the integrated workflow that includes the first and second constituent workflows may provide access to the aggregate capabilities of two or more application programs of two or more types, so as to provide corresponding benefits to end users. For example, if the first application program is an enterprise business application program and the second application program is a collaborative application program, the aggregate performance of two or more defined workflows in those application programs may include using core business function capabilities of the enterprise business application program and using messaging capabilities of the collaborative application program, as well as using different capabilities of the application programs with respect to access to data and/or users.

Core business function capabilities of an enterprise business application program may include, for example, functionality for one or more of the following non-exclusive list: financials; manufacturing; transportation; logistics; purchasing; human resources; project portfolio management; merchandise management; price management; invoice matching; allocations; store operations management; warehouse management; demand forecasting; assortment planning; category management; etc., such as part of enterprise resource planning software, customer relationship management software, business intelligence software, content management software and/or supply chain management software, and including using corresponding database management system (DBMS) functionality. Non-exclusive examples of enterprise business application programs include Oracle Applications, SAP Enterprise Resource Planning, PeopleSoft software for human resource management systems, financial management solutions, supply chain management, customer relationship management, and enterprise performance management software, etc.

User activity management capabilities of a desktop collaborative application program may include, for example, document management capabilities and capabilities to manage other types of information, as well as using messaging capabilities of the program to perform activities such as managing emails and other types of electronic messages, managing calendar items, managing task items, etc. A non-exclusive example of a desktop collaborative application program includes Microsoft's SharePoint application program.

For illustrative purposes, some embodiments are described below in which specific types of inter-workflow interactions are managed in specific ways, including for one constituent workflow of an integrated workflow to invoke or otherwise initiate the beginning of the performance of another constituent workflow of the integrated workflow, to send electronic communications between applications performing constituent workflows of an integrated workflow in specific manners, etc. However, it will be understood that inter-workflow interactions may occur in other manners, that other types of inter-workflow interactions may occur, and that the described techniques may be used in a wide variety of other situations, and that the invention is thus not limited to the exemplary details provided.

FIG. 1 is a network diagram that illustrates an example of Integrated Workflow (IW) modules 110, 120, and 130 that perform automated operations for managing interactions between workflows being performed by different applications. In the illustrated embodiment, the modules 110, 120, and 130 may be integrated together into a single IW Inter-Connector program 135 that executes on one or more configured computing systems (not shown), but in other embodiments may have other forms (e.g., being separate programs operated by separate entities, etc.). In addition, in some embodiments one or more of the IW modules 110, 120, and 130 may execute in manners in which they are integrated with or otherwise associated with one or more particular application programs, such as if a copy of the module 120 executes as one of the optional IW modules 147 on server computing systems 140 and/or as one of the optional IW modules 167 executing on server computing systems 160.

In the illustrated embodiment, one or more server computing systems 140 execute a first application program 145 of a first type, and may have various users (not shown) who use client computing systems 190 to interact with and obtain functionality from the first application program (e.g., over one or more intermediate networks 100). In the illustrated example, the first application program provides various types of capabilities, and includes a workflow engine 142 that may perform defined workflows within the first application program, as well as one or more other optional modules 144 to provide other types of capabilities specific to the first application program. In a similar manner, one or more server computing systems 160 may execute a second application program 165 of a second type, with one or more users (not shown) using client computing systems 195 to interact with the second application program to obtain corresponding functionality (e.g., over one or more intervening networks 100). In the illustrated example, the second application program similarly includes a workflow engine 162, as well as other optional modules 164 that provide other types of capabilities specific to the second application program. In some embodiments, the server computing systems may also optionally execute one or more IW modules 147, and the server computing systems 160 may optionally execute one or more IW modules 167, such as to support interactions between the first and second application programs as described herein.

To manage interactions between workflows executing in the first and second application programs of the example embodiment of FIG. 1, one or more users (not shown) may first interact with an IW Builder Module 110 to create a new integrated workflow that has constituent workflows within the first and second application programs. In particular, a particular integrated workflow may be created that includes a constituent first defined workflow 180*a* that is designed to execute within the workflow engine 142 of the first application program in order to use capabilities provided by the first application program (e.g., to access information available via the first application program, to interact with users of the first application program, to interact with one or more of the optional other modules 144 of the first application program, etc.), and may similarly create a constituent second defined workflow 180*b* that is designed to execute within the workflow engine 162 of the second application program 165 in order to use capabilities of the second application program (e.g., to access information accessible to the second application program, to interact with users of the second application program, to interact with optional other modules 164 of the second application program to obtain their available functionality, etc.). In some embodiments and situations, the module 110 may store various information about the new integrated workflow being created outside of the first and second application programs, while in other embodiments the new integrated workflow that is created may be embodied by the constituent first and second defined workflows.

In addition, as part of creating the new integrated workflow, the module 110 may configure one or both of the first and second defined workflows to perform inter-workflow interactions at specified times or in specified situations. For example, in the example embodiment illustrated in FIG. 1, the first defined workflow 180*a* is designed to perform one or more defined steps of the first defined workflow, and during the performance of the first defined workflow, to initiate an electronic interaction 181 that causes the second defined workflow 180*b* to be invoked in the second application program, so as to begin performance and to provide one or more types of indicated pieces of response information or other indicated types of responses. While the electronic interaction 181 is logically shown as progressing directly from the defined workflow 180*a* to the workflow engine 162 of the second application program, it will be appreciated that the actual electronic communications involved in such an interaction may occur over one or more intervening networks 100, and in some embodiments may include interactions with the IW modules 147 and/or the IW modules 167. In particular, in some embodiments the electronic interaction 181 that is initiated by the first defined workflow includes passing a message or other electronic communication to an optional IW module 147 that is a copy of the IW Interaction Manager module executing on the server computing systems 140, and that IW module 147 sends one or more electronic communications to an IW module 167 executing on server computing systems 160 that is another copy of the IW Interaction Manager module, with such electronic communications passing over the one or more networks 100. The IW module 167 receives the one or more messages from the IW module 147, and performs subsequent interactions with the second application program to cause the performance of the second defined workflow 180*b* to be initiated. As discussed in greater detail elsewhere, the one or more copies of the IW Interaction Manager module may perform a variety of additional automated operations to facilitate such inter-workflow interactions, such as to determine whether the request by the first defined workflow 180*a* corresponding to electronic interaction 181 is authorized to be performed, to provide security for the electronic interaction 181 in various ways (e.g., by encrypting communications that occur between the IW module 147 and IW module 167 in manners proprietary to those modules), etc.

After the second defined workflow 180*b* is invoked by the electronic interaction 181, the workflow engine 162 of the second application program 165 performs the second defined workflow, and as part of its performance causes one or more electronic interactions 182 that include returning results of the performance of the second defined workflow or other response information that was requested. In a manner similar to electronic interaction 181, electronic interaction 182 is logically shown as passing directly from the second defined workflow to the workflow engine 142 of the first application program, but in at least some embodiments and situations may include one or more response electronic communication set over the one or more networks 100, including in some embodiments to use one or both of the IW modules 167 and 147 to manage the response information being returned (e.g., to encrypt the communications, to determine authorization to provide the response information, etc.). It will be appreciated that the first defined workflow 180*a* may continue to perform other parts of the defined steps of the first defined workflow while the second defined workflow is invoked and is being performed, depending on the configuration of the first defined workflow. In addition, the results or other response information returned in the electronic interaction 182 may be used in various manners by the first defined workflow, including by one or more additional defined steps of the first defined workflow that are performed after the results or other response information is received by the first defined workflow.

In addition, in some embodiments and situations, the first defined workflow and/or the second defined workflow may perform additional inter-workflow interactions at various times or in various manners. As one example, after the second defined workflow is invoked via electronic interaction 181 and is being performed, the second defined workflow may perform one or more additional electronic interactions 184 with the workflow engine 142 of the first application program (or with one or more other third application programs and/or third workflow engines, not shown), such as to invoke a third defined workflow (not shown) to be performed by the workflow engine 142 of the first application program, to retrieve information accessible to the first application program or to one or more users of the first application program, etc., and the results of such one or more electronic interactions 184 may further be used by the second defined workflow as part of its further performance. In a similar manner, whether in addition to or instead of such one or more electronic interactions 184 initiated by the second defined workflow, the first defined workflow may further perform one or more other electronic interactions 183 with the workflow engine 162 of the second application program (or with one or more other third application programs and/or third workflow engines, not shown, whether before, during, or after the electronic interactions 181 and 182—such electronic interactions 183 may similarly cause invocation of a fourth defined workflow (not shown) by the workflow engine 162 of the second application program, or may otherwise request and obtain access to information available from the second application program or from users of the second application program. As with the electronic interactions 181 and 182, the electronic interactions 183 and/or 184 may be managed by one or both of the IW modules 147 and 167 in a manner similar to that discussed with respect to electronic interactions 181 and 182. It will further be appreciated that in situations in which multiple interactions back and forth between two defined workflows are allowed, additional precautions may be taken to prevent infinite loops or other situations in which performance of an invoked defined workflow is not completed within a specified amount of time, such as based on timeouts, monitoring and preventing circular invocations, etc.

While the server computing systems 140 and 160 are illustrated as being executed as distinct computing systems separated by one or more networks, and the users of the respective first application program and the second application program are using distinct client computing systems 190 and 195, respectively, it will be appreciated that in some embodiments and situations other types of configurations are possible. As one example, at least some users of the first application program may also be users of the second application program, such that at least some of the client computing systems 190 and 195 may be the same. In addition, In some embodiments and situations, the first and second application programs may execute on one or more computing systems that are configured to operate together, such that the electronic interactions that occur between the first application program and second application program may be performed in manners other than crossing one or more intervening networks 100, such as via in-memory communications on a single configured server computer system. In addition, in some embodiments and situations, at least some users of the computing systems 140 and/or 160 may interact directly with those computing systems to use the application programs 145 and 165, respectively, rather than using separate client computing systems that are separated from the computing systems 140 and/or 160 via one or more networks.

Figure 2:
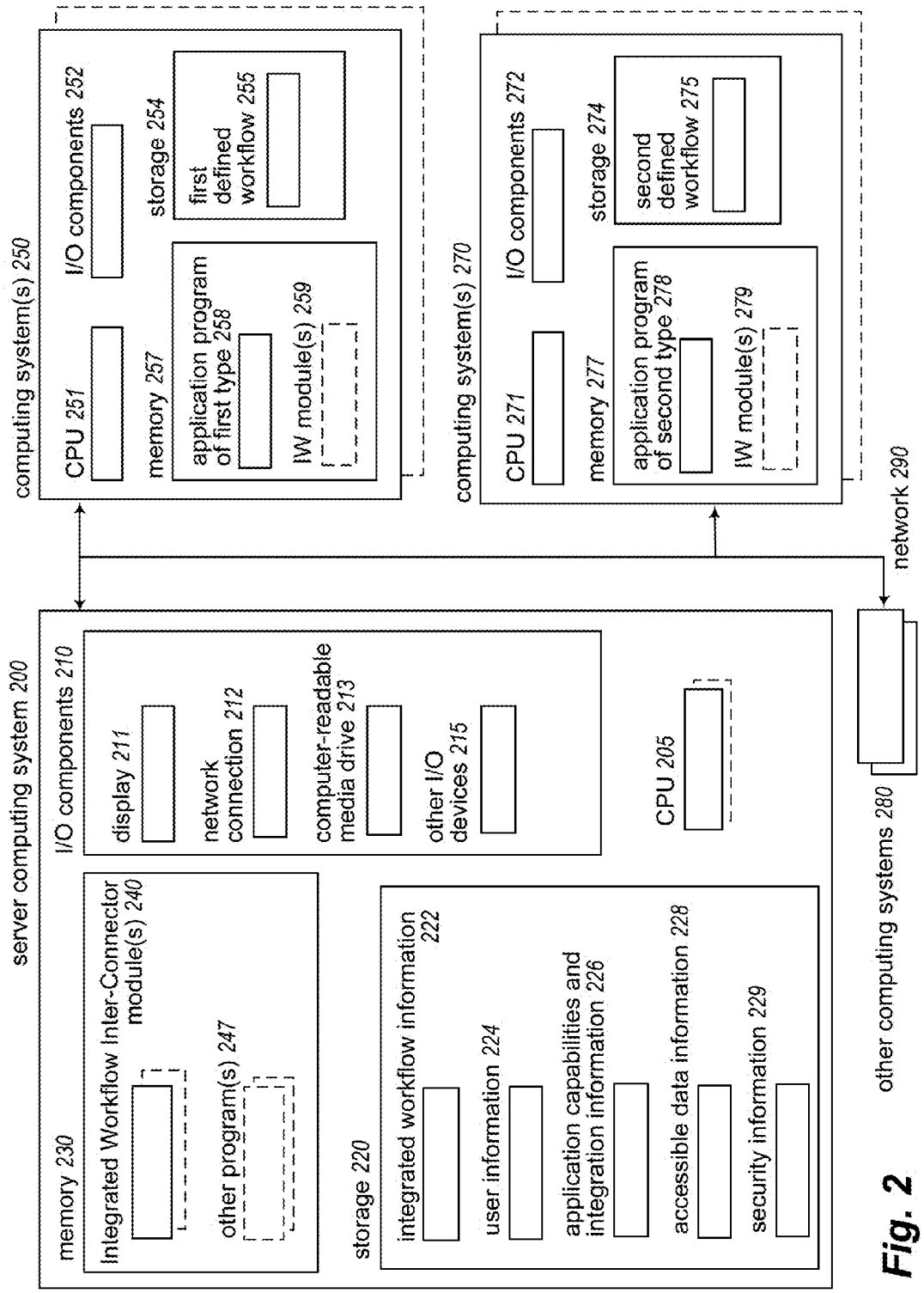
FIG. 2 is a block diagram illustrating computing systems suitable for executing embodiments of a described system for managing interactions between workflows being performed by different applications.

The one or more networks 100 may, for example, be a publicly accessible network of linked networks, possibly operated by various distinct parties, such as the Internet. In other embodiments, the one or more networks 100 may have other forms, such as a private network that is, for example, a corporate or university network that is wholly or partially inaccessible to non-privileged users. In still other embodiments, the network 100 may include one or more private networks with access to and/or from the Internet. In the illustrated embodiment, the modules 110, 120, 130, 147, 167, 144, and 164 may each include software instructions that execute on one or more computing systems in order to program or otherwise configure those computing systems to perform automated operations corresponding to some or all of the techniques described herein. Similarly, the programs 145 and 165 and their workflow engines 142 and 162, respectively, may each include software instructions that execute on one or more computing system to program or otherwise configure those computing systems to perform automated operations corresponding to some or all of the techniques described herein. In addition, in some embodiments the IW modules 147 and/or IW modules 167 may not be present on the server computing systems 140 and/or 160, such as if the modules 110, 120, and 130 execute on one or more additional configured computing systems that are not illustrated in FIG. 1. While not illustrated with respect to FIG. 1, the computing systems 140, 160, 190, 195 and any computing systems executing the IW Inter-Connector program 135 may each include various hardware components, including one or more hardware CPUs or other hardware processors, hardware volatile memory, hardware non-volatile storage, etc. FIG. 2 and its associated textual description provide one example of additional detail related to hardware resources of computing systems that may be used to perform some or all of the techniques described herein.

FIG. 2 is a block diagram illustrating an embodiment of a server computing system 200 that is suitable for performing at least some of the described techniques, such as by executing embodiments of one or more Integrated Workflow (IW) Inter-Connector system modules 240 that perform automated operations to manage interactions between workflows being performed by different applications. The example server computing system 200 includes one or more central processing unit ("CPU") hardware processors 205, various input/output ("I/O") hardware components 210, storage 220, and memory 230, although in other embodiments multiple such server computing systems may operate together to execute the system modules 240 in a distributed manner. Illustrated I/O components in this example embodiment include a display 211, a network connection 212, a computer-readable media drive 213, and other I/O devices 215 (e.g., keyboards, mice or other pointing devices, microphones, speakers, etc.).

Other computing systems 250 are similarly illustrated as each having one or more CPU hardware processors 251, one or more I/O hardware components 252, memory 257, and storage 254, and other computing systems 270 are similarly illustrated as each having one or more CPU hardware processors 271, one or more I/O hardware components 272, memory 277, and storage 274, although particular I/O components are not illustrated for computing systems 250 and 270. The other computing systems 280 may similarly include some or all of the same types of components as the server computing system 200, but such components are not illustrated in this example for the sake of brevity.

In the illustrated embodiment, the IW Inter-Connector system modules 240 include at least some of the modules of an embodiment of an IW Inter-Connector system, and are executing in memory 230 of server computing system 200. The IW Inter-Connector system modules 240 may include, for example, one or more IW Builder modules that perform automated operations to create integrated workflows for users, one or more IW Interaction Manager modules that manage inter-workflow interactions between multiple constituent workflows of an integrated workflow, and optionally one or more other types of IW Inter-Connector system modules to provide other types of functionality. The server computing system 200 and the IW Inter-Connector system modules 240 may also communicate with such other computing devices and systems in various manners, including via one or more networks 290 (e.g., the Internet, one or more cellular telephone networks, etc.). In some embodiments, at least some of the IW Inter-Connector system modules may execute on one or more other computing systems, such as if the optional IW modules 259 executing on computing system(s) 250 and/or the optional IW modules 279 executing on computing system(s) 270 each include a copy of an IW Interaction Manager module that is integrated with or otherwise associated with the first and second application programs 258 and 278, respectively. In addition, the server computing system may further execute one or more optional other programs 247 in memory 230, such as one or more applications of one or more types that perform constituent workflows, or instead one or more applications of other types. The system modules 240, 259 and 279 and application programs 247, 258 and 278 may in some embodiments each include software instructions that, when executed, program or otherwise configure respective hardware processors (e.g., processor(s) 205, 251 and 271) and respective computing systems (e.g., computing systems 200, 250 and 270) to perform automated operations that implement at least some of the described techniques.

As part of performing their automated operations, the IW Inter-Connector system modules may access and use various types of data. For example, if one or more users interact with an IW Builder module (e.g., by using one of the other computing systems 280 to interact with one of the modules 240 over the network 290) to create an integrated workflow, the IW Builder module 240 may store corresponding information 222 on storage 220 about the integrated workflow, such as to indicate its constituent workflows, access rights associated with performing the integrated workflow or particular operations of the integrated workflow, etc. In addition, a particular integrated workflow may include multiple constituent workflows that are stored on other computing systems, such as a first constituent workflow 255 that is stored on storage 254 for performance by a first application program 258 of a first type that is executing in memory 257 of one or more computing systems 250, and a second constituent workflow 275 that is stored on storage 274 for performance by a second application program 278 of a second type that is executing in memory 277 of one or more computing systems 270.

In addition, one or more IW Interaction Manager modules may use various types of information when determining whether to authorize particular inter-workflow interactions and when performing secure communications between multiple constituent workflows of an integrated workflow, such as user information 224 about one or more users who initiate performance of the integrated workflow and/or who participate in interactions with one or more constituent workflows of the integrated workflow, information 226 about capabilities of applications (e.g., of application programs 258 and 278) that perform constituent workflows and about how to integrate IW modules with the applications (e.g., particular APIs or other integration mechanisms provided by the applications), information 228 about documents and other data accessible via the applications and their constituent workflows being performed (e.g., associated access rights), security information 229 about encryption keys or other data for managing secure communications between constituent workflows and the applications that perform them, etc. While information 222, 224, 226, 228 and 229 is illustrated in this embodiment as being stored on storage 200, some or all such information may be stored in other locations in other embodiments (e.g., on storage 254 of computing system(s) 250, on storage 274 of computing system(s) 270, on other computing systems 280, etc.).

The application programs 258 and 278 may similarly access and use various types of information during their execution, including information about the first defined workflow 255 and the second defined workflow 275 to respectively be performed. The workflows 255 and 275 and application programs 258 and 278 may additionally access and use various other data, such as data accessible on storage 254, storage 274 and/or other storage on other systems, although such other accessible data and information is not illustrated in this example embodiment. In addition, such application programs 258 and 278 and their workflows 255 and 275 may similarly interact with various users during their execution, such as users who interact directly with computing systems 250 and 270 (e.g., if the computing systems 250 and/or 270 are desktop computers or other personal computing systems) or instead use remote computing systems (e.g., other computing systems 280) to interact with the application programs 258 and 278 over the network 290, although particular such users are not illustrated in this example.

It will be appreciated that the illustrated computing systems are merely illustrative and are not intended to limit the scope of the present invention. For example, computing system 200 may be connected to other devices that are not illustrated, including through one or more networks such as the Internet or via the Web. More generally, a "client" or "server" computing system or device may comprise any combination of hardware that can interact and perform the described types of functionality, such as when programmed or otherwise configured with software, including without limitation desktop computers, laptop computers, slate computers, tablet computers or other computers, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), and various other consumer products that include appropriate intercommunication capabilities. For example, the illustrated system modules 240, 259 and 279 and the programs 258 and 278 may include executable software instructions and/or data structures in at least some embodiments, which when loaded on and/or executed by particular computing systems or devices may be used to program or otherwise configure those systems or devices, such as to configure hardware processors and/or hardware memory of those systems or devices. Alternatively, in other embodiments, some or all of the software modules and/or systems may execute in memory on another device and communicate with the illustrated computing system/device via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity. In addition, the functionality provided by the illustrated system modules may in some embodiments be combined in fewer modules or distributed in additional modules. Similarly, in some embodiments the functionality of some of the illustrated modules may not be provided and/or other additional functionality may be available.

Thus, in at least some embodiments, the illustrated modules and/or systems are software-based modules/systems having software instructions that, when executed by the CPU(s) 205, CPU(s) 251, CPU(s) 271 and/or other processor means, program the processor(s) to automatically perform the described operations for that module/system. Furthermore, in some embodiments, some or all of the modules and/or systems may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, modules or data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

A particular constituent or integrated workflow may be invoked or otherwise initiated in various manners in various embodiments and situations. As one example, a user may initiate performance of a particular integrated workflow, such as by performing one or more interactions with an application program to initiate performance of one of the constituent workflows of the integrated workflow. As another example, a constituent or integrated workflow may be automatically initiated, such as if a user or other entity has previously defined alarm criteria or other defined threshold criteria for the user, and an application program that performs a constituent workflow determines that the defined criteria are satisfied and initiates performance of that constituent workflow on behalf of that user. In addition, in some embodiments and situations, an IW Inter-Connector system module may automatically determine to initiate performance of an integrated workflow or of one or more of its constituent workflows, such as to reflect a previously scheduled performance, based on satisfaction of one or more defined criteria for the integrated workflow or the one or more constituent workflows, etc.—if so, the IW Inter-Connector system module may perform interactions with one or more application programs to initiate performance of one or more constituent workflows of the integrated workflow.

As previously noted, one or more IW Interaction Manager modules may perform automated operations in at least some embodiments and situations to determine whether to authorize a particular inter-workflow interaction, such as between multiple constituent workflows of an integrated workflow. Such authorization determinations may be performed in various manners in various embodiments, such as by using one or more of the following types of data: access rights defined for the integrated workflow (e.g., by a creator of the integrated workflow); access rights defined for one or both of the constituent workflows that are interacting (e.g., by a creator of the integrated workflow); attributes or other access rights specific to information being sent or requested; an identity and/or location (e.g., geographical location, network location, etc.) of the constituent workflow that is the initiator of the inter-workflow interaction; an identity and/or location (e.g., geographical location, network location, etc.) of the constituent workflow that is the recipient of the inter-workflow interaction; an identity and access rights of a user that initiated performance of the constituent workflow initiating the inter-workflow interaction and/or that initiated performance of a defined step of the constituent workflow that causes initiation of the inter-workflow interaction; an identity and access rights of one or more users from which a response is requested for the inter-workflow interaction; etc.

A constituent workflow being performed by an application program may perform various activities to make use of the capabilities of the application program in various manners, including to interact with users of the application program in various manners. A non-exclusive list of types of activities that a constituent workflow being performed in an application program may perform includes the following: retrieving stored documents or other stored data that is accessible to the application program, and providing the retrieved data to another constituent workflow (e.g., as part of a response to another constituent workflow that invoked the constituent workflow being performed); interacting with one or more users of the constituent workflow to obtain an approval or other type of information, and providing the obtained information to another constituent workflow (e.g., as part of a response to another constituent workflow that invoked the constituent workflow being performed); using messaging capabilities of the application program to send one or more emails or other electronic messages to one or more users; using messaging capabilities of the application program to modify one or more calendar items for one or more users of the application program; using messaging capabilities of the application program to modify one or more task items for one or more users of the application program; etc. Accordingly, a workflow being performed in an application program may perform a variety of types of interactions with users of the application program and/or other users. More generally, a workflow may include a sequence or other arrangement of a plurality of inter-connected defined steps, in which performance of some of the defined steps depends on performance of other of the defined steps.

As previously noted, a workflow being performed may in some embodiments and situations invoke another workflow in order to initiate its performance, and more generally one or more defined steps of a first workflow may perform interactions with one or more other defined steps of a second workflow. More generally, multiple workflows may perform a variety of types of inter-workflow interactions, such as for a first workflow to initiate performance of multiple other workflows, for a second workflow initiated by a first workflow to itself initiate performance of one or more third workflows and/or to initiate performance of a different copy of the first workflow, etc. In addition, interactions between workflows may occur in various manners, such as via electronic communications sent between corresponding application programs over one or more networks, by invoking APIs provided by such application programs, etc., including in at least some situations for such interactions to occur via one or more copies of an IW Interaction Manager module.

Figure 3:
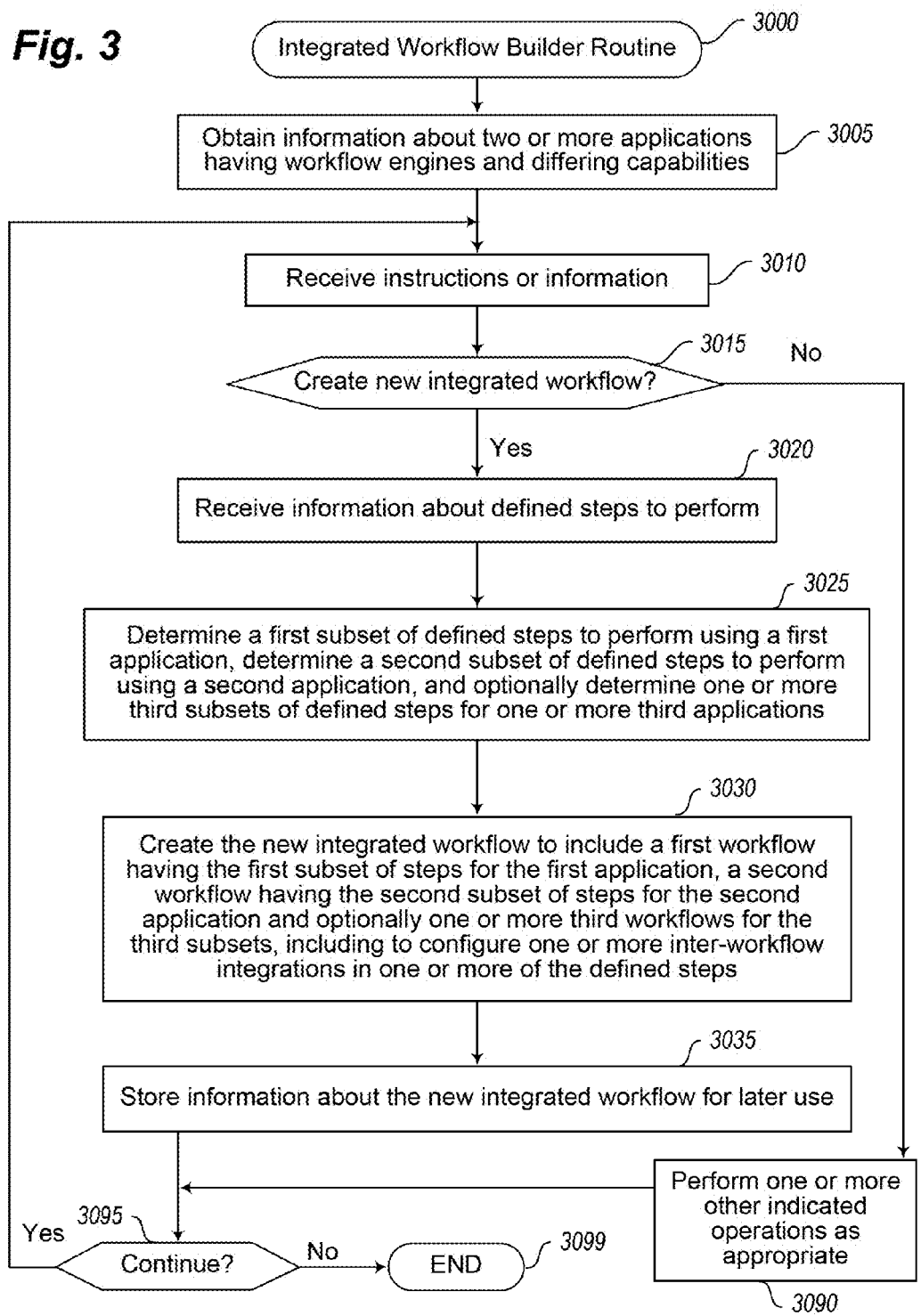
FIG. 3 is an example flow diagram of an illustrated embodiment of an Integrated Workflow Builder routine.

FIG. 3 is a flow diagram of an example embodiment of an Integrated Workflow Builder routine 3000. The routine may be provided by, for example, execution of module 110 of FIG. 1 and/or a module 240 of FIG. 2, such as to participate in creating integrated workflows that include different constituent workflows to be performed in different applications in order to use different capabilities of those applications.

In the illustrated embodiment, the routine begins at block 3005, where information is obtained about two or more applications that have workflow engines and have differing capabilities, such as different functionality provided by the applications and/or access to different pieces of information and/or users. As discussed in greater detail elsewhere, in at least some embodiments, the two or more applications may be of different types, such as, for example, an enterprise business application program and a collaborative application program.

After block 3005, the routine continues to block 3010, where it receives information or instructions. In block 3015, the routine then determines whether instructions have been received to create a new integrated workflow, such as from a user of a corresponding IW module or from a user of one of the two or more applications with which the routine 3000 is integrated or otherwise associated. If so, the routine continues to block 3020 to receive information about multiple defined steps to be performed. It will be appreciated that information about such defined steps may be specified by one or more users in various manners, such as via a graphical user interface (GUI), a programmatic API (application programming interface), etc., and that various interdependencies between particular steps or other ordering of the performance of particular steps may be specified. In some embodiments and situations, the one or more users may specify one or more types of capabilities of the two or more applications, and the routine 3000 may generate one or more corresponding steps to access such specified capabilities.

After block 3020, the routine determines in block 3025 how to perform the various defined steps of the new integrated workflow using the various capabilities of the two or more applications, such as by determining a first subset of the defined steps to be performed using a first application, determining a second subset of the defined steps to be performed using a second application, and optionally determining one or more third subsets of additional defined steps (if any) to perform using one or more third applications. In some embodiments and situations, the determinations of block 3025 are performed in whole or in part by the user(s) who specify the steps, such as the user(s) indicate particular steps to be performed by particular applications. The routine in block 3025 further determines one or more types of interactions to be performed between the first, second, and any third applications as part of performing the new integrated workflow being created, such as to specify inter-workflow integrations to be performed in one or more of the defined steps.

After block 3025, the routine continues to block 3030 to create the new integrated workflow by creating multiple constituent workflows within the first, second and third applications that in their aggregate constitute the new integrated workflow. It will be appreciated that in some embodiments and situations, only two applications and two subsets of defined steps may be determined and used, such that the new integrated workflow consists of two defined constituent workflows for execution by the first and second applications, respectively. In particular, in block 3030, the routine creates a first defined workflow in a first application corresponding to the first determined subset of steps, creates a second defined workflow corresponding to the second determined subset of steps for the second application, and optionally creates one or more third defined workflows corresponding to any determined third subsets of defined steps for performance by the one or more third applications. In addition, the one or more inter-workflow integrations between the defined constituent workflows are configured, such as by having a particular defined step in the first workflow that, when performed by the first application, will initiate a request to invoke performance of the second defined workflow in the second application, as discussed in greater detail elsewhere. After block 3030, information about the new integrated workflow is stored for later use, and in some situations it is made available to the one or more users for immediate performance. It will be appreciated that the creation of the two or more constituent workflows in block 3030 may include performing multiple interactions via the first, second and third applications to create the respective constituent workflows in those applications, such as via APIs provided by the first, second and third applications for such purposes, or instead in other manners (e.g., by creating a data file that defines a particular constituent workflow in a format accessible to a particular application, and then supplying the file to that application for use in specifying the constituent workflow to that application).

If it is instead determined in block 3015 that the instructions or information received in block 3010 are not to create a new integrated workflow, the routine continues instead to block 3090 to perform one or more other indicated operations as appropriate. For example, such other indicated operations may include performing modifications to previously created integrated workflows, receiving additional information about applications and/or capabilities that are available for use by the routine in creating additional integrated workflows, receiving and handling response information from particular applications with respect to previous interactions to create constituent workflows or to perform other types of interactions with those applications, etc. In addition, it will be appreciated that in some embodiments the routine 3000 may further perform various automated operations to determine whether one or more users that are creating or modifying an integrated workflow have authorization to perform such activities, and if so may perform particular blocks of the routine only in situations in which such authorization operations have been determined to be satisfied.

After blocks 3035 or 3090, the routine continues to block 3095 to determine whether to continue, such as until an explicit indication to terminate is received. If it is determined to continue, the routine returns to block 3010, and otherwise continues to block 3099 and ends.

Figure 4:
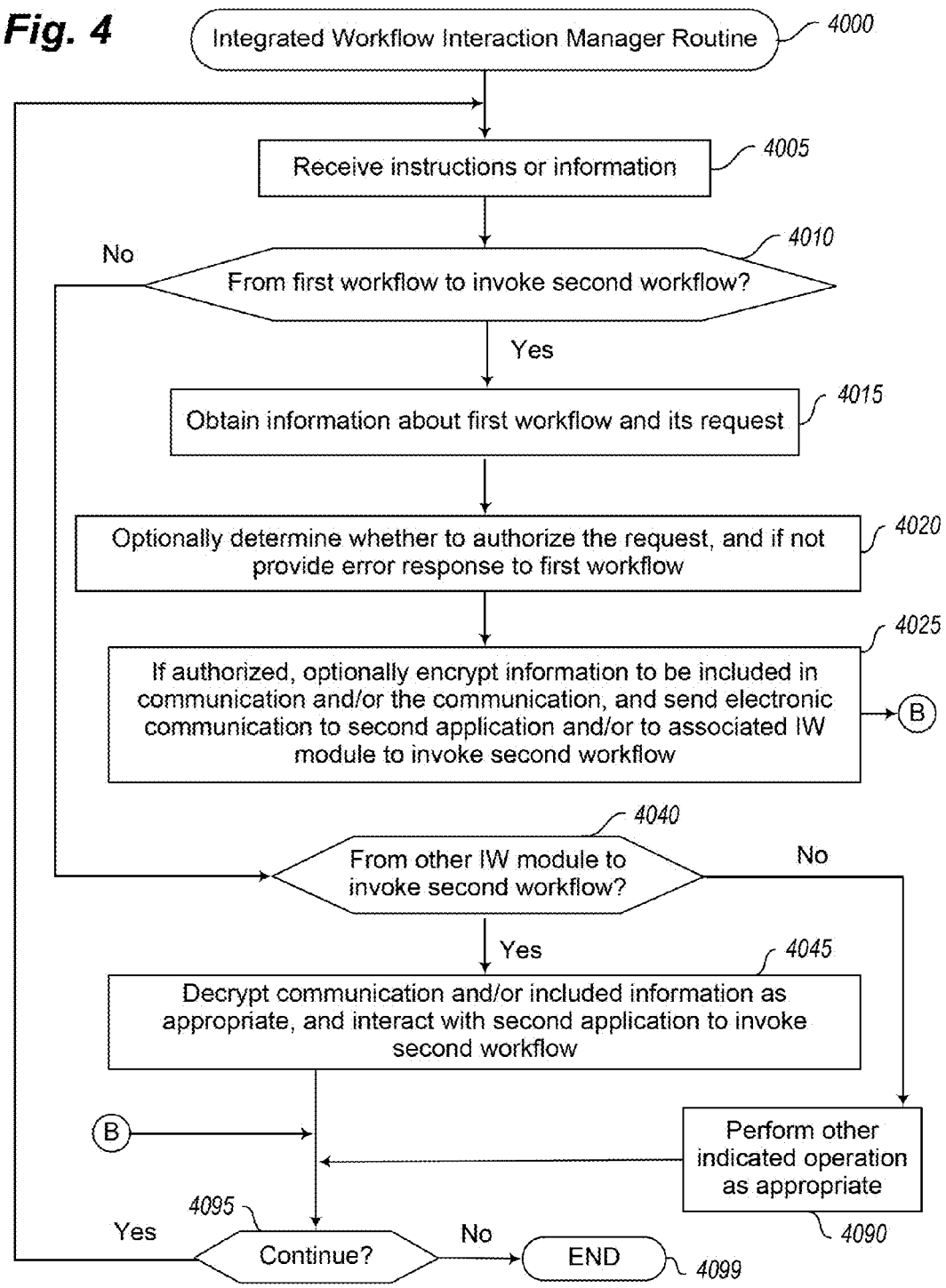
FIG. 4 is an example flow diagram of an illustrated embodiment of an Integrated Workflow Interaction Manager routine.

FIG. 4 is a flow diagram of an example embodiment of an Integrated Workflow Interaction Manager routine 4000. The routine may be provided by, for example, execution of module 120 of FIG. 1 and/or a module 240 of FIG. 2, such as to support interactions between constituent workflows to enable performance of an overall integrated workflow to which those constituent workflows belong.

In some embodiments and situations, the routine 4000 may have a copy that executes in an integrated manner for each application that is supported, such that a first application that invokes the performance of a second workflow may have a first copy of the routine 4000 associated with that first application (e.g., executing on the same computing system as the first application, and optionally in an integrated manner with the first application), and that first copy of the routine 4000 may interact with a second copy of the routine 4000 that is integrated with or otherwise associated with the second application on one or more second computer systems separated from the first application by one or more intervening networks (e.g., with the second copy of the routine 4000 executing on the same one or more second computer systems as the second application, optionally in an integrated manner with the second application). In such embodiments and situations in which multiple copies of the routine 4000 may execute and interact with each other, additional security provisions may be provided for inter-workflow interactions, such as by enabling the first workflow to interact with the second workflow only if the routine 4000 determines that such interactions are authorized, by using particular APIs and/or other manners of interacting with particular applications to facilitate protecting sensitive information, by encrypting or otherwise protecting communications or other information sent between multiple copies of the routine 4000 in a proprietary manner that is not accessible to other modules, etc.

In the illustrated embodiment, the routine begins at block 4005, where instructions or information are received. The routine then continues to block 4010 to determine whether instructions have been received from a first workflow being performed by a first application, with the instructions indicating a request or other instructions to initiate performance of a second workflow in a second application, such as by a copy of the routine 4000 that is integrated with or otherwise associated with the first application. If so, the routine continues to block 4015 to obtain information about the first workflow and its request—as discussed in greater detail elsewhere, such information may include an identifier for the first defined workflow and/or for the first application, information about a user of the first application that initiated performance of the first workflow, information about one or more particular pieces of information or other types of responses requested by the first workflow from the second workflow, information about a network location and/or geographical location of the first workflow and first application, etc.

In block 4020, the routine then optionally determines whether to authorize the request to initiate the performance of the second workflow, such as based on the obtained information and one or more defined authorization rules or authorization criteria associated with one or more of the first workflow, first application, one or more users of the first application that initiated performance of the first workflow, one or more pieces of requested information or other type of requested response, the second workflow, the second application, etc. If an authorization determination is performed in block 4020 but authorization is not determined to be provided, the routine may provide an error response to the first workflow and then proceed to block 4095, or may otherwise prevent the performance of the second workflow from being initiated (e.g., by not performing block 4025 and not performing an error notification to the first workflow, by taking one or more other actions to prevent the second workflow from being performed, etc.). After block 4020, the routine in block 4025 proceeds to, if authorization was obtained in block 4020 or if an authorization determination was not performed, to send one or more electronic communications to initiate performance of the second workflow by the second application. As discussed in greater detail elsewhere, such one or more electronic communications may in some situations be sent directly to the second application, while in other situations may be sent to another copy of the routine 4000 that is being executed by another Integrated Workflow Interaction Manager module integrated with or otherwise associated with the second application. In addition, in some embodiments and situations, the routine may encrypt or otherwise protect information included in the one or more electronic communications (e.g., documents, data objects, data in data fields or parameters, etc.) and/or may encrypt the one or more electronic communications themselves before they are sent to provide additional security, as discussed in greater detail elsewhere.

If it is instead determined in block 4010 that the instructions or information received in block 4005 are not from a first workflow to invoke the performance of a second workflow in a second application, the routine continues instead to block 4040 to determine whether instructions or information has been received from another copy of the routine 4000. For example, if the current copy of the routine 4000 is being performed by an Integrated Workflow Interaction Manager module that is integrated with or otherwise associated with a second application, the instructions or information received in block 4005 may include one or more electronic communications sent by another copy of the routine 4000 (e.g., in block 4025 of that other routine copy). If it is determined in block 4040 that instructions or other information have been received from another copy of the Integrated Workflow Interaction Manager module, the routine continues to block 4045 to handle those instructions or information. In particular, if one or more electronic communications are received, the communications and their included information are decrypted if appropriate, and if such electronic communications correspond to invoking the performance of a second workflow in a second application, the routine further in block 4045 performs one or more interactions with the second application to invoke the beginning of the performance of the second defined workflow. While not illustrated in the current embodiment, in other embodiments, the routine 4000 may further perform authorization determination activities with respect to block 4045, such as to verify that a request to invoke the second workflow is authorized before performing such an invocation.

If it is instead determined in block 4040 that the instructions or information received in block 4005 are not from another IW module to invoke performance of a second workflow, the routine continues instead to block 4090 to perform one or more other indicated operations as appropriate. For example, such other indicated operations may include, after a second workflow in a second application has been invoked by a first workflow in a first application, obtaining one or more response electronic communications that include the results from the performance of the second workflow or otherwise include response information sent by the performance of the second workflow to the first workflow, and may perform similar activities for such response electronic communications to those described with respect to blocks 4015-4025 and/or 4045. In addition, in some embodiments, the routine 4000 may receive information in block 4005 from an executing copy of an Integrated Workflow Builder module, such as to provide configuration information for the routine 4000 to identify particular types of interactions between particular constituent workflows that have been configured and/or that are authorized.

After blocks 4025, 4045, or 4090, the routine continues to block 4095 to determine whether to continue, such as until an explicit indication to terminate is received. If it is determined to continue, the routine returns to block 4005, and otherwise continues to block 4099 and ends.

Figure 5:
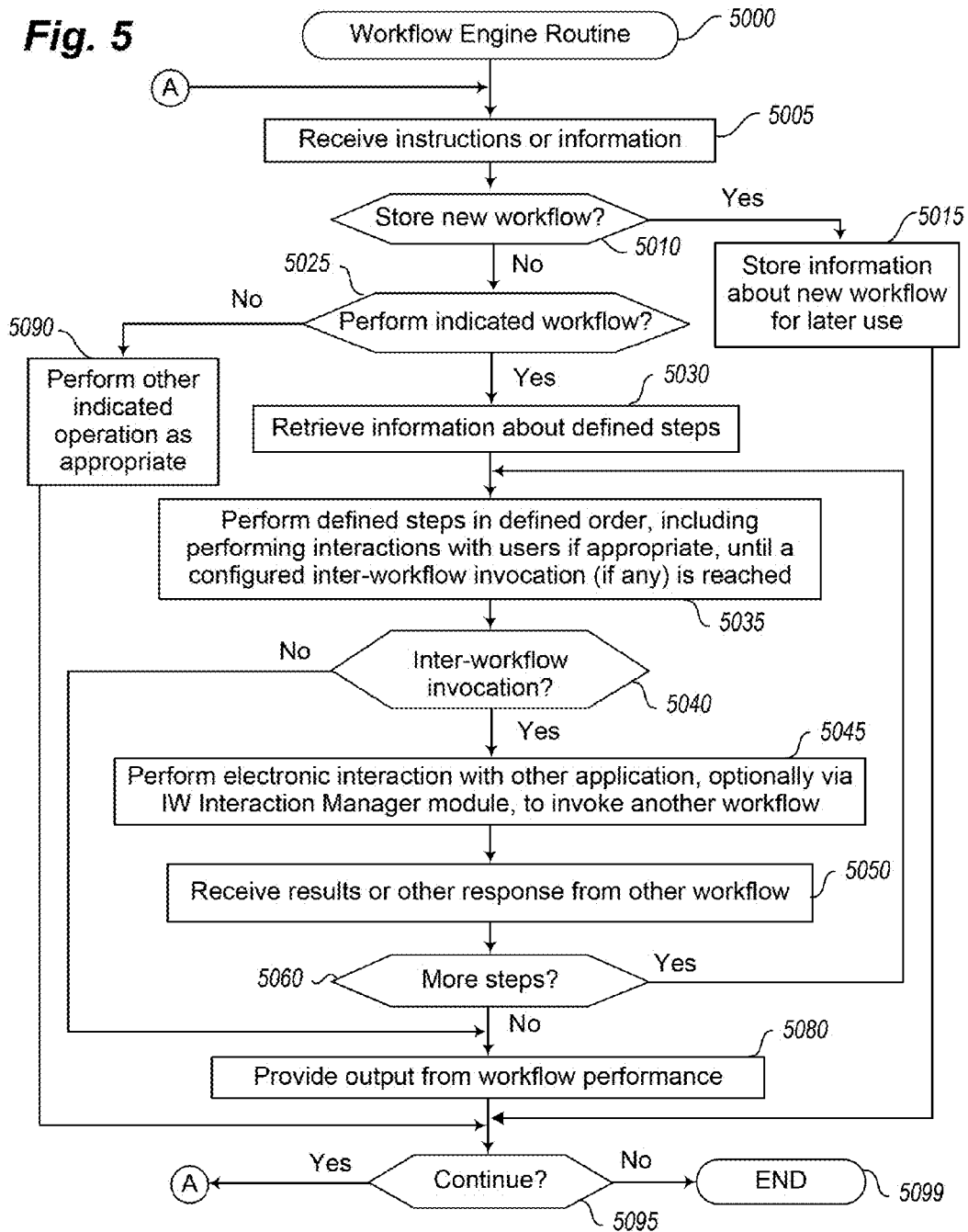
FIG. 5 is an example flow diagram of an illustrated embodiment of a Workflow Engine routine.
Figure 6A:
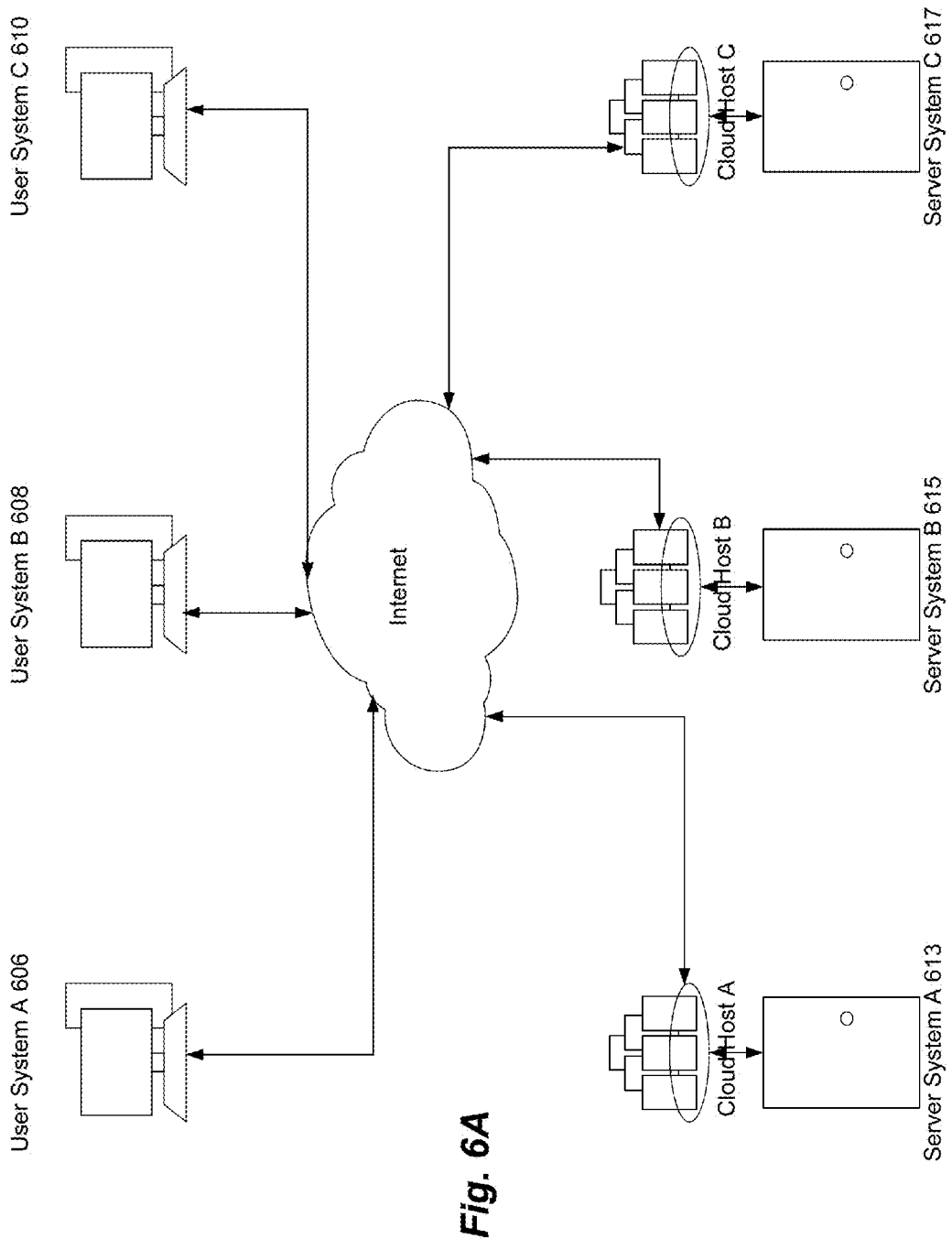
FIGS. 6A-6I are network diagrams illustrating examples of hardware configurations and environments in which embodiments may be used.
Figure 6B:
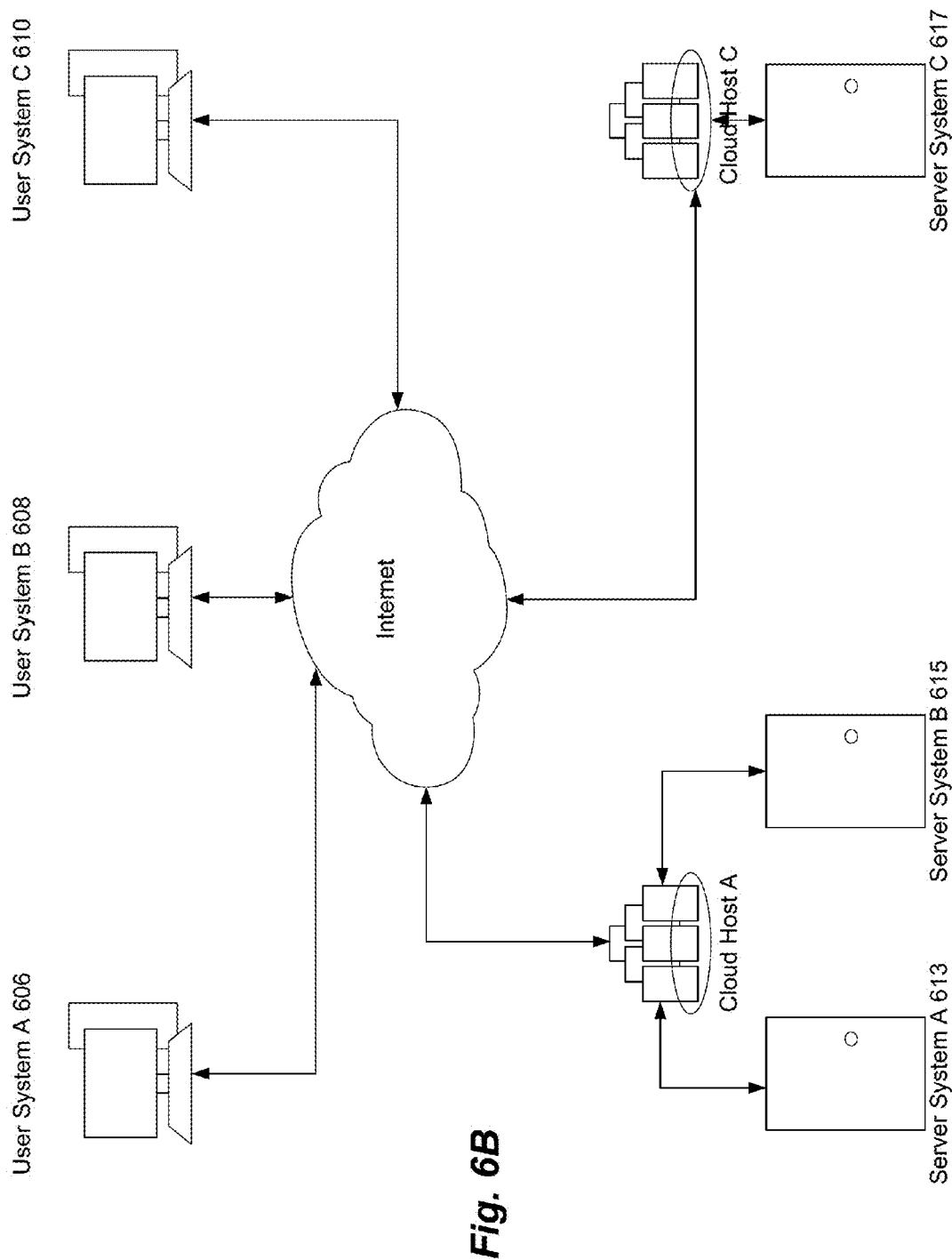
Figure 6C:
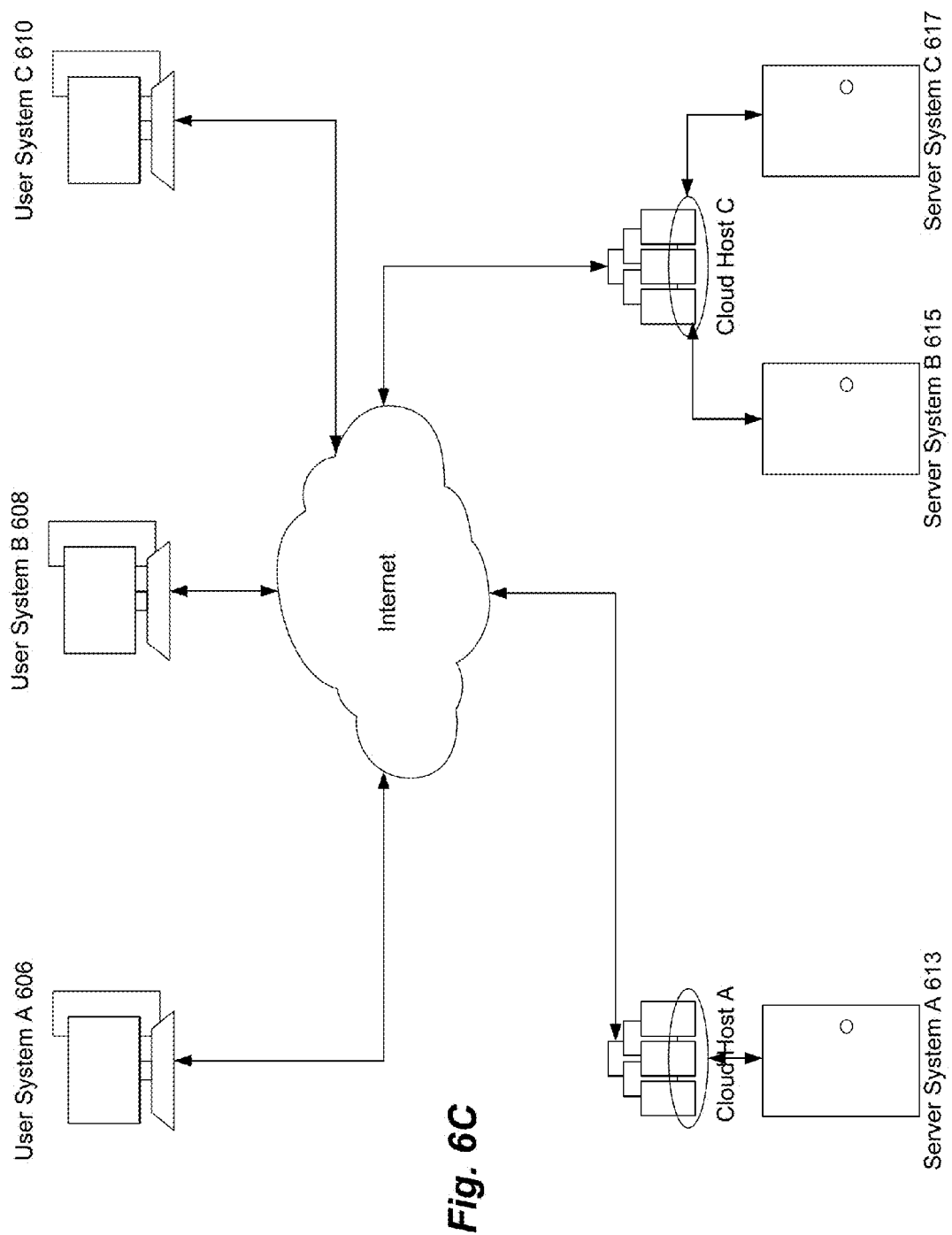
Figure 6D:
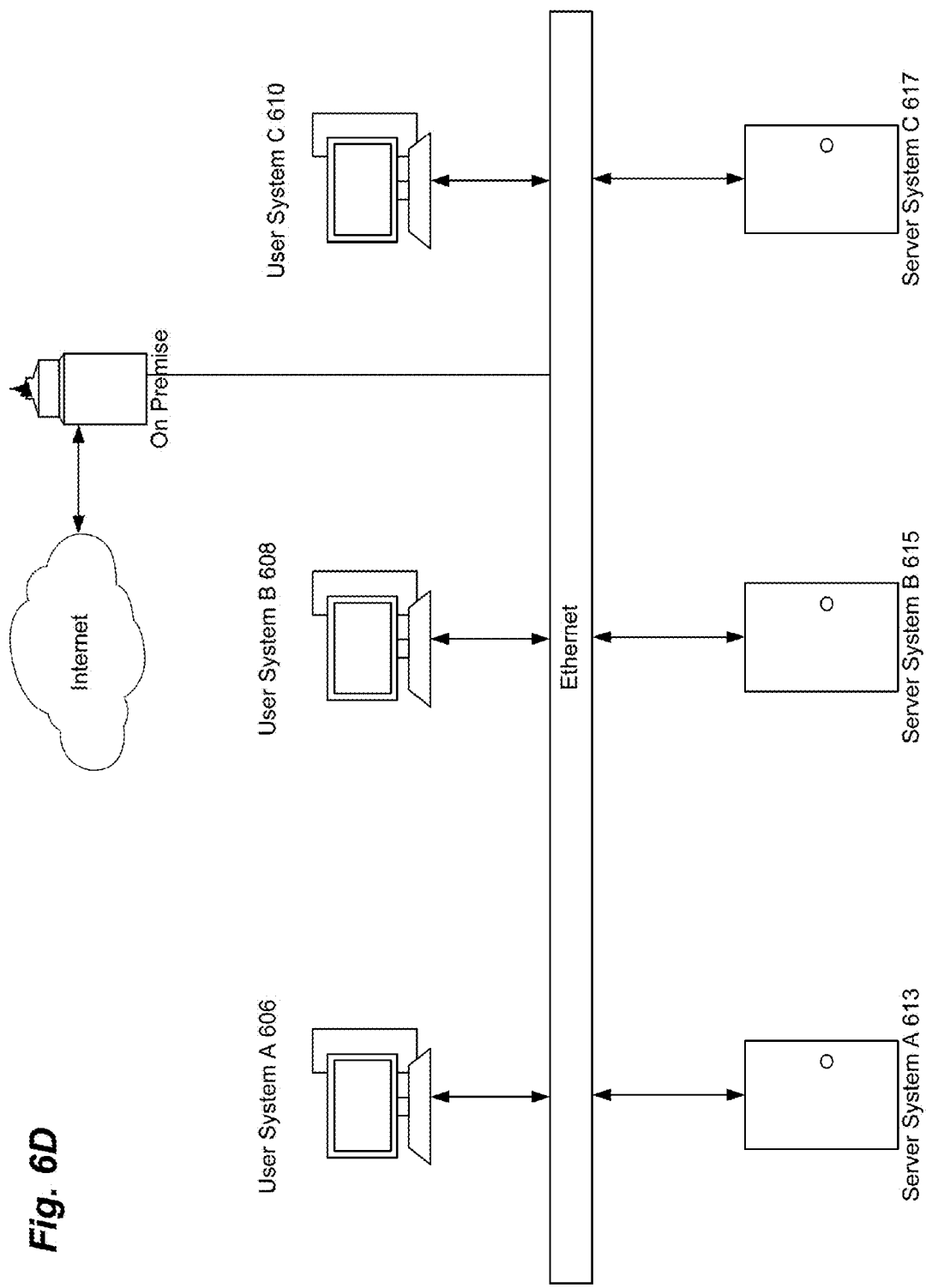
Figure 6E:
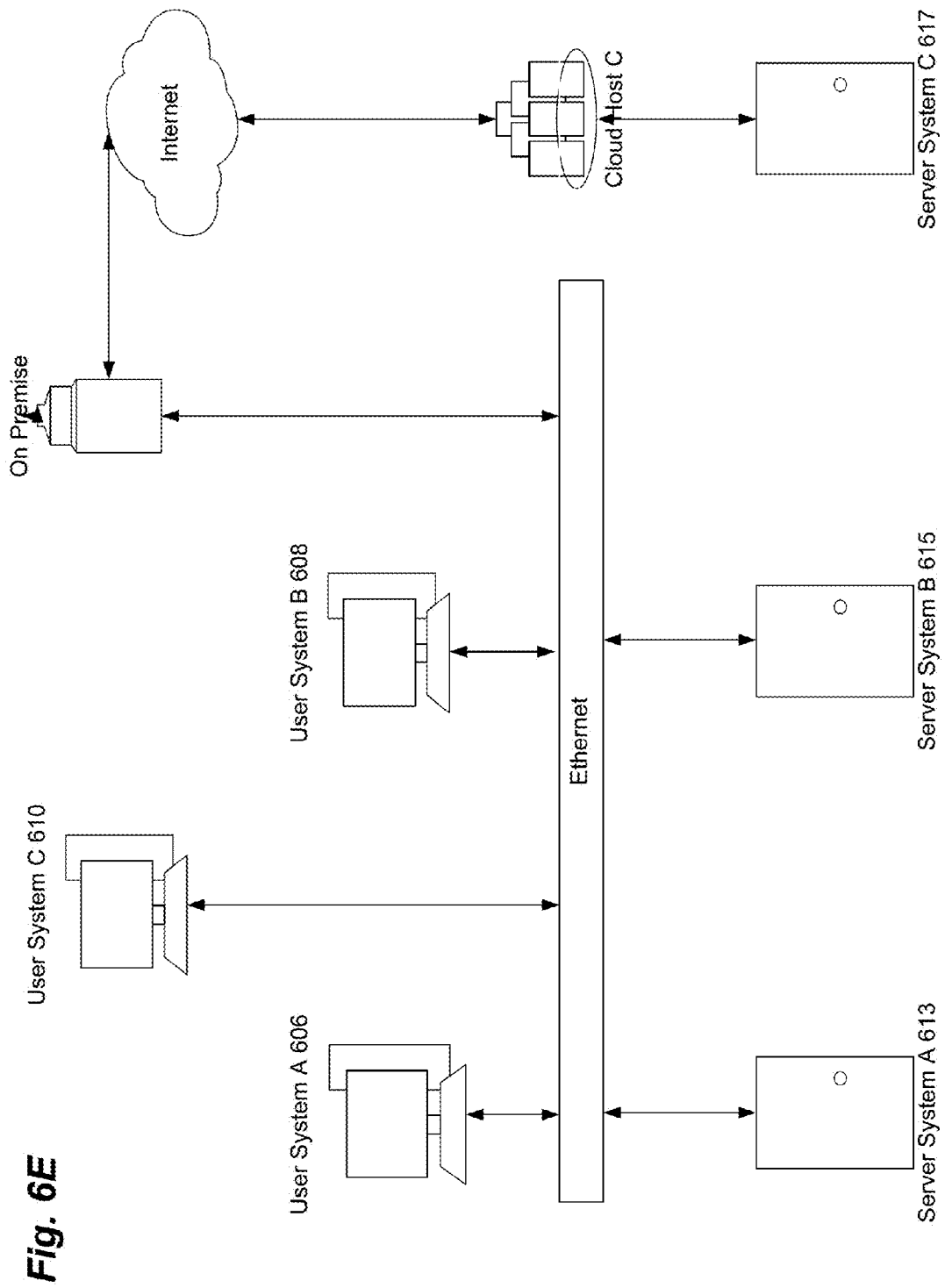
Figure 6F:
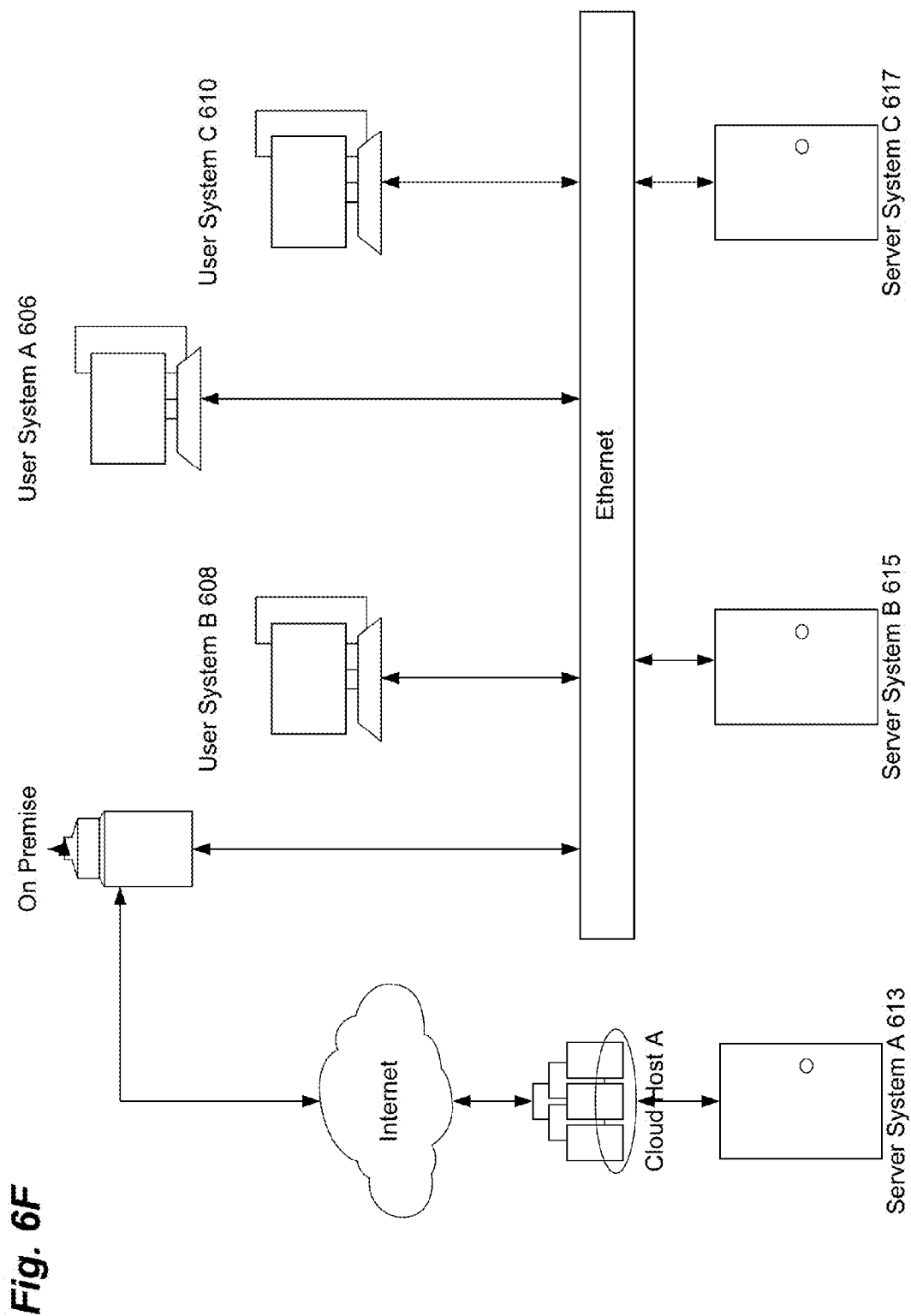
Figure 6G:
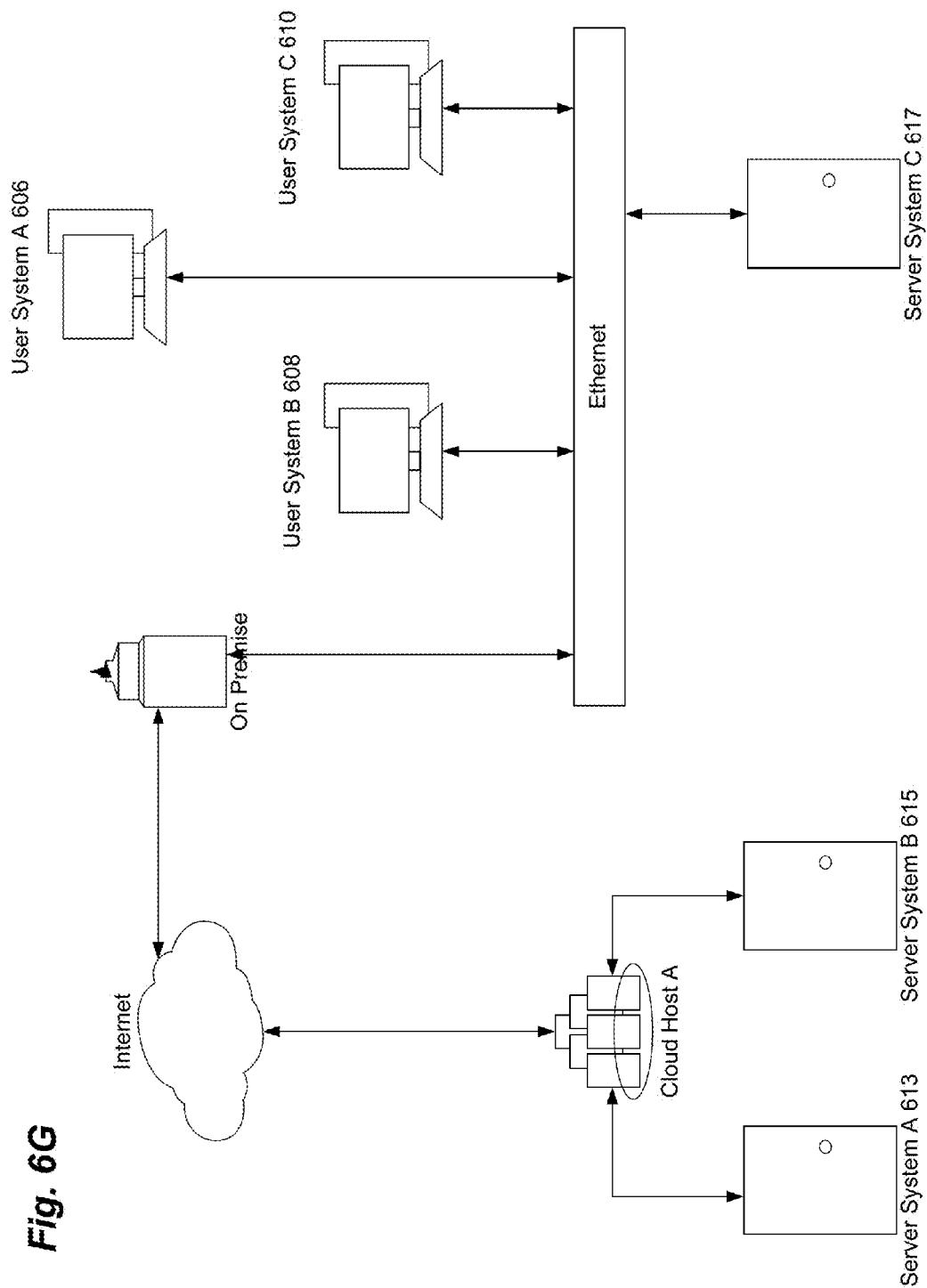
Figure 6H:
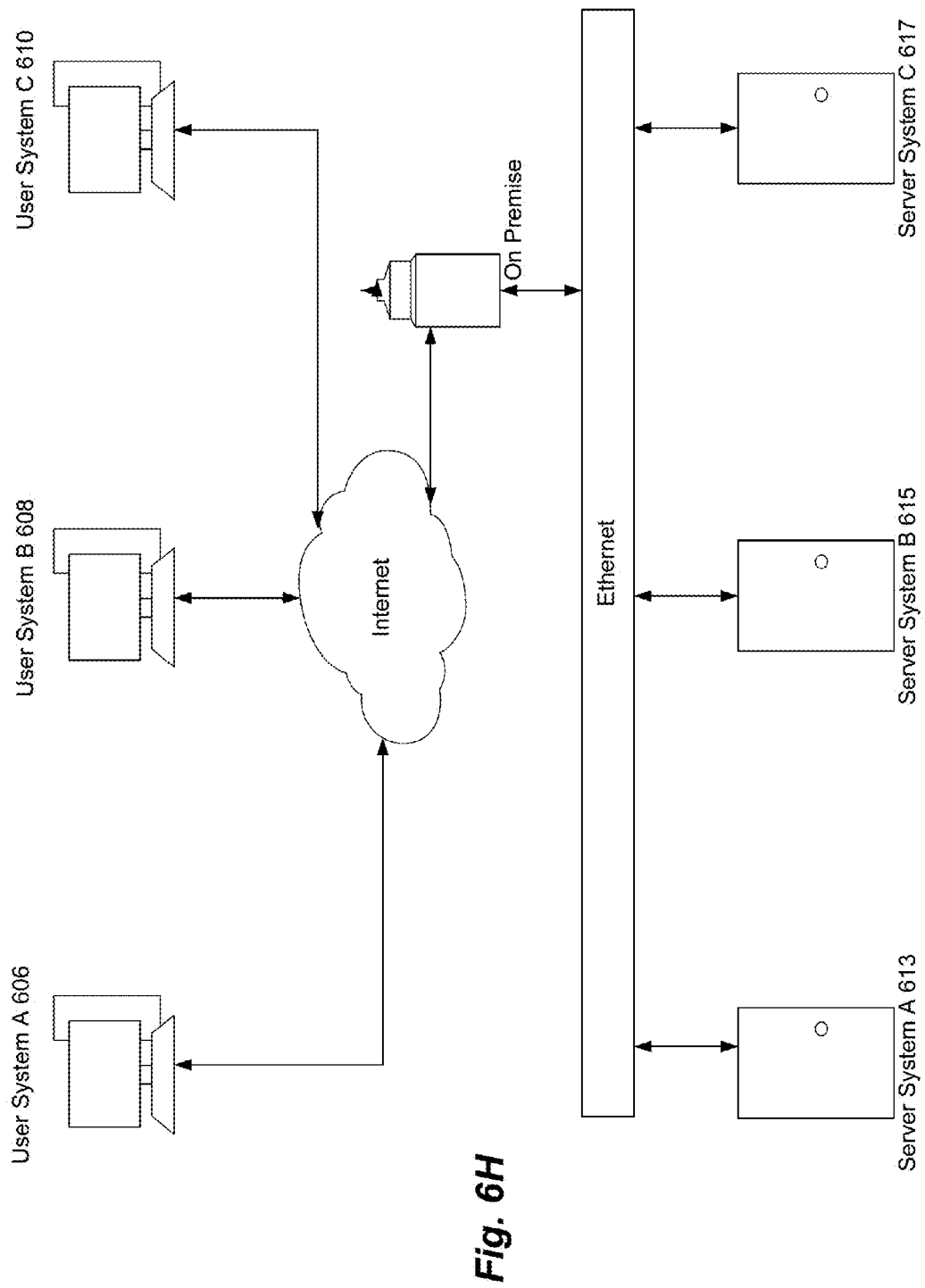
Figure 6I:
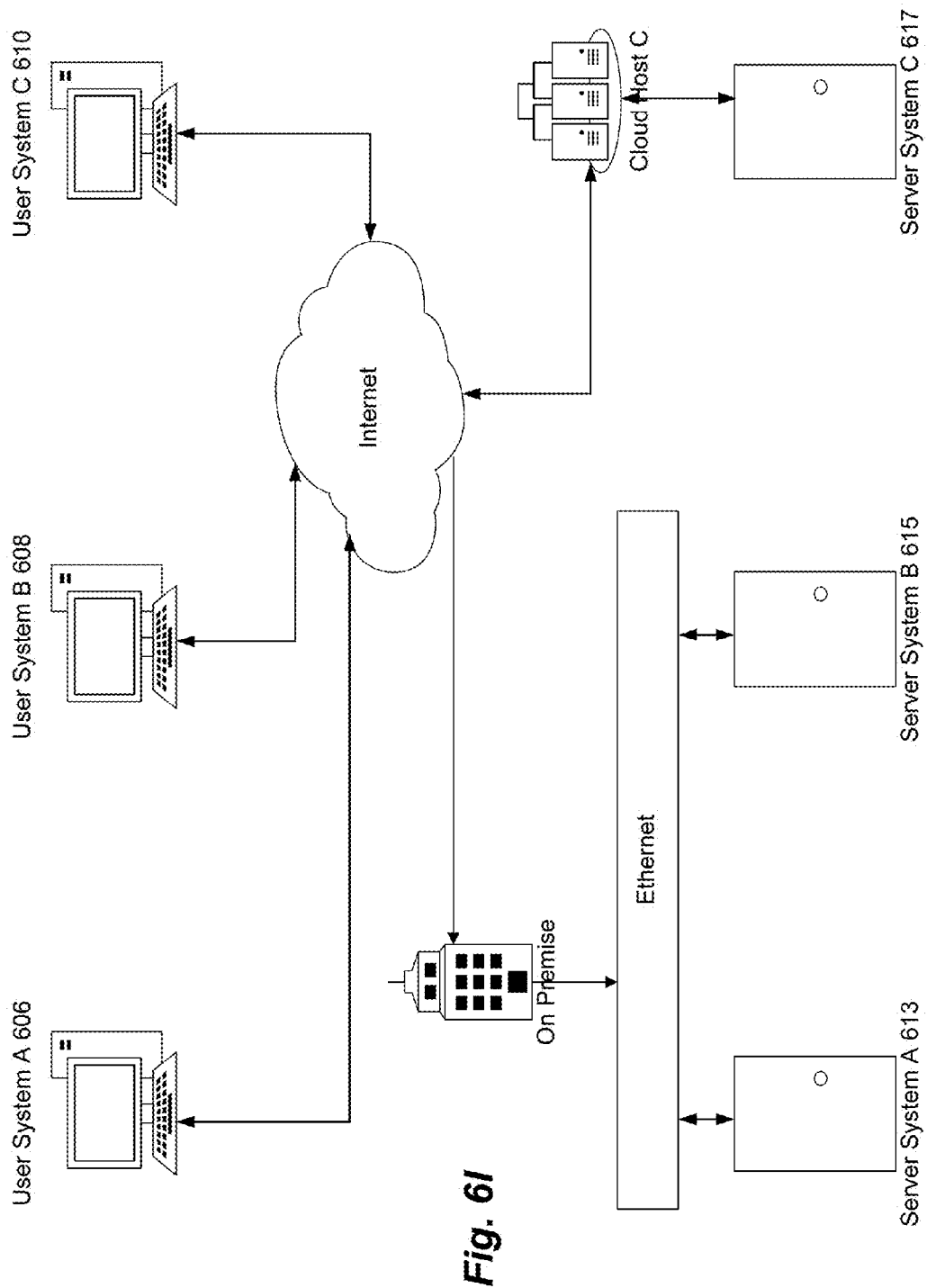

FIG. 5 is a flow diagram of an example embodiment of a Workflow Engine routine 5000. The routine may be provided by, for example, execution of the workflow engines 142 and/or 162 of FIG. 1 and/or workflow engines (not shown) of application programs 258 and/or 278 of FIG. 2, such as to perform defined workflows, including to manage interactions between constituent workflows that are part of a larger integrated workflow. It will be appreciated that particular application programs may have workflow engines that have varying types of functionality and may perform additional types of automated operations that are not illustrated in FIG. 5 for purposes of brevity.

The illustrated embodiment of the routine 5000 begins at block 5005, where instructions or information are received, such as from one or more users of an application program that includes the workflow engine to initiate execution of a particular workflow, or instead from an automated trigger to initiate performance of a particular workflow (e.g., based on a user alert being triggered). The routine then continues to block 5010 to determine whether instructions or information have been received to store a new workflow to be executed by the workflow engine, and if so continues to block 5015 to store information about the new workflow for later use. In some embodiments and situations, such instructions to store a new workflow may be received from an embodiment of the Integrated Workflow Builder routine of FIG. 3, such as with respect to block 3030 of FIG. 3. In addition, as discussed in greater detail elsewhere, in some embodiments the creation and storage of a new workflow may involve a number of distinct interactions by one or more users or other applications with the routine 5000 or otherwise with an application program that includes the workflow engine.

If it is instead determined in block 5010 that the instructions or information received in block 5005 are not to store a new workflow, the routine continues instead to block 5025 to determine whether instructions or a request have been received to perform an indicated workflow. If so, the routine continues to block 5030 to retrieve information about the defined steps and other information associated with the indicated workflow to be performed. After block 5030, the routine continues to block 5035 to perform at least some of the defined steps of the indicated workflow as specified, such as in a defined order or otherwise based on defined inter-dependencies between the defined steps. As discussed in greater detail elsewhere, such performance of defined steps may include various types of activities, including using messaging capabilities of the application program in which the workflow engine executes (e.g., to send emails or other electronic messages to users, to create calendar items, to create task items, to modify existing items or messages, etc.) or otherwise performing interactions with users. The performance of the defined steps in block 5035 may in some situations occur over a lengthy period of time, including time involved in waiting for responses or other information (e.g., approvals) from particular users, and multiple different workflows may be performed by the Workflow Engine Routine 5000 in an asynchronous manner at the same time in at least some embodiments and situations.

The performance of the various defined steps of the indicated workflow in block 5035 continues until the workflow is completed or until a configured inter-workflow interaction instruction (if any) is reached. The routine then continues to block 5040 to determine if a configured inter-workflow interaction has been reached, or if the performance of the defined workflow is instead completed. If it is determined that a configured inter-workflow interaction has been reached, the routine continues to block 5045 to perform one or more corresponding electronic interactions, such as to cause another defined workflow to be performed in another application, and with such electronic interactions optionally occurring using a copy of the Integrated Workflow Interaction Manager module that is integrated with or otherwise associated with the application program that is executing the current copy of the routine 5000 (as discussed with respect to blocks 4010-4045 of FIG. 4). After block 5045, the routine 5000 proceeds to block 5050 to receive results or other response information from the other workflow that has been invoked, which in some situations may similarly involve waiting for the response for a period of time until the other workflow has completed or otherwise provided its response. After block 5050, the routine continues to block 5060 to determine if more defined steps are available to be performed for the indicated workflow, and if so returns to block 5035 to continue performance of additional defined steps—as discussed in greater detail elsewhere, such additional defined steps may in some situation use the results or other response information received in block 5050 as part of their performance.

If it is instead determined in block 5060 that no more steps are available to be performed and that the indicated workflow is therefore complete, or instead determined in block 5040 that the performance of the indicated workflow is complete without a configured inter-workflow invocation having occurred at that time, the routine continues to block 5080 to optionally provide output from the performance of the indicated workflow, such as to one or more users of the application program that includes the workflow engine which caused the indicated workflow to be performed, or otherwise as specified by the indicated workflow. In some embodiments and situations, a particular indicated workflow may store information that is received and/or produced by the performance of the indicated workflow, whether instead of or in addition to other output that is provided.

If it is instead determined in block 5025 that the instructions or information received in block 5005 are not to perform an indicated workflow, the routine continues instead to block 5090 to perform one or more other indicated operations as appropriate. Such other indicated operations may include, for example, performing modifications to existing workflows in response to corresponding instructions, deleting existing workflows that are no longer being used, scheduling the performance of particular workflows for future times, receiving and storing configuration information for use in later performance of particular workflows, etc.

After blocks 5015, 5080, or 5090, the routine continues to block 5095 to determine whether to continue, such as until an explicit indication to terminate is received (e.g., from the application in which the workflow engine executes). If it is determined to continue, the routine returns to block 5005, and otherwise continues to block 5099 and ends.

Particular examples are provided in the following sections of particular embodiments, for the purpose of illustration. However, it will be understood that the described techniques may be used in a wide variety of other situations, and that the invention is thus not limited to the exemplary details provided. In at least some of the following examples, embodiments of the IW Inter-Connector system and/or particular modules of the IW Inter-Connector system are referred to as 'Connect2Share' (or "C2S") and/or as 'Workflow Bus', applications that are used to perform constituent workflows include Oracle E-Business Suite and one or more Microsoft desktop applications (e.g., Microsoft Word, Excel, PowerPoint, Outlook, Internet Explorer, SharePoint and Exchange, generally referred to herein as 'Office Enhanced System' or OES applications), and other exemplary details are similarly included.

In some embodiments, a Connect2Share system embodiment is used to interface with and extend the capability of Enterprise Business (EB) applications (e.g., Oracle E-Business Suite) by using user-friendly desktop applications (e.g., Microsoft Word, Excel, PowerPoint, Outlook, SharePoint, Exchange, Internet Explorer and Adobe Acrobat), such as to accomplish capabilities including improved data processing, enhanced document management and advanced workflow driven solutions. The C2S system embodiment may be used to integrate an easy-to-use human interface desktop application system having messaging and document management capabilities with an EB application's data, including to add document management functionality keyed directly to EB system metadata. The C2S system may integrate two such disparate applications at a workflow-to-workflow level, including utilizing a secure communication architecture provided by one or more C2S Workflow Bus modules, as well as at a data level by sharing various types of data—the C2S Workflow Bus modules may further in some embodiments operate in conjunction with one or more C2S Server Modules that provide data translations, mapping functions, and management of process execution. The C2S system embodiment adds a new high degree of integration between applications by allowing an entire business process to be lifted out of an EB application and performed in one or more OES applications, and then returned as a completed result into the EB application. The benefits of using this methodology are many, including ease of use, enhanced security, reduced license cost, performance, multi-participant data entry, data integrity, reduced development time and bi-directional workflow-to-workflow triggers.

Figure 8:
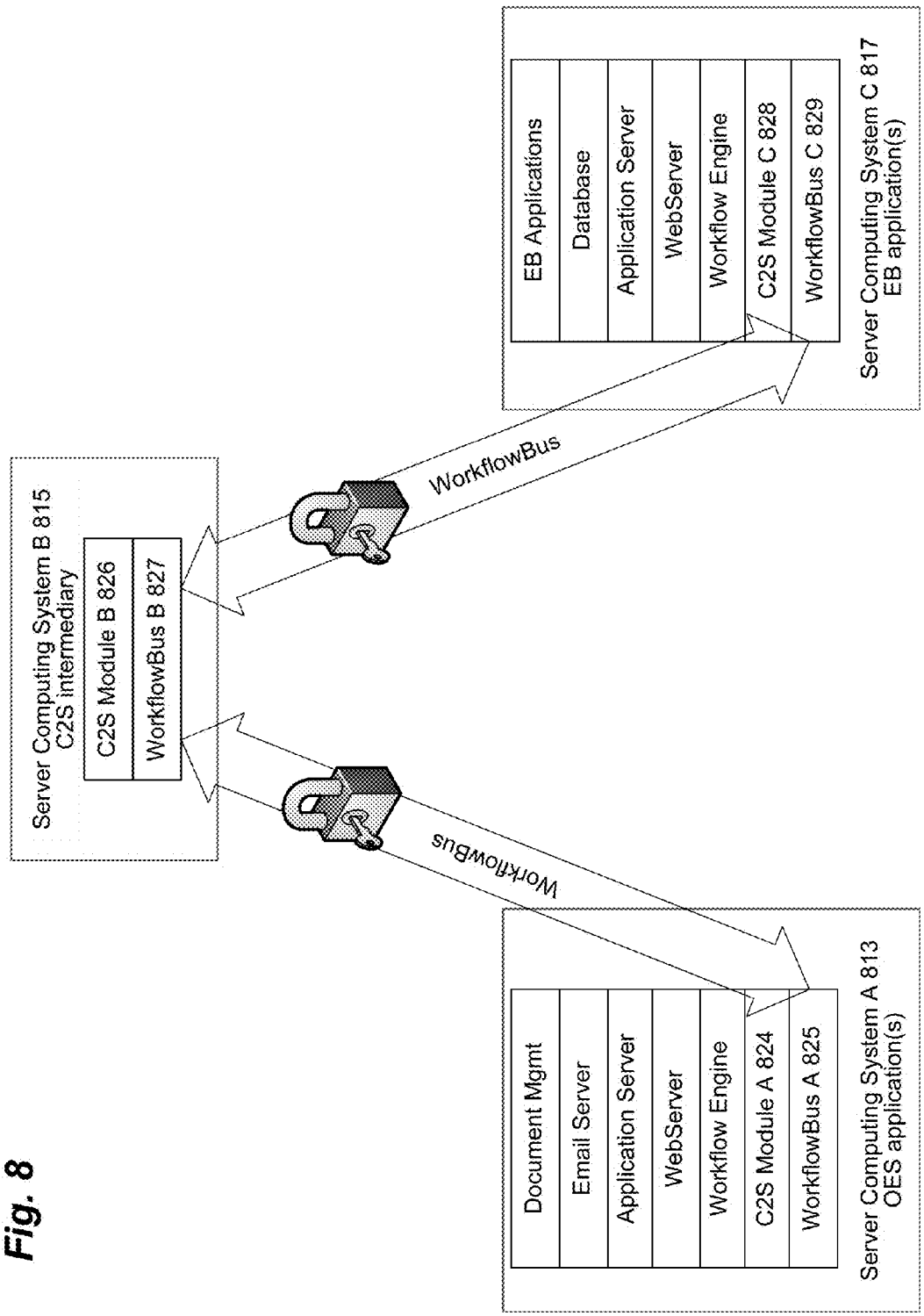
FIG. 8 illustrates an example of facilitating communications between applications of different types on different computing systems.

FIG. 8 illustrates an example of how C2S system module(s) may facilitate communications between applications of different types on different computing systems. In particular, computing systems 813 and 817 are illustrated, which are each executing a copy of a C2S Workflow Bus module (module A 825 and C 829, respectively). These modules 825 and 829 communicate only with an intermediary C2S Workflow Bus module B 827 in this example, which is executing on computing system 815, and in particular maintain encrypted sessions for such communications. For example, each inter-module session has a unique key that is auto-generated by security functionality of a C2S Workflow Bus, and the sessions may be maintained for a sufficiently short period of time to prevent their encryption keys from being cracked. Any data traveling between two C2S Workflow Bus modules is thus uniquely encrypted and secure. For example, a message may be initiated by an EB application on computing system 817, and get passed to the C2S Server Module C 828 on the computing system 817. The C2S Module C 828 identifies a command in the message and maps it to a Workflow ID and Destination ID that is desired. The C2S Workflow Bus module C 829 on the computing system 817 then creates a unique encryption key, encrypt a message to be sent using that key, and sends the encrypted message to the intermediary C2S modules on computing system 815. The C2S Workflow Bus module B 827 on computing system 815 receives the message, decrypts it and sends it to the C2S Server Module B 826. The C2S Server module B 826 performs data mapping and translation functions, including identifying the Destination ID and Workflow ID, and determining that they correspond to one or more OES applications executing on computing system 813. The C2S Server module B 826 then creates a new message and passes it back to the C2S Workflow Bus module B 827, where it is encrypted with a new key for the next session with C2S Workflow Bus module A 825 on computing system 813. The C2S Workflow Bus module A 825 receives and decrypts the message, and passes it to the C2S Server module A 824 for use by the OES application(s) to which the message is directed.

While not illustrated in FIG. 8, embodiments of the C2S system may include one or more C2S Easy Workflow Builder modules to allow users to create integrated workflows with actions carried out in disparate applications, and one or more C2S DevToolKit modules that enable application integration via one or more Database Integrator tools to support rapid development of data integrations (e.g., a Schema Analysis tool, a Schema Mapping Tool and a Form Building Tool). The C2S DevToolKit modules may support data integration access methods such as ODBC (Open Database Connectivity), Web services, XML, RPC (remote procedure calls), and one or more APIs. Some embodiments of the C2S system may further include a Dashboard application to provide information to users about operation of the C2S system, such as to enable monitoring Workflow Bus activity and performance, tracking status of component availability, tracking workflow threads in progress, and reading logs of archived activities.

In some situations, implementation of a particular C2S system embodiment uses one or more desktop computing systems connected to a secure network with access to a commercially available database-driven EB application and a commercially available OES application(s), along with one or more C2S modules integrated with the EB application and/or OES application(s), and/or residing on a middleware computing system. In other situations, some or all of the EB application(s) and/or OES application(s) may instead be executed using cloud computing techniques, such as via virtualized hardware nodes accessible via one or more networks. The EB application may include, but is not limited to, a database server, application server, workflow engine, application modules, webserver, communication layer and client software. A desktop computing system supporting OES application(s) and/or EB application(s) may be configured in various manners, including the following 3 example configurations: having application programs that include only OES applications (e.g., to provide functionality for word processing, spreadsheet, presentation, web browser, email client, etc.), optionally along with PDF functionality; having application programs that include only EB applications (e.g., to provide functionality for general ledger, accounts payable, inventory, cash and treasury management, governance, risk and compliance, web browser, email client, etc.), optionally along with PDF functionality; and having application programs that include both OES applications and EB applications. In addition, C2S system modules may be used to encrypt message traffic between all locations, using one or more integration techniques between computing systems (e.g., direct database access, web services, XML, RPC, API, etc.)—the C2S system modules may further in some embodiments facilitate secure communications by using system clock time in milliseconds combined with destination information to generate a key, which is used for only a single transmission. FIGS. 6A-6I provide illustrative examples of different types of computing systems and environments in which embodiments of the C2S system may be used, such as with computing systems 606, 608 and 610 providing examples of the 3 example configurations indicated above, respectively, such as when implemented on physical desktop computing systems, and with computing systems 613, 615 and 617 providing examples of the 3 example configurations indicated above, respectively, when implemented on physical server computing systems or cloud-hosted virtualized computing systems.

FIG. 7A illustrates a conceptual architecture 700 of some of the C2S system modules and supporting infrastructure. The architecture includes a C2S Server Module 701 with an application-processing engine 702 for performing data translation and mapping functions and executing program commands, as well as a Workflow Bus module 703. The module 703 includes functionality for a Messaging Engine 704 for creating system messages, for Security 705 for handling encryption, decryption and key generation/management, and for Session 706 for establishing point-to-point communication with secure layer, maintaining encryption keys, performing authentication by user and/or by location and/or by type, generating unique time stamps and performing session security. Additional layers for TCP 707*a* and IP 707*b* are illustrated for handling communications over networks.

Figure 7B:
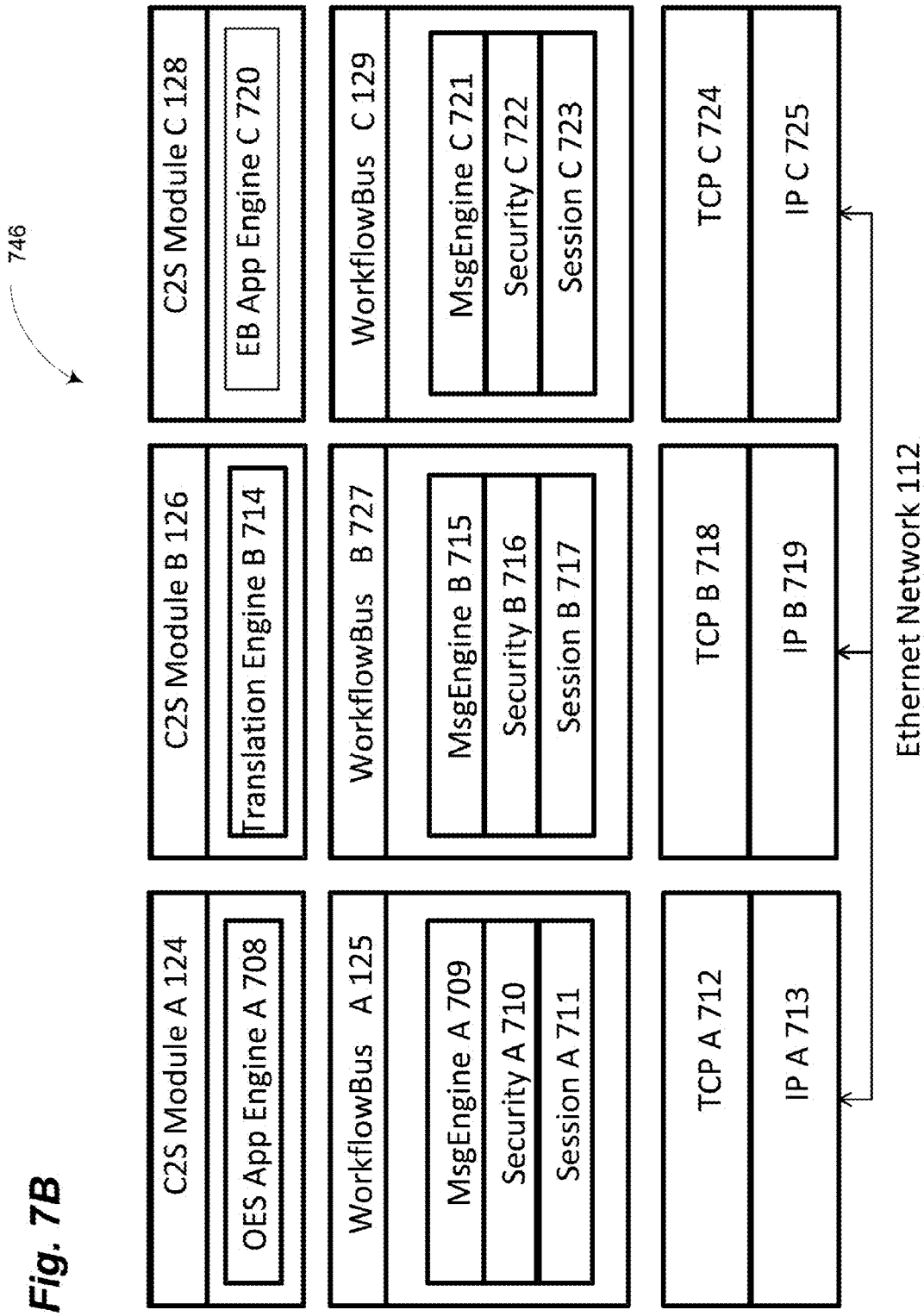

FIG. 7B illustrates a logical architecture 746 illustrating C2S system modules executing together with other application programs in an example embodiment. For example, the C2S Server Module A 724 is illustrated as being integrated with one or more OES application(s) (e.g., running on a Windows architecture, with components 708, 125, 709, 710, 711, 712 and 713 being Windows compatible), while the C2S Server Module C 728 is illustrated as being integrated with one or more EB application(s) (e.g., running on a Linux architecture, with components 720, 129, 721, 722, 723, 724 and 725 being Linux compatible). The translation engine B 714 integrated with intermediary C2S Server Module B 726 may similarly execute on one of a variety of architectures, along with related components 714, 727, 715, 716, 717, 718 and 719.

Figure 7C:
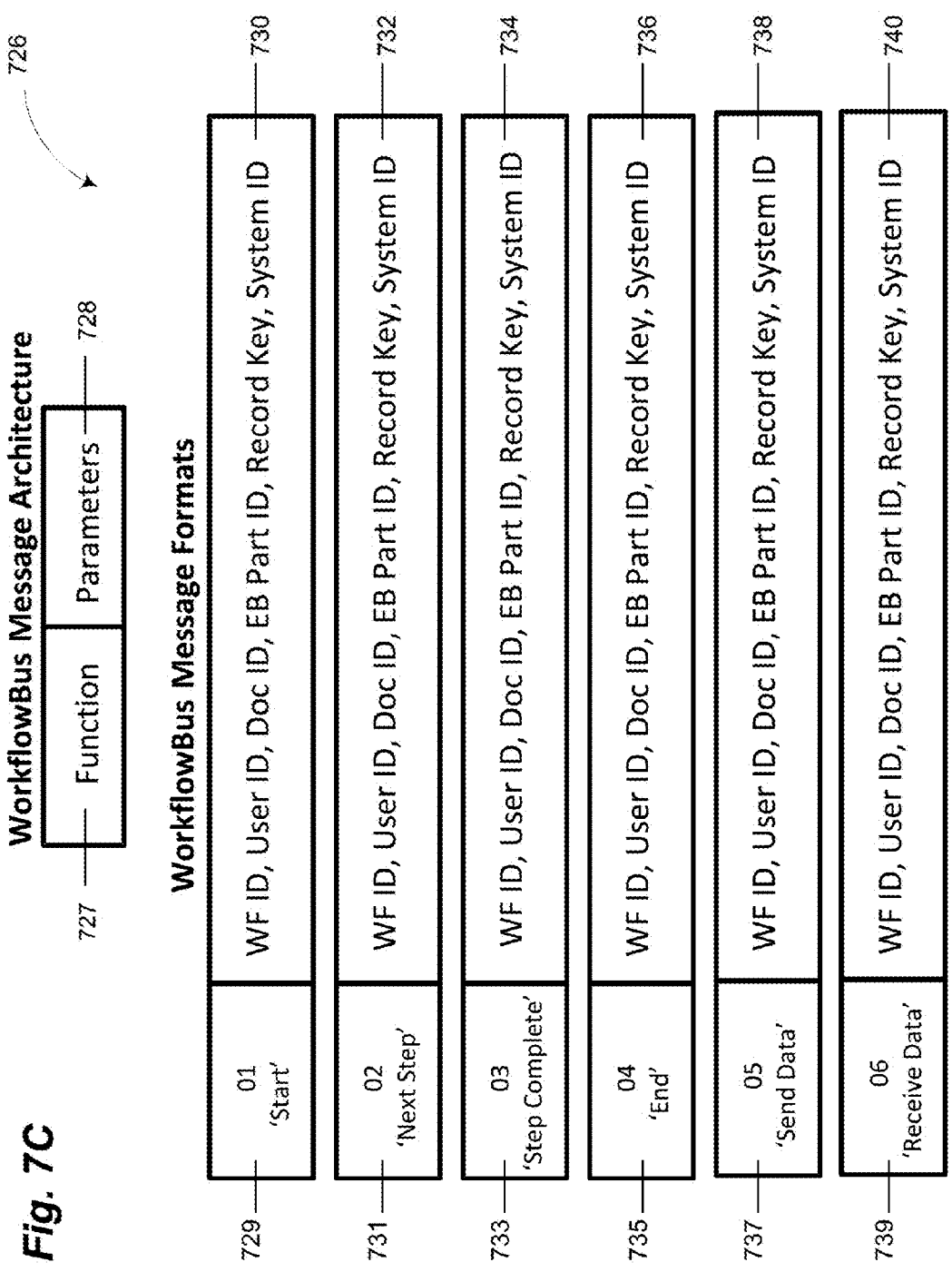

FIG. 7C illustrate a message architecture and formats 726 that may be used by C2S system modules in some embodiments. The illustrated architecture includes a Function data field 727 and one or more Parameters data fields 728. Item 729 illustrates an example of a Function 727 to "Start" a workflow and item 730 illustrates Parameters that accompany that Function, such as the Workflow ID number, User ID number, Document ID number, EB Part ID number (manufacturing system), Record Key and System ID. Items 731 to 740 depict additional examples of the Functions 727 and their Parameters 728. Use of such message formats may enable information to be passed between applications and workflows with enhanced security.

Figure 7D:
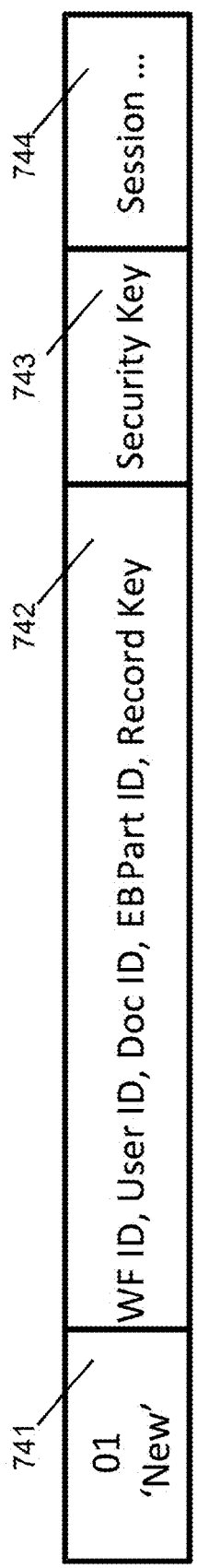

FIG. 7D illustrates an example of a Function "New" 741 with various Parameters 742, as well as security key information 743 and session management information 744. For example, C2S Server Module 701 and its application engine 702 of FIG. 7A may create such an example message to be passed between two computing systems executing two applications of different types (e.g., computing systems executing C2S Server Modules A 724 and C 728 of FIG. 7B). The C2S Workflow Bus modules use the additional key and session management information 743, 744 to transport such an example message securely to and from each other, such as to provide greater security than simple VPN tunnels only. The C2S Workflow Bus modules add an additional layer of encryption and detail to such an example message by encrypting it and using it as a point-to-point message with system destination information between only particular C2S Workflow Bus modules. Because data transfers are also handled via the Workflow Bus in a similar manner, such data transfers similarly occur in a secure manner. Such messages, once delivered to a destination system, can be confirmed to have any needed information, as well as provide additional security features of logging, non-repudiation, error checking and guaranteed delivery. To further enhance security, the C2S system modules may be configured to restrict use of some access points, such that inter-workflow communications and/or inter-application communications occur only through the C2S Workflow Bus modules. In addition, SSL-based and/or VPN-based security may also be used for communications after they are sent from a C2S Workflow Bus module.

As one example use case, consider a situation where document management for a supplier is desired for underlying components used in a manufacturing assembly. From a master component record in an EB application database, a keyed relationship is defined. This key is then exported to an OES document management system and used to create numerous documents that are checked in, version controlled and managed outside of the EB application. A user-selectable icon is then added to an EB application form that is labeled "Get Documents," with the form corresponding to a particular component available from the supplier. Once this icon is pressed by a user of the EB application, corresponding functionality for the icon sends the key to the C2S system along with a user ID of the user, which manages interactions with the OES document management system to run a workflow that queries for all documents related to that key and user ID. As one example, the response from the workflow of the OES document management system may be a list of the identified documents for which the user has security clearance, which is returned to the EB application (via the C2S system) in a web page format with a hyperlinked index (e.g., to cause a corresponding pop-up window to be displayed on the EB application user's screen). The EB application user may then simply click on any document name in the list, and the C2S system will retrieve the selected document from the OES document management system and present it to the user via the EB application or in a browser on the user's desktop computing system. The EB application user may not be involved in the creation or management of the documents, but nonetheless may easily receive access (e.g., read-only access) to materials related to the component and for which they have the appropriate security clearance to view. For example, in a manufacturing context, there may be multiple types of documents related to a single component, such as mechanical drawings, safety data sheets, available vendors, background on vendors, compliance information, etc.

As a further use case, consider an example of creating a New Supplier in an Oracle EB application by interacting with the C2S system and one or more OES application(s). In this use case, an integrated workflow has been created with two constituent workflows executing in two applications that are of different types and executing on different computing system. Identifying information of various types are exchanged between the constituent workflows using the C2S system as an intermediary, such as workflow ID numbers, user authentication rules, authorized system ID(s), data translation information, etc. as one example, the data structures described in FIG. 7C may be used for some or all such electronic communications between the constituent workflows. An example workflow corresponding to this example is illustrated in FIGS. 10A-10H.

Figure 10A:
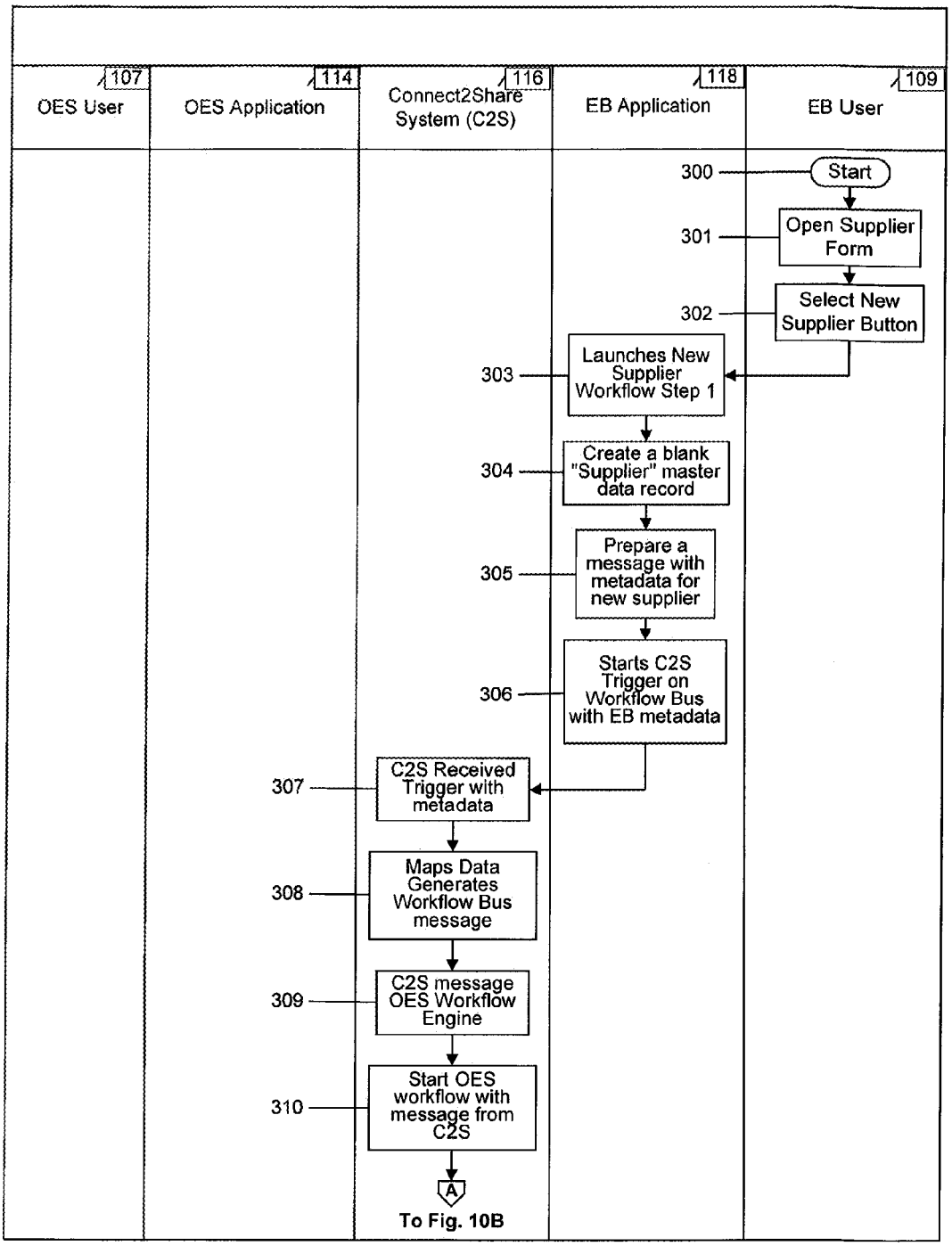
FIGS. 10A-10H illustrate an example of a workflow for an indicated use case.
Figure 10B:
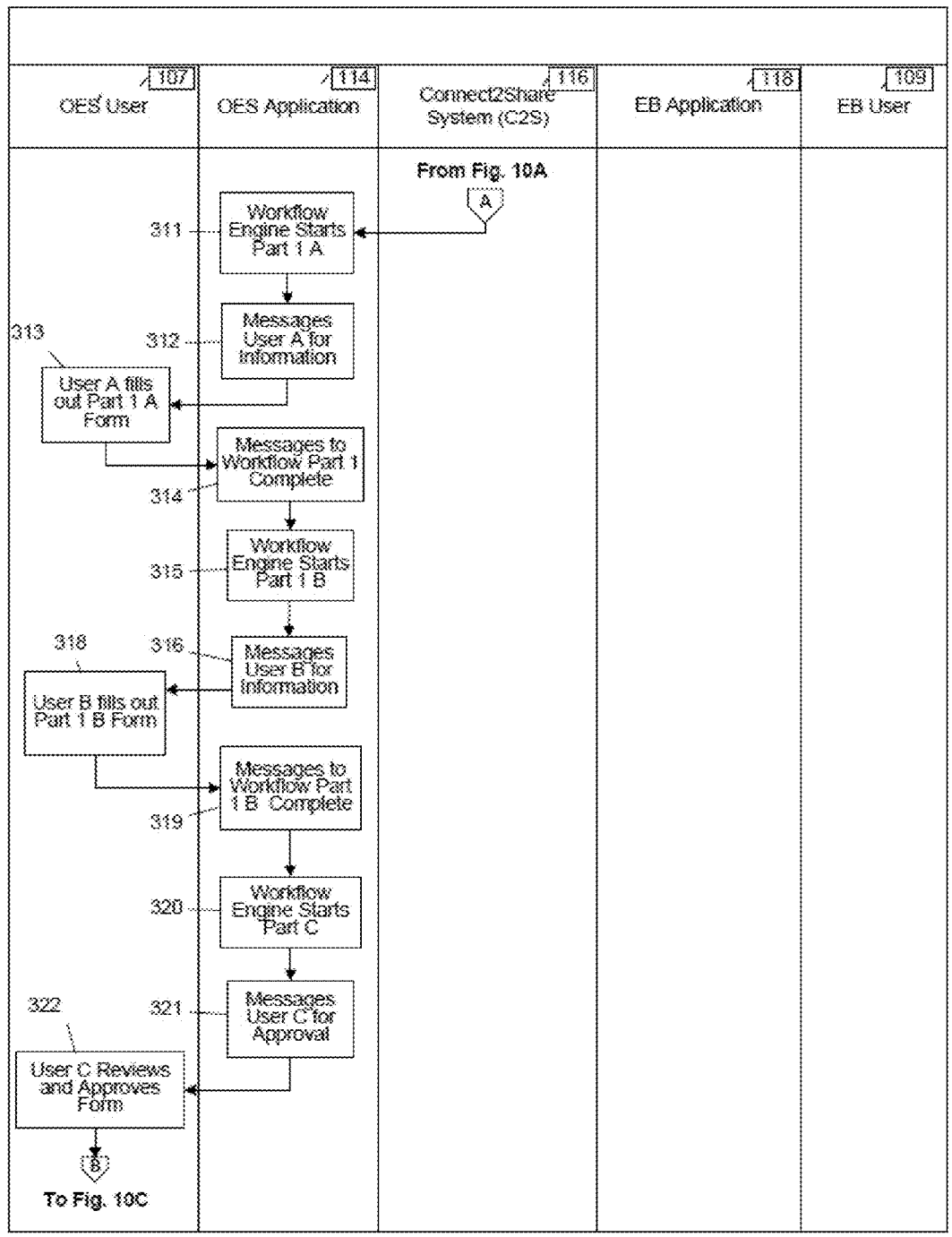
Figure 10C:
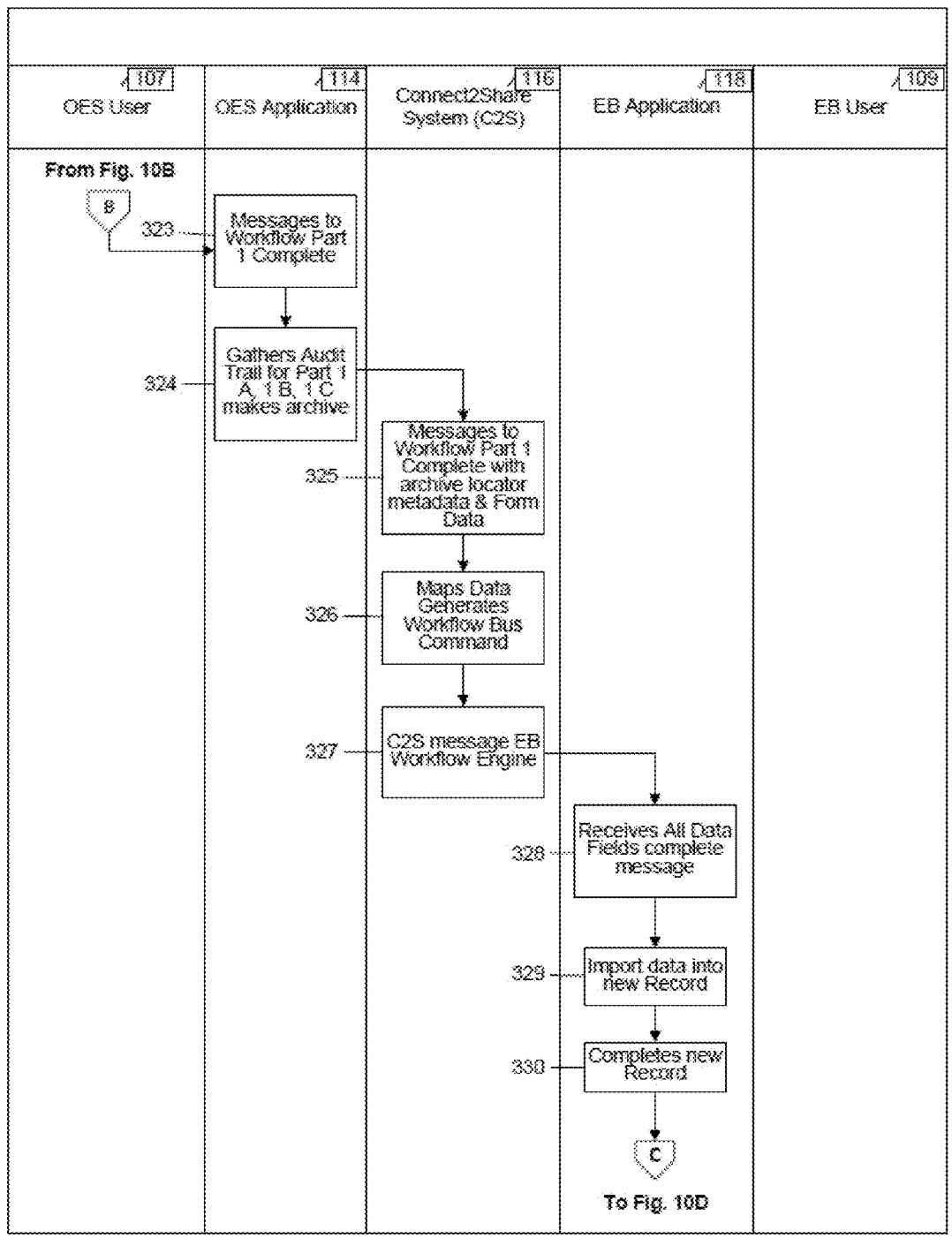
Figure 10D:
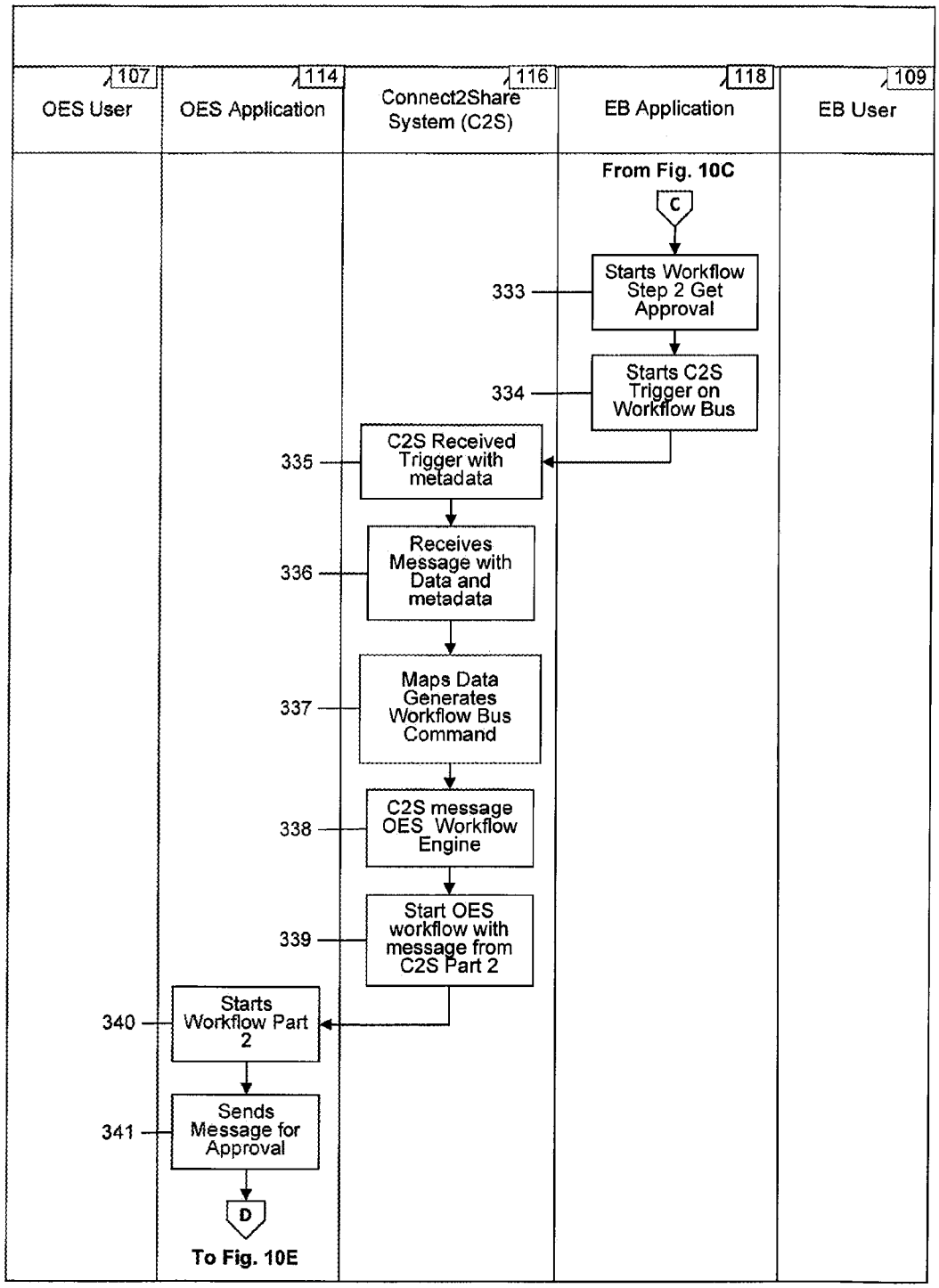
Figure 10E:
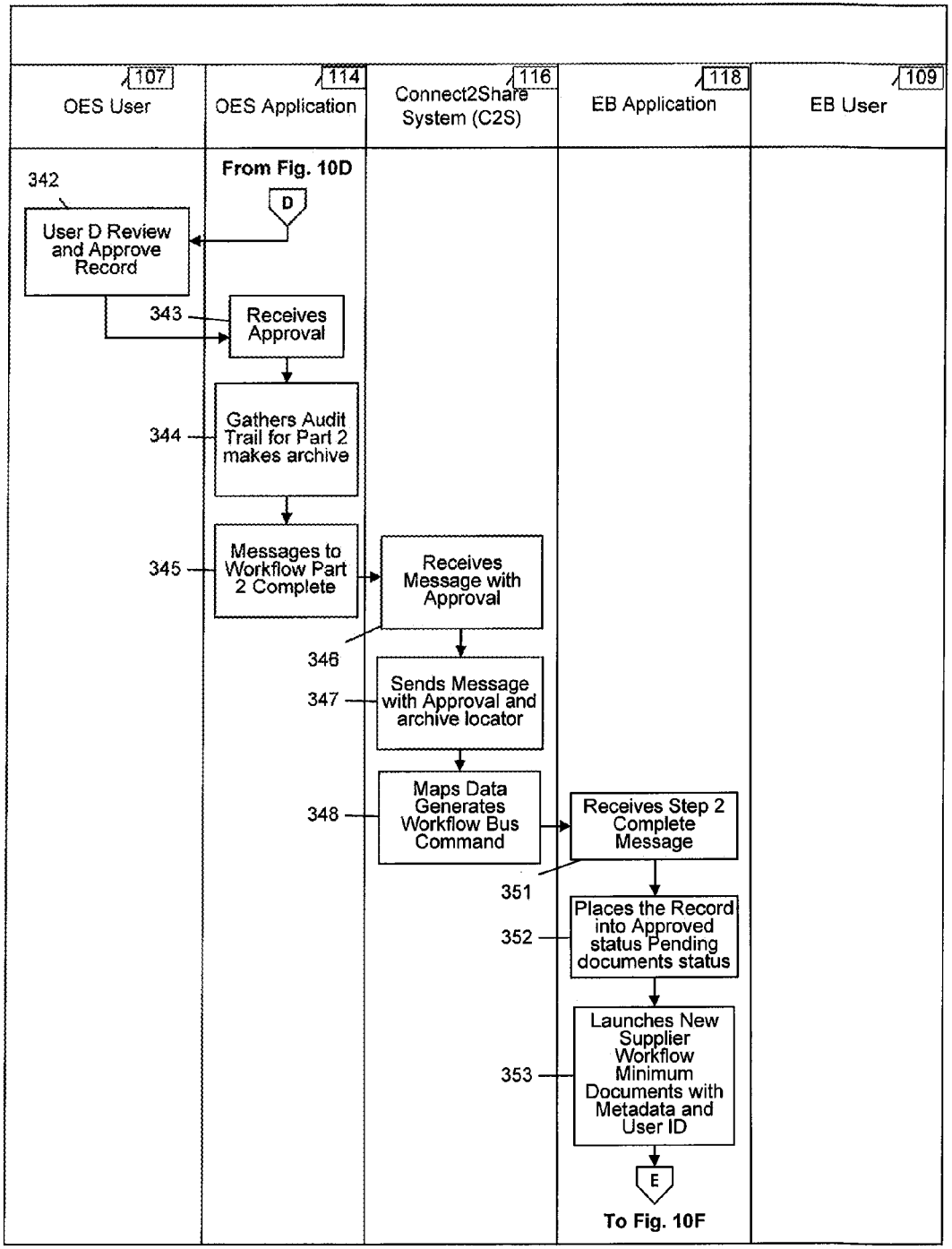
Figure 10F:
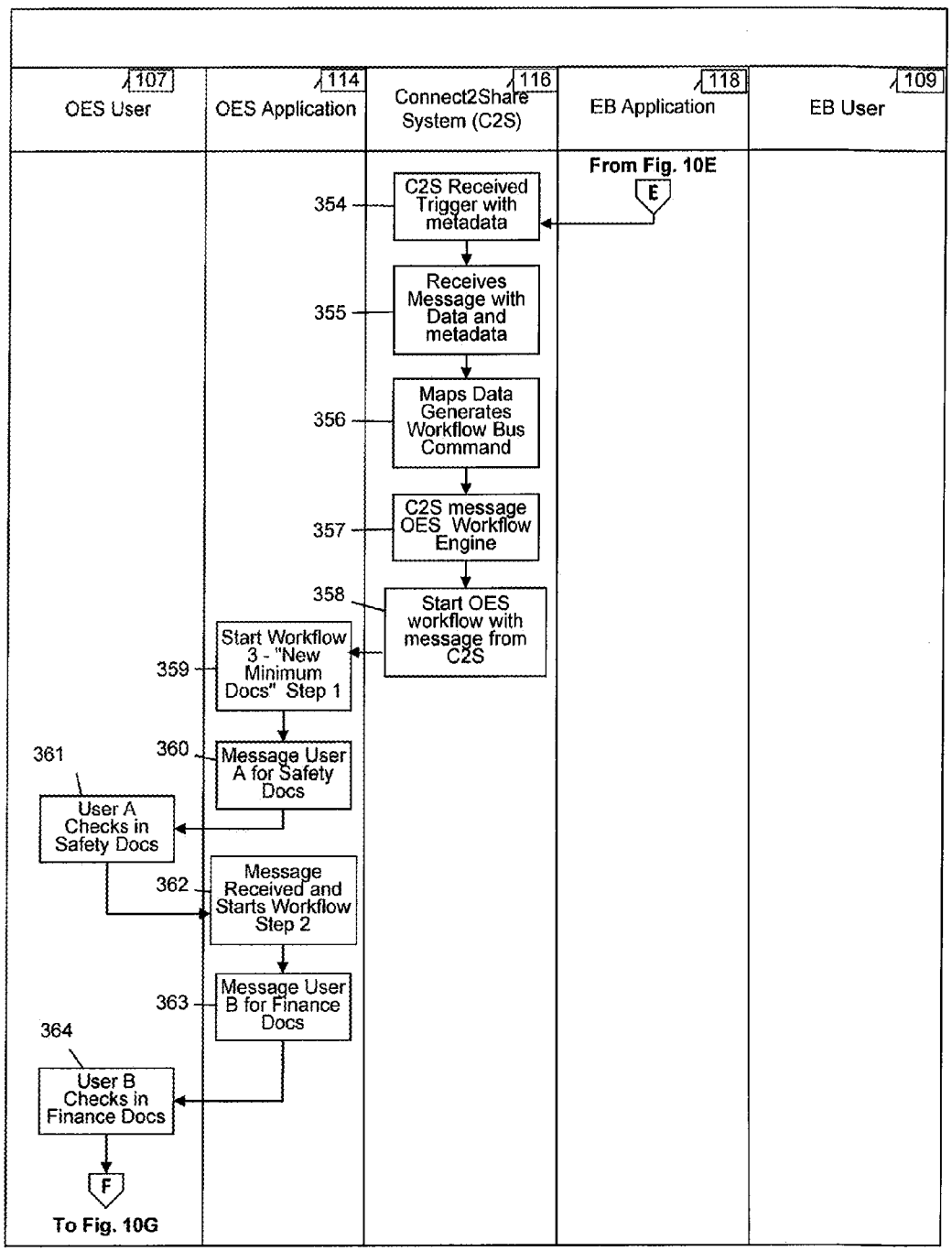
Figure 10G:
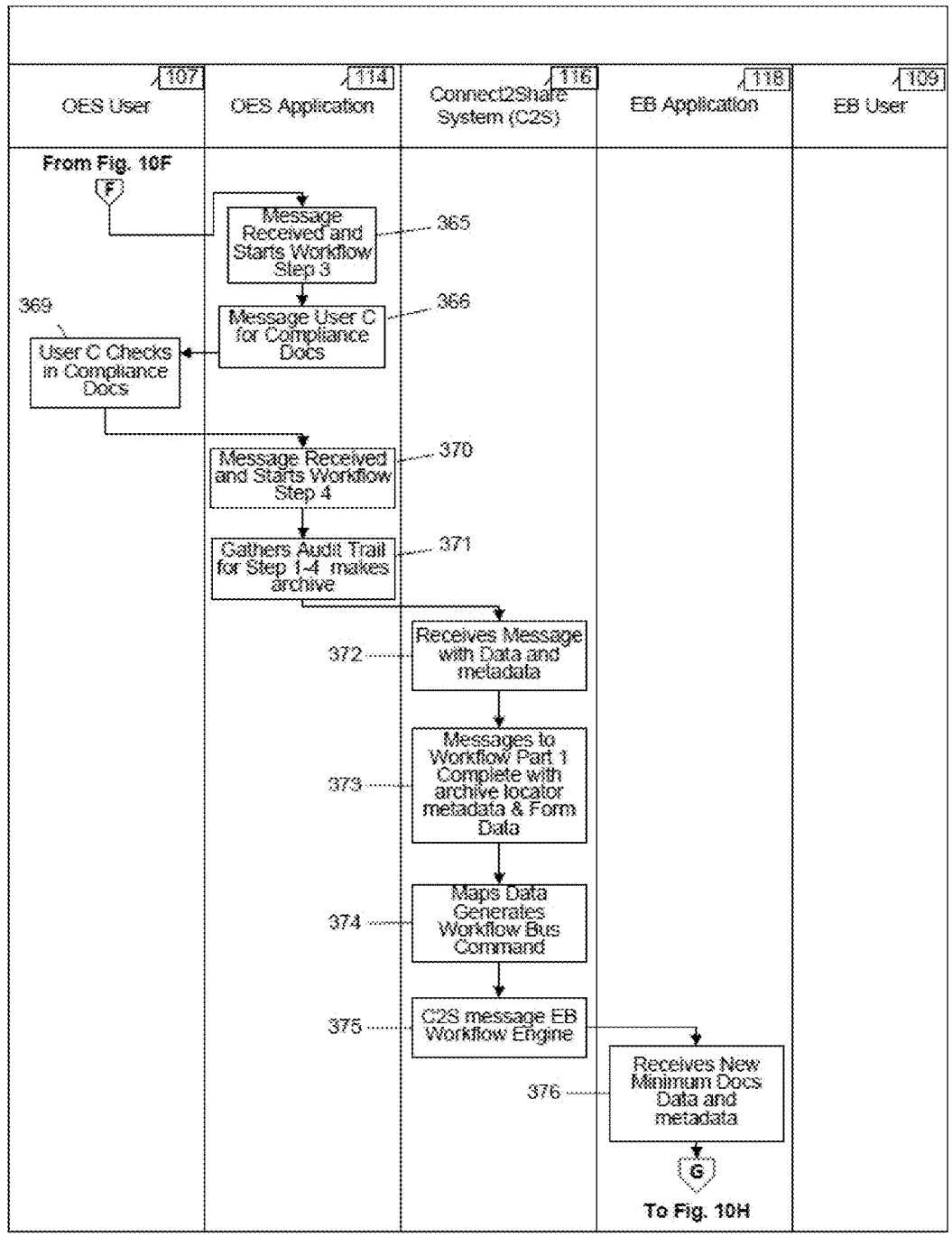
Figure 10H:
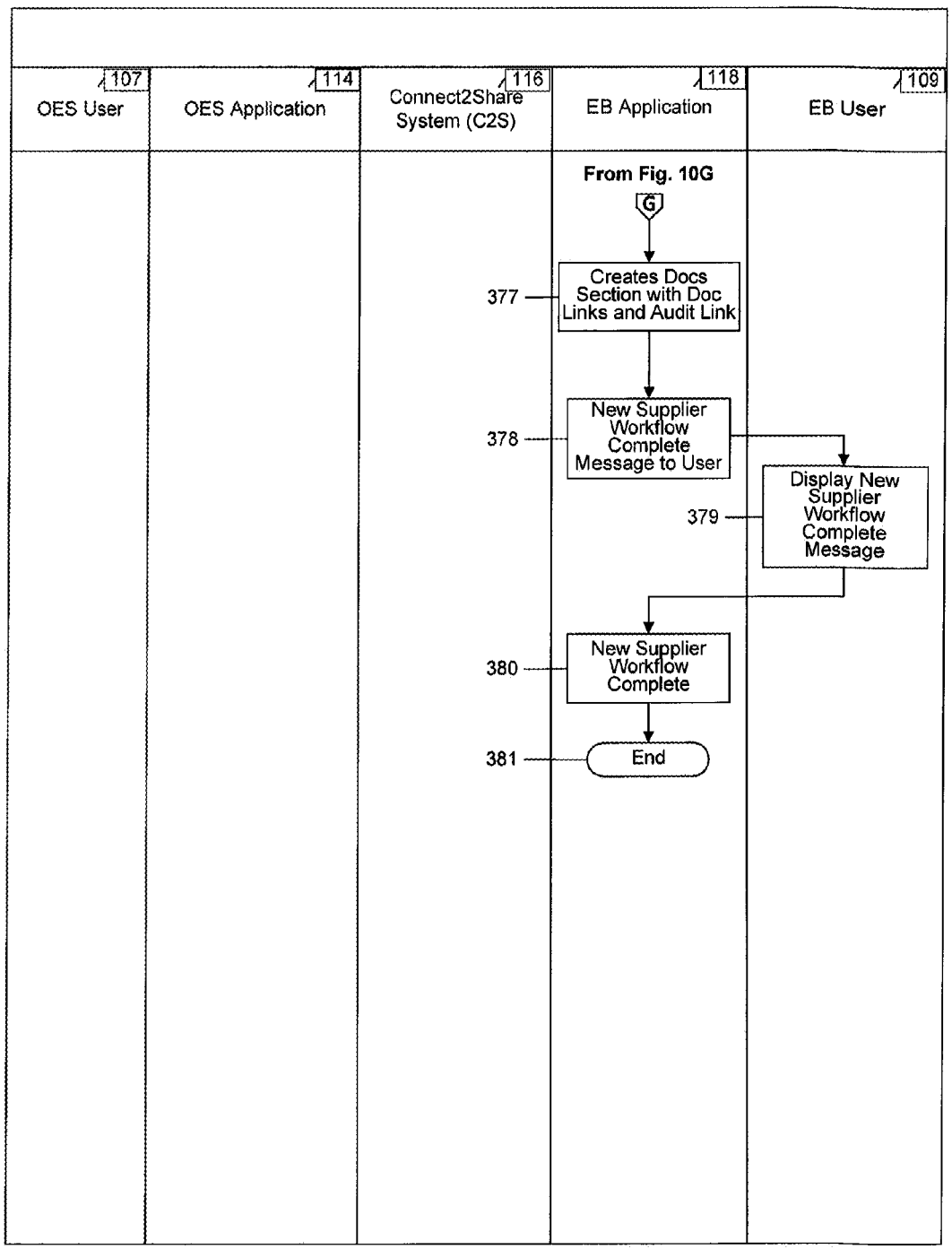

The example integrated workflow begins in FIG. 10A on EB User System 109, with the user beginning the process "Start" 300 by initiating an "Open Supplier Form" 301 command and then selecting a C2S custom icon "Select New Supplier Button" 302. This user action causes a message to be sent to the EB application 118 to "Launches New Supplier Workflow Step 1" 303, which proceeds to perform "Create a blank Supplier master data record" 304 step of the EB application's constituent workflow. The next step is to "Prepare a message with metadata for new supplier" 305, such as to include parameter data to cause the OES application(s) 114 to initiate performance of a corresponding constituent workflow. The EB application 118 then performs "Starts C2S Trigger on Workflow Bus with EB metadata" 306, causing the message to be supplied to the intermediary C2S system 116 (e.g., via a secure communication controlled by one or more Workflow Bus modules of the C2S system). The C2S system 116 proceeds to perform "C2S Received Trigger with metadata" 307, including to optionally perform data translations, command translations and/or security validation, then performs "Maps Data Generates Workflow Bus message" 308, "C2S message OES Workflow Engine" 309, and "Start OES workflow with message from C2S" 310, which causes a message to be sent (e.g., via a secure communication controlled by one or more Workflow Bus modules of the C2S system) to start a corresponding constituent workflow in OES application(s) 114.

The OES application(s) 114 executes a multi-step constituent workflow to assemble information for creating a new supplier, including by performing "Workflow Engine Starts Part 1 A" 311 and "Messages User A for Information" 312 step of the constituent workflow. One of multiple users 107 of the OES application(s) (in this example, User A) is then interacted with in "User A fills out Part 1 A Form" 313, with corresponding information being provided to OES application(s) 114. The OES application(s) 114 then performs "Messages to Workflow Part 1 Complete" 314 "Workflow Engine Starts Part 1" B 315, and "Messages User B for Information" 316. Another of the multiple users 107 of the OES application(s) (in this example, User B) is then interacted with in "User B Fills Out Part 1B Form" 318, with corresponding information being provided to OES application(s) 114. The OES application(s) 114 then performs "Messages to Workflow Part 1 B Complete" 319, "Workflow Engine Starts Part C" 320, and sends "Messages User C for Approval" 321. A third user 107 (User C) then participates in "User C Reviews and Approves Form" 322, with corresponding information provided to OES application(s) 114, which completes the user interactions for the constituent workflow being performed by the OES application(s) 114.

The OES application(s) 114 then performs "Messages to Workflow Part 1 Complete" 323, and "Gathers Audit Trail for Part 1 A, 1 B, 1 C makes archive" 324, causing response information to be provided to C2S system 116 (e.g., via a secure communication controlled by one or more Workflow Bus modules of the C2S system) that includes information to create a new supplier record in the EB application 118 along with audit trail information. The C2S system 116 receives the information, optionally performing translation of the data, metadata and commands and/or performing security validation operations, and then performs "Messages to Workflow Part 1 Complete with archive locator metadata & Form Data" 325, "Maps Data Generates Workflow Bus Command" 326 and creates "C2S message EB Workflow Engine" 327 to provide to EB application 118 (e.g., via a secure communication controlled by one or more Workflow Bus modules of the C2S system). The EB application 118 then performs "Receives All Data Fields complete message" 328, "Import data into new Record" 329, and then "Completes new Record" 330. At this point, performance of the constituent workflows of the EB application 118 and the OES application(s) 114 has caused a new supplier record to be created for the EB application 118.

The EB application 118 next performs "Starts Workflow Step 2 Get Approval" 333, and then "Starts C2S Trigger on Workflow Bus" 334, which generates a secure message and session for communicating with the intermediary C2S system 116. The C2S system 116 receives the resulting message in "C2S Received Trigger with metadata" 335, performs "Receives Message with Data and metadata" 336, optionally performing translation of the data, metadata and commands and/or performing security validation operations, and then performs "Maps Data Generates Workflow Bus Command" 337, "C2S message OES Workflow Engine" 338, and "Start OES workflow with message from C2S Part 2" 339. The OES application(s) 114 then performs "Starts Workflow Part 2" 340 and Sends Message for Approval" 341.

Another user 107 (User D) then participates in "User D Review and Approve Record" 342, and provides a corresponding response to the OES application(s) 114. The OES application(s) then perform "Receives Approval" 343, "Gathers Audit Trail for Part 2 makes archive" 344, and then "Messages to Workflow Part 2 Complete" 345 (e.g., via a secure communication to the C2S system controlled by one or more Workflow Bus modules of the C2S system). The C2S system 116 then performs "Receives Message with Approval" 346, optionally performing translation of the data, metadata and commands and/or performing security validation operations, and then performs "Sends Message with Approval and archive locator" 347, and "Maps Data Generates Workflow Bus Command" 348 (e.g., via a secure communication to the EB application 118 controlled by one or more Workflow Bus modules of the C2S system). The EB application 118 then performs "Receives Step 2 Complete Message" 351, "Places the Record into Approved status Pending documents status" 352, and "Launches New Supplier Workflow Minimum Documents with Metadata, Data and User ID" 353 (e.g., via a secure communication to the C2S system controlled by one or more Workflow Bus modules of the C2S system).

The C2S system 116 then performs "C2S Received Trigger with metadata" 354, "Receives Data with Data and Metadata" 355, optionally performing translation of the data, metadata and commands and/or performing security validation operations, and then performs "Maps Data Generates Workflow Bus message" 356, "C2S message OES Workflow Engine" 357 and "Start OES workflow with message from C2S" 358 (e.g., via a secure communication to the OES application(s) 114 controlled by one or more Workflow Bus modules of the C2S system). The OES application(s) 114 then perform "Start Workflow 3—'New Minimum Docs' Step 1" 359, and then "Message User A for Safety Docs" 360. One of the users 107 (User A) then participates in "User A Checks in Safety Docs" 361, with a corresponding response to the OES application(s) 114. The OES application(s) 114 then perform "Message Received and Starts Workflow Step 2" 362 and "Message User B for Finance Docs" 363. User B then participates in "User B Checks in Finance Docs" 364, with a corresponding response sent to OES application(s) 114.

The OES application(s) 114 then perform "Message Received and Starts Workflow Step 3" 365 and "Message User C for Compliance Docs 366. User C then participates in "User C Checks in Compliance Docs" 369, with a corresponding response provided to the OES application(s) 114. The OES application(s) 114 then perform "Message Received and Starts Workflow Step 4" 370 and "Gathers Audit Trail for Step 1-4 makes archive" 371 (e.g., via a secure communication from the OES application(s) 114 to the C2S system that is controlled by one or more Workflow Bus modules of the C2S system). C2S system 116 then performs "Receives Message with Data and Metadata" 372, "Messages to Workflow Part 1 Complete with archive locator metadata & Form Data" 373, optionally performing translation of the data, metadata and commands and/or performing security validation operations, and then performs "Maps Data Generates Workflow Bus Command" 374, and "C2S message EB Workflow Engine" 375 (e.g., via a secure communication from the C2S system to the EP application 118 that is controlled by one or more Workflow Bus modules of the C2S system). EB application 118 then performs "Receives New Minimum Docs Data and metadata" 376.

EB application 118 then performs "Creates Docs Section with Doc Links and Audit Link" 377 and "New Supplier Workflow Complete Message to User" 378. A "Display New Supplier Workflow Complete Message" 379 is then displayed to the EB user 109. The EB application 118 then performs "New Supplier Workflow Complete" 380 and finishes in "End" 381.

The example integrated workflow of FIGS. 10A-10H demonstrates inter-operations at a workflow-to-workflow level between two different types of applications, with bi-directional communications for data, as well as metadata integration and processing results.

As a further use case, consider an example of performing document management in an OES application based on a keyed record in an EB application. An example workflow corresponding to this example is illustrated in FIGS. 11A-11E.

Figure 11A:
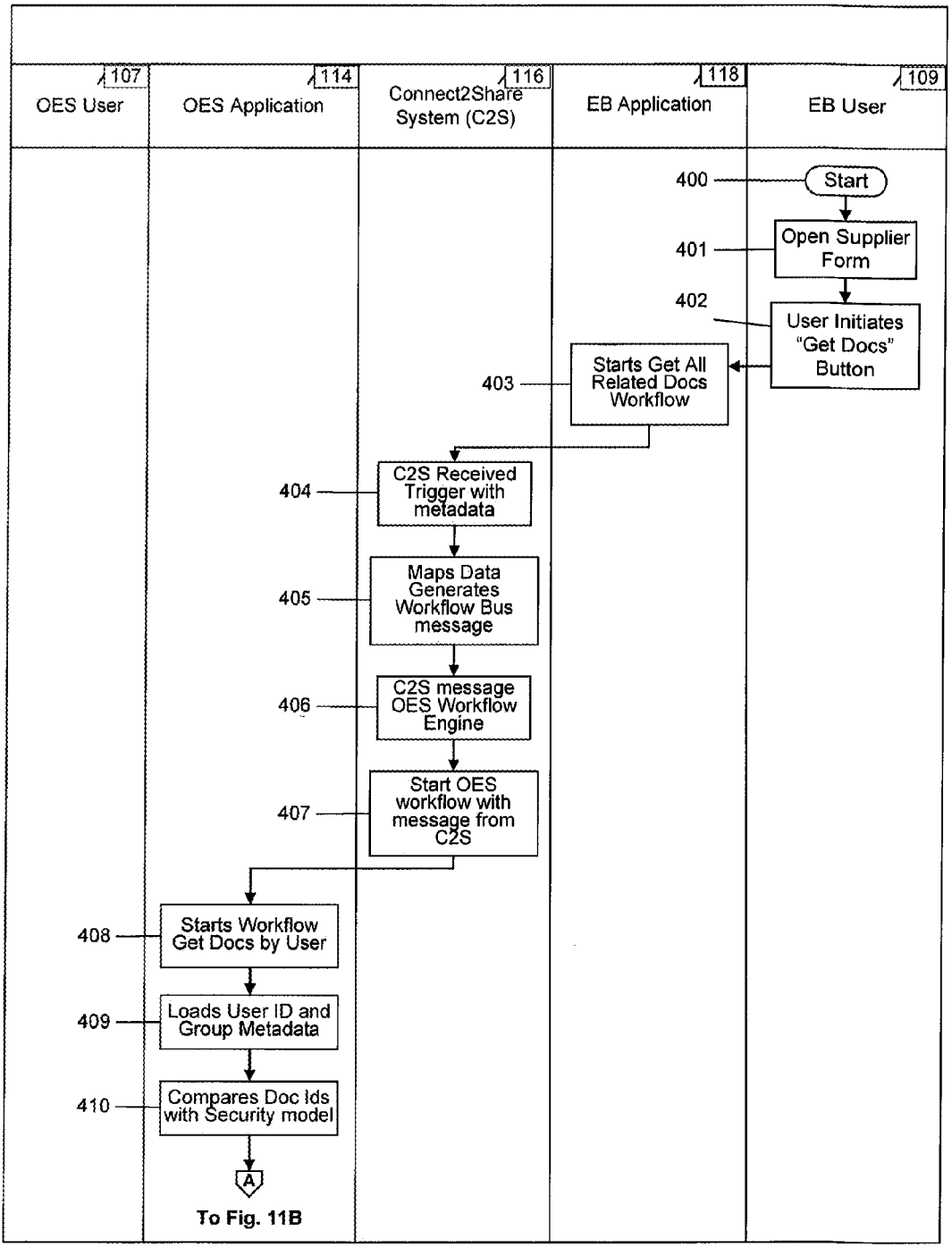
FIGS. 11A-11E illustrate an example of a workflow for an indicated use case.
Figure 11B:
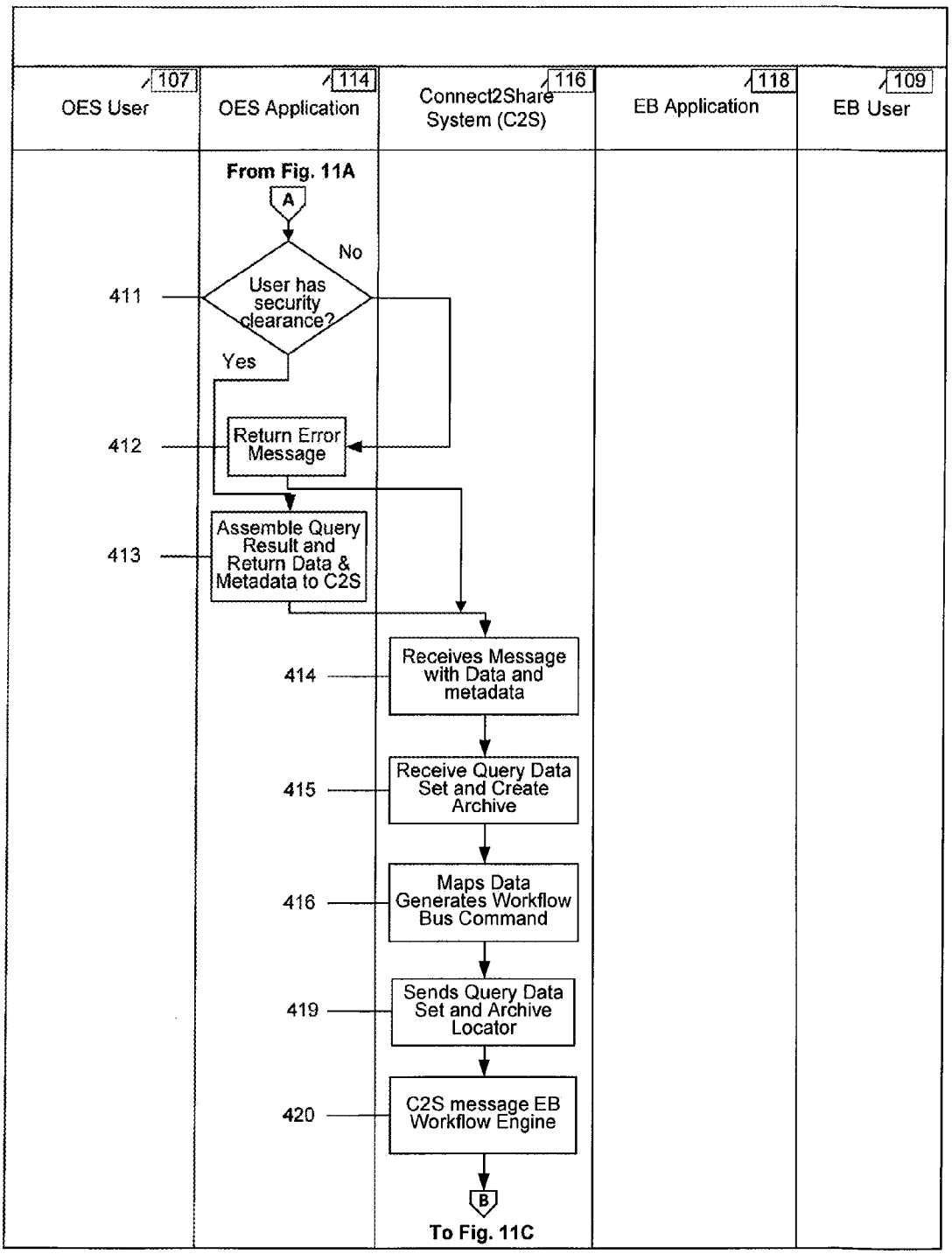
Figure 11C:
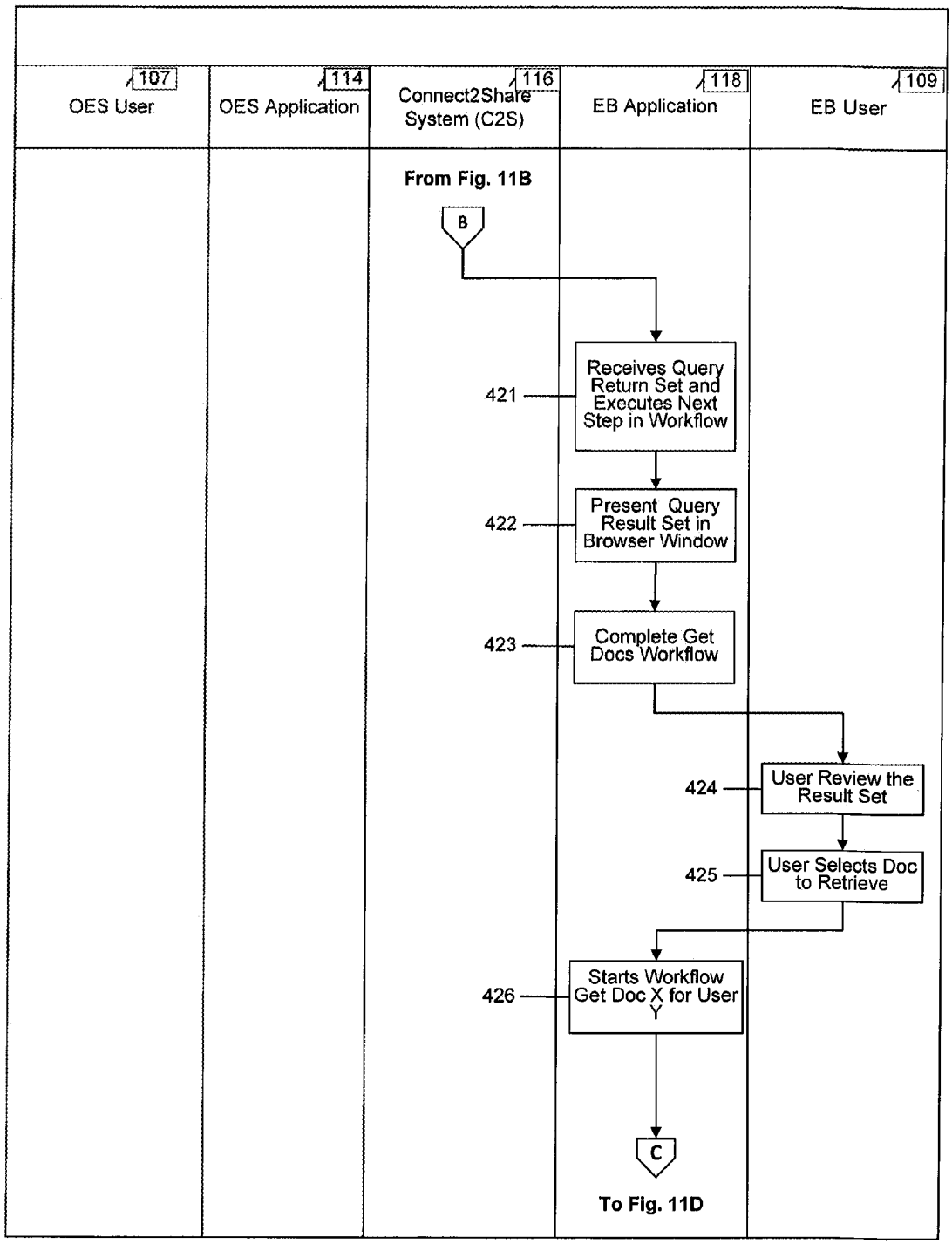
Figure 11D:
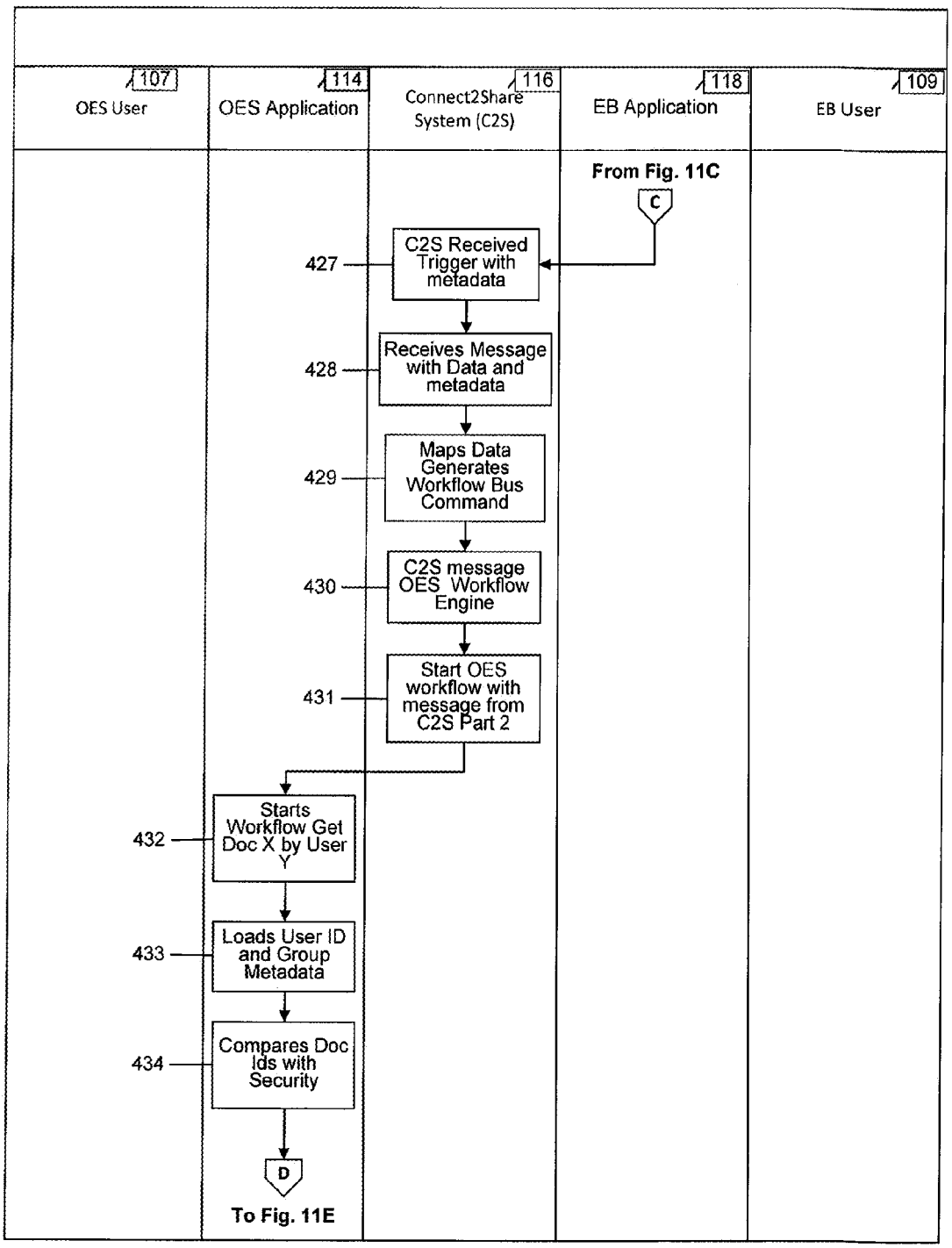
Figure 11E:
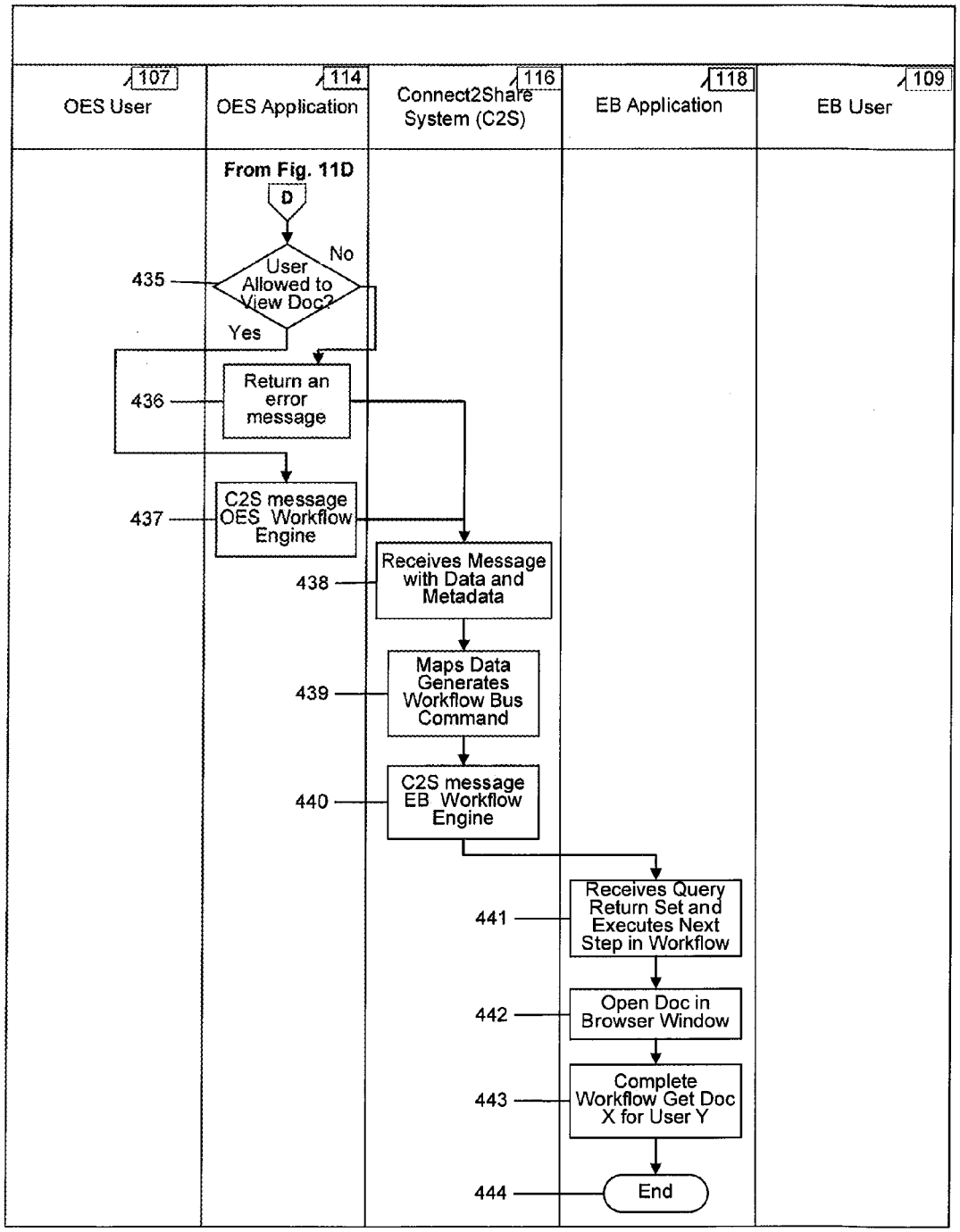

The example workflow begins in FIG. 11A on EB User System 109, with the user beginning the process "Start" 400 by initiating an "Open Supplier Form" 401 command and then selecting a C2S custom icon "Get Docs Button" 402. The EB application 118 then performs a "Starts Get All Related Docs Workflow" 403 (e.g., via a secure communication from the EB application 118 to the C2S system that is controlled by one or more Workflow Bus modules of the C2S system). The C2S system 116 then performs "C2S Received Trigger with metadata" 404, optionally performing translation of the data, metadata and commands and/or performing security validation operations, and then performs "Maps Data Generates Workflow Bus message" 405, "C2S message OES Workflow Engine" 406, and "Start OES workflow with message from C2S" 407 (e.g., via a secure communication to the OES application 114 that is controlled by one or more Workflow Bus modules of the C2S system). The OES application 114 then performs "Starts Workflow Get Docs by User" 408, "Loads User ID and Group Metadata" 409, and "Compares Doc Ids with Security model" 410. The OES application 114 then continues to perform the question "User Has Security Clearance?" 411. If a No determination is made, the OES application 114 performs "Send Error Message" 412, while if a Yes determination is made, the OES application 114 performs "Assemble Query Result and Return Data & Metadata to C2S" 413 (e.g., via a secure communication to the C2S system that is controlled by one or more Workflow Bus modules of the C2S system). The C2S system 116 then performs "Receives Message with Data and metadata" 414, "Receive Query Data Set and Create Archive" 415, optionally performing translation of the data, metadata and commands and/or performing security validation operations, and then performs "Maps Data Generates Workflow Bus Command" 416, "Sends Query Data Set and Archive Locator" 419, and "C2S message EB Workflow Engine" 420 (e.g., via a secure communication to the EB application 118 that is controlled by one or more Workflow Bus modules of the C2S system).

The EB application 118 then performs "Receives Query Return Set and Executes Next Step in Workflow" 421, "Present Query Result Set in Browser Window" 422, and "Complete Get Docs Workflow' 423. The EB user then uses the EB application computing system to participate in "User Review the Result Set' 424 and 'User Selects Doc to Retrieve' 425. The EB application 118 then performs 'Starts Workflow Get Doc X for User Y' 426 (e.g., via a secure communication to the C2S system that is controlled by one or more Workflow Bus modules of the C2S system). The C2S system 116 then performs "C2S Received Trigger with metadata" 427, "Receives Message with Data and metadata" 428, optionally performing translation of the data, metadata and commands and/or performing security validation operations, and then performs "Maps then Data Generates Workflow Bus message" 429, "C2S message OES Workflow Engine" 430, and "Start OES workflow with message from C2S" 431 (e.g., via a secure communication to the OES application 114 that is controlled by one or more Workflow Bus modules of the C2S system). The OES application 114 then performs 'Starts Workflow Get Doc X by User Y" 432, "Loads User ID and Group Metadata 433", and then "Compares Doc Ids with Security' 434. The OES application 114 then performs the question "Is User allowed to view the doc?" 435, and then, if a No determination is made, "Return an Error Message" 436, or if a Yes determination is made, "Allow Doc Query to Generate and C2S Message OES Workflow engine" 437 (e.g., via a secure communication to the C2S system that is controlled by one or more Workflow Bus modules of the C2S system). The C2S system 116 then performs "Receives Message with Data and Metadata" 438, optionally performing translation of the data, metadata and commands and/or performing security validation operations, and then performs "Maps Data then Generates Workflow Bus Command' 439, and C2S message EB Workflow Engine" 440 (e.g., via a secure communication to the EB application 118 that is controlled by one or more Workflow Bus modules of the C2S system). The EB application 118 then performs "Receives Query Return Set and Executes Next Step in Workflow" 441, "Open Doc in Browser Window" 442, "Complete Workflow Get Doc X for User Y" 443, and then "End" 444.

This example integrated workflow of FIGS. 11A-11E illustrates how the productivity of users can be enhanced by allowing them to use a simple web browser to access complex documents in an OES application(s) keyed to master data records in the EB application, while maintaining security and compliance rules about document access.

As a further use case, consider an example of creating a new supplier in an Oracle-based EB application by interacting with the C2S system and one or more OES applications. An example workflow corresponding to this example is illustrated in FIGS. 12A-12D.

Figure 12A:
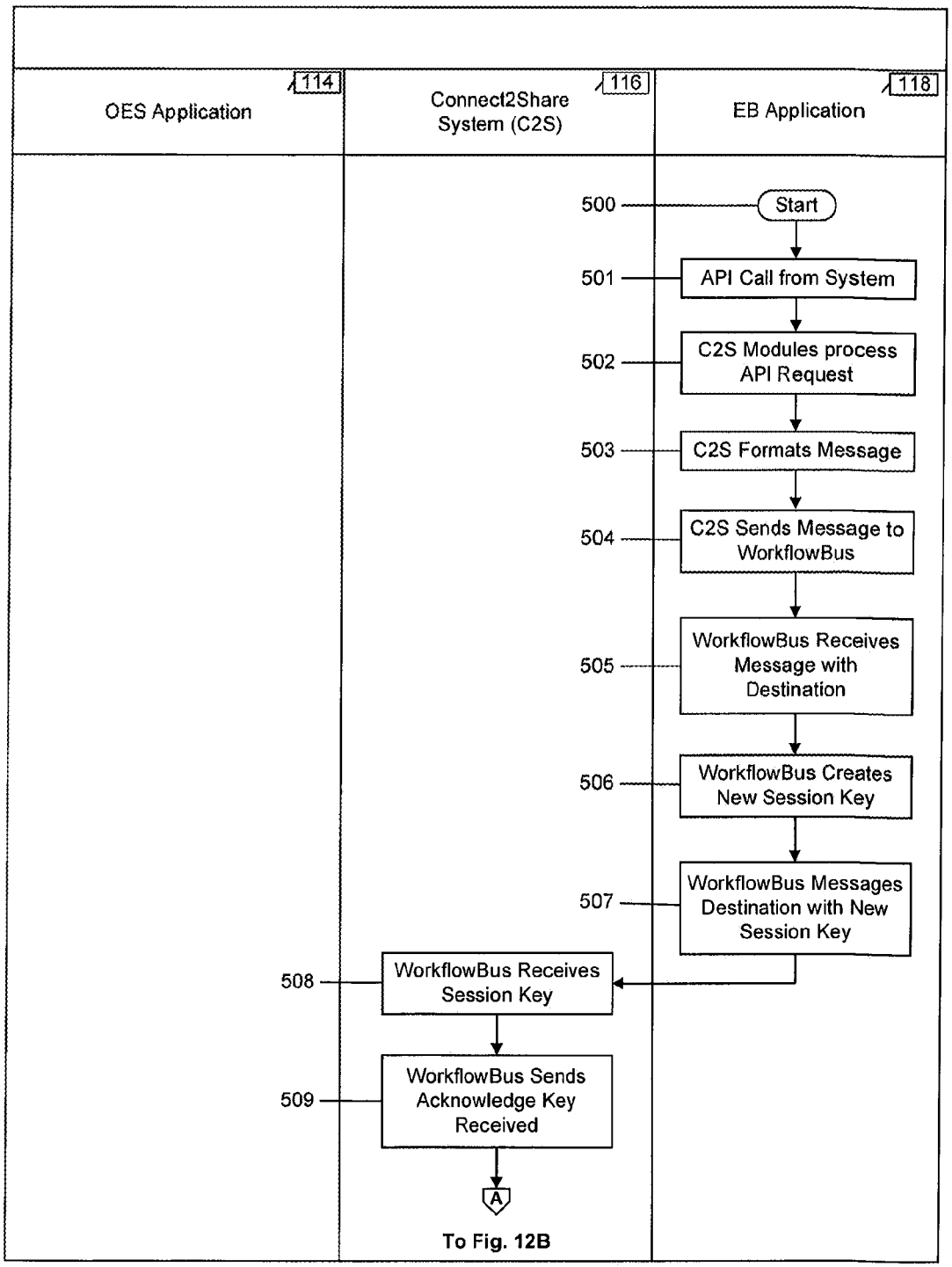
FIGS. 12A-12D illustrate an example of a workflow for an indicated use case.
Figure 12B:
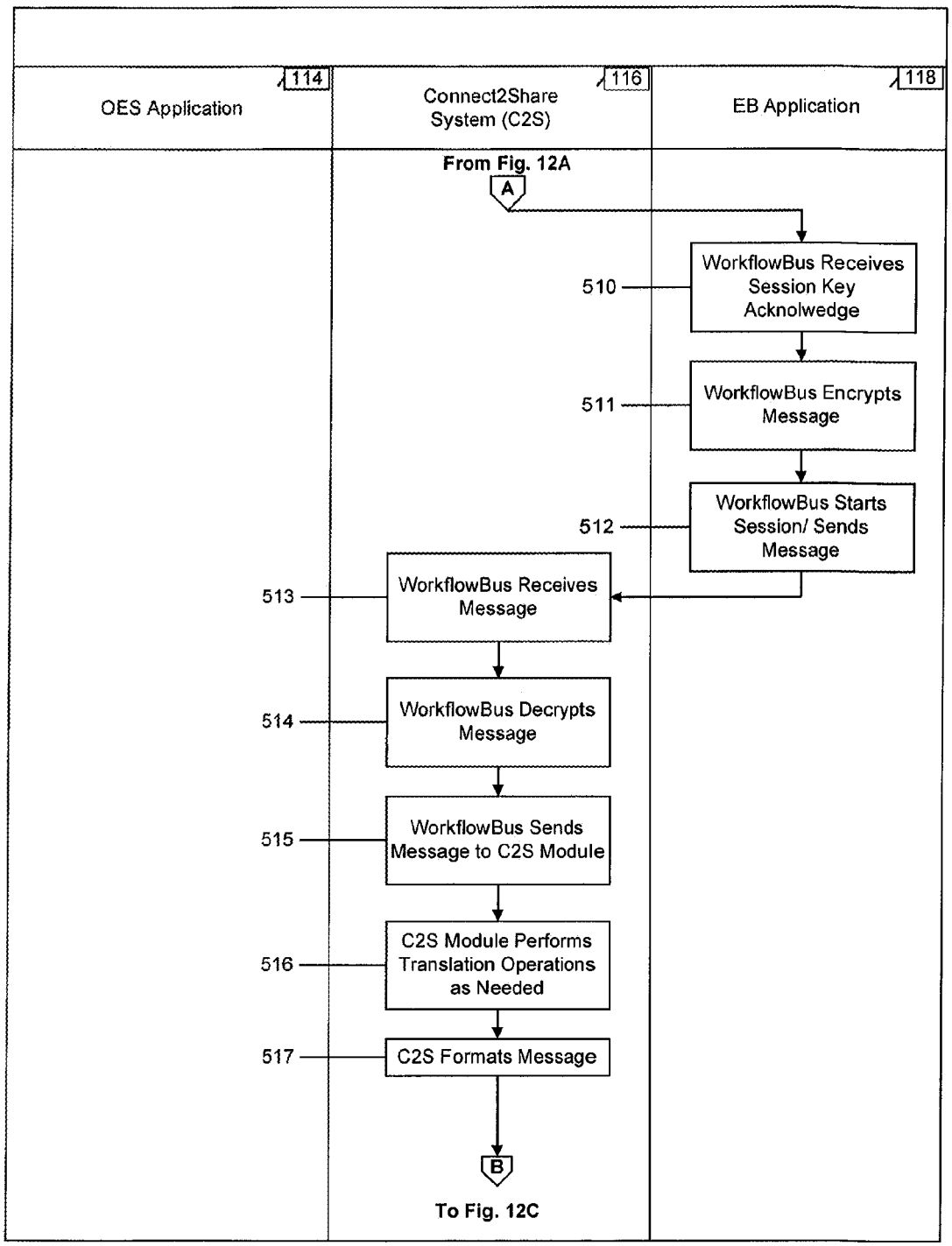
Figure 12C:
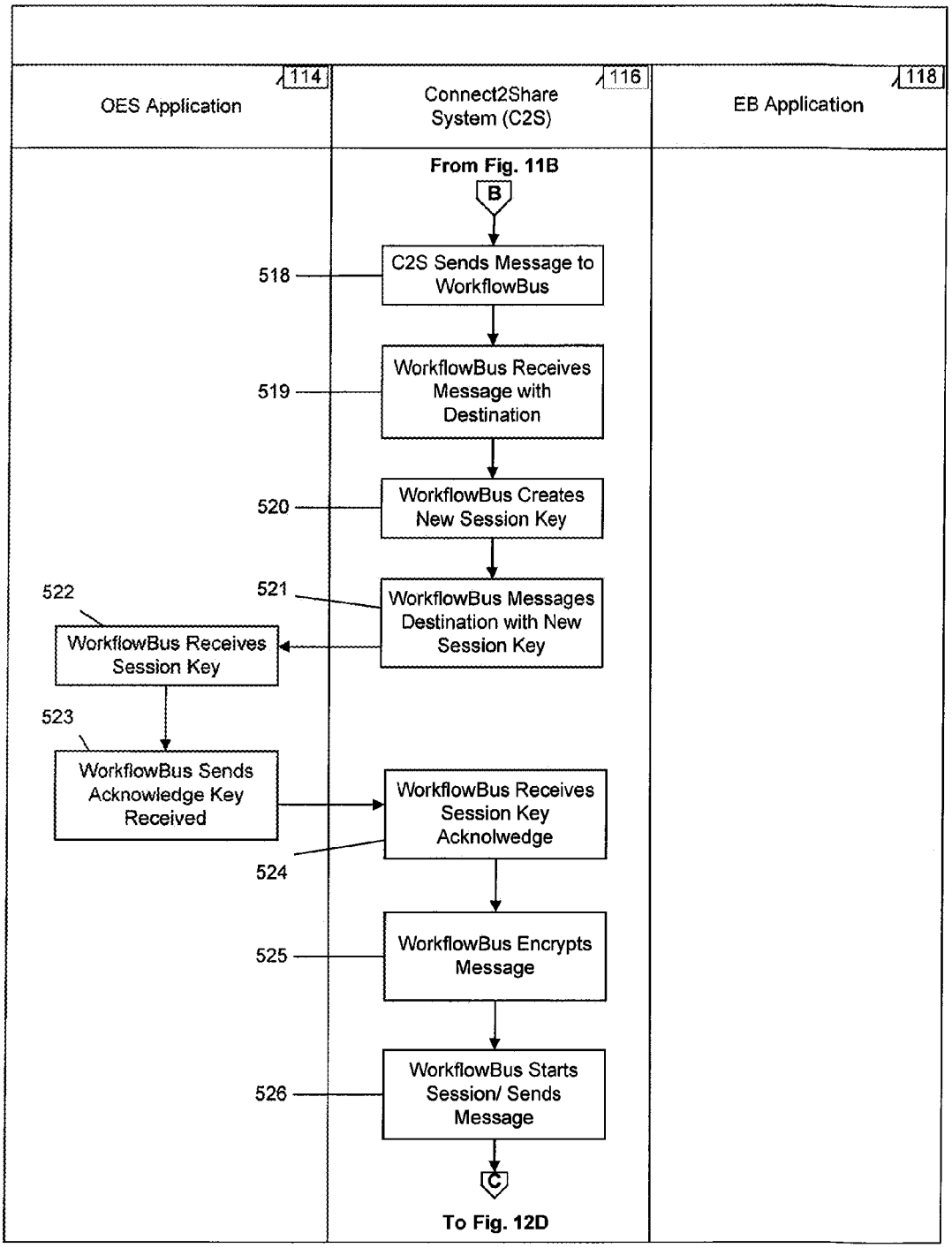
Figure 12D:
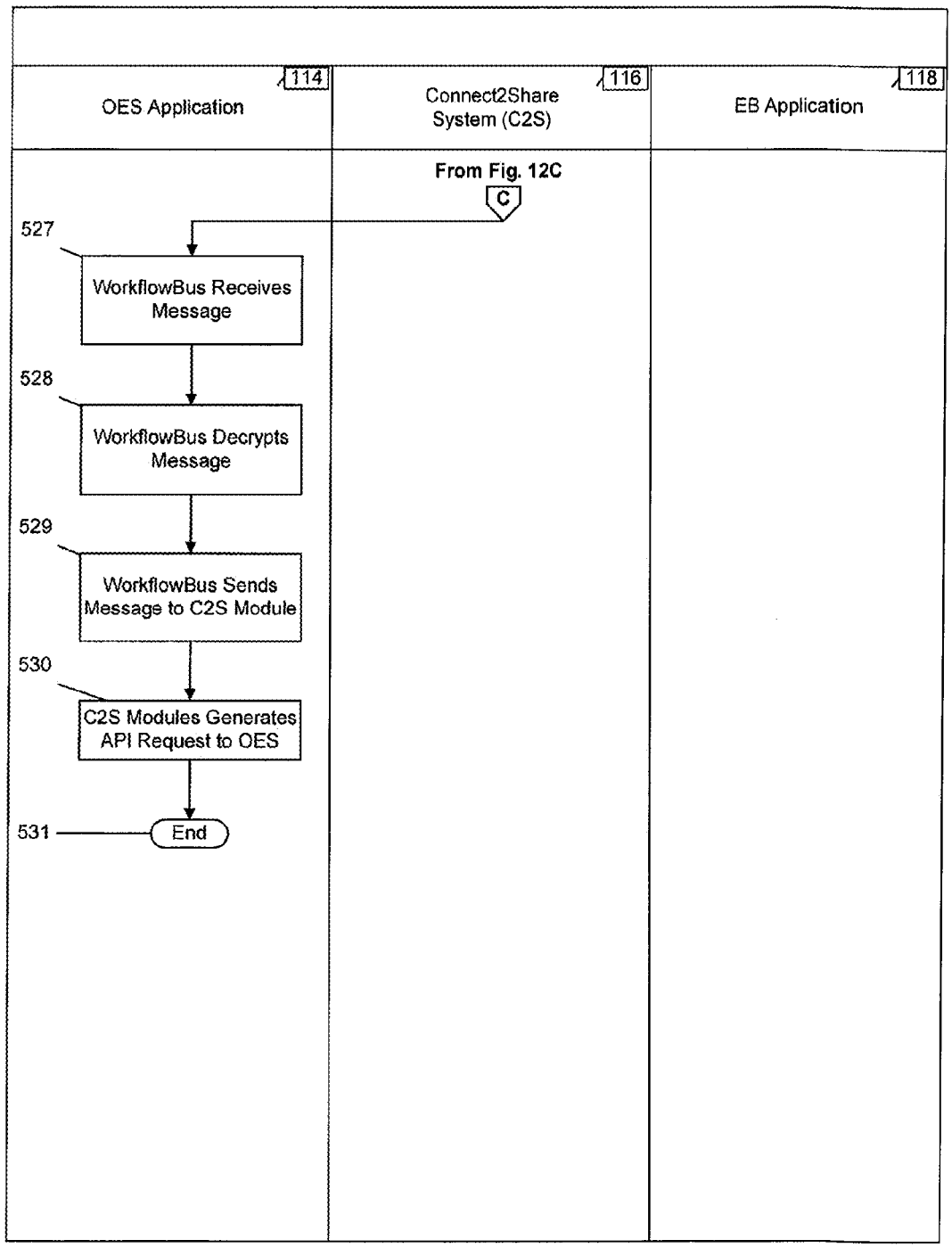

The example workflow begins in FIG. 12A on the EB application 118, which performs "Start" 500 and "API Call from System" 501. The computing system executing the EB application 118 then performs (e.g., by one or more C2S modules executing on the computing system and integrated with the EB application 118) "C2S Modules process API request" 502, "C2S Formats Message" 503, "C2S Sends Message to Workflow Bus" 504, "Workflow Bus Receives Message with Destination" 505, "Workflow Bus Creates New Session Key" 506, and "Workflow Bus Messages Destination New Session Key" 507. The separate computing system executing one or more modules of the C2S system 118 then performs "Workflow Bus Receives New Session Key" 508 and "Workflow Bus Sends Acknowledge Key Received" 509.

The EB application 118 then performs "Workflow Bus Receives Session Key Acknowledge" 510, "Workflow Bus Encrypts Message" 511, and "Workflow Bus Starts Session and Sends Message" 512 (e.g., via a secure communication to the C2S system that is controlled by one or more Workflow Bus modules of the C2S system). The C2S system 116 then performs "Workflow Bus Receives Message" 513, "Workflow Bus Decrypts Message" 514, "Workflow Bus Sends Message to C2S Module" 515, "C2S Module Performs Translation Operations as needed" 516, optionally performing translation of the data, metadata and commands and/or performing security validation operations, and then performs "C2S Formats Message" 517, "C2S Sends Message to Workflow Bus" 518, "Workflow Bus Receives Message with Destination" 519, "Workflow Bus Creates New Session Key" 520, and then "Workflow Bus Messages Destination New Session Key" 521 (e.g., via a secure communication to the OES application 114 that is controlled by one or more Workflow Bus modules of the C2S system). The computing system executing the OES application 114 then performs (e.g., by one or more C2S modules executing on the computing system and integrated with the OES application 114) "Workflow Bus Receives New Session Key" 522 and "Workflow Bus Sends Acknowledge Key Received" 523. The C2S system 116 then performs "Workflow Bus Receives Session Key Acknowledge" 524, "Workflow Bus Encrypts Message" 525, and then "Workflow Bus Starts Session and Sends Message' 526.

The OES application 114 then proceeds to perform "Workflow Bus Receives Message" 527, "Workflow Bus Decrypts Message" 528, "Workflow Bus Sends Message to C2S Module" 529, "C2S Module Generates API Request to OES" 530, and then "End" 531.

This example integrated workflow of FIGS. 12A-12D interactions between an OES application and an EB application at the workflow-to-workflow level using encrypted point-to-point communication sessions.

As previously noted, various embodiments of the IW Inter-Connector system may provide a various of benefits, with a non-exclusive list of example benefits including the following:

Total Workflow Transparency, with seamless workflow-enabled integration of diverse enterprise applications to automate and optimize business processes;

Risk Mitigation via fully integrated records storage, retrieval and reporting;

Provides Traceability & Accountability, including supporting compliance requirements;

Connect and transform diverse "data silos' into consolidated streams of dynamic information, that are transparent, accessible, and usable;

Maximize the return on new corporate strategy investments with effective and efficient data deployment tactics;

Accelerated Master Data Deployment;

Real-time Document Access at Oracle Master & Transaction Record Level;

Streamline Multi-Level Intra-Department Operations;

Integrated Reporting Across Business Process Applications;

Increase measurable productivity and reduce human errors;

Outsource portions of business processes to appropriate technologies;

Eliminate human error associated with duplicate data entry and unauthorized "short cuts"; and Support the development of long term strategic goals by using tactical processes.

Figure 9B:
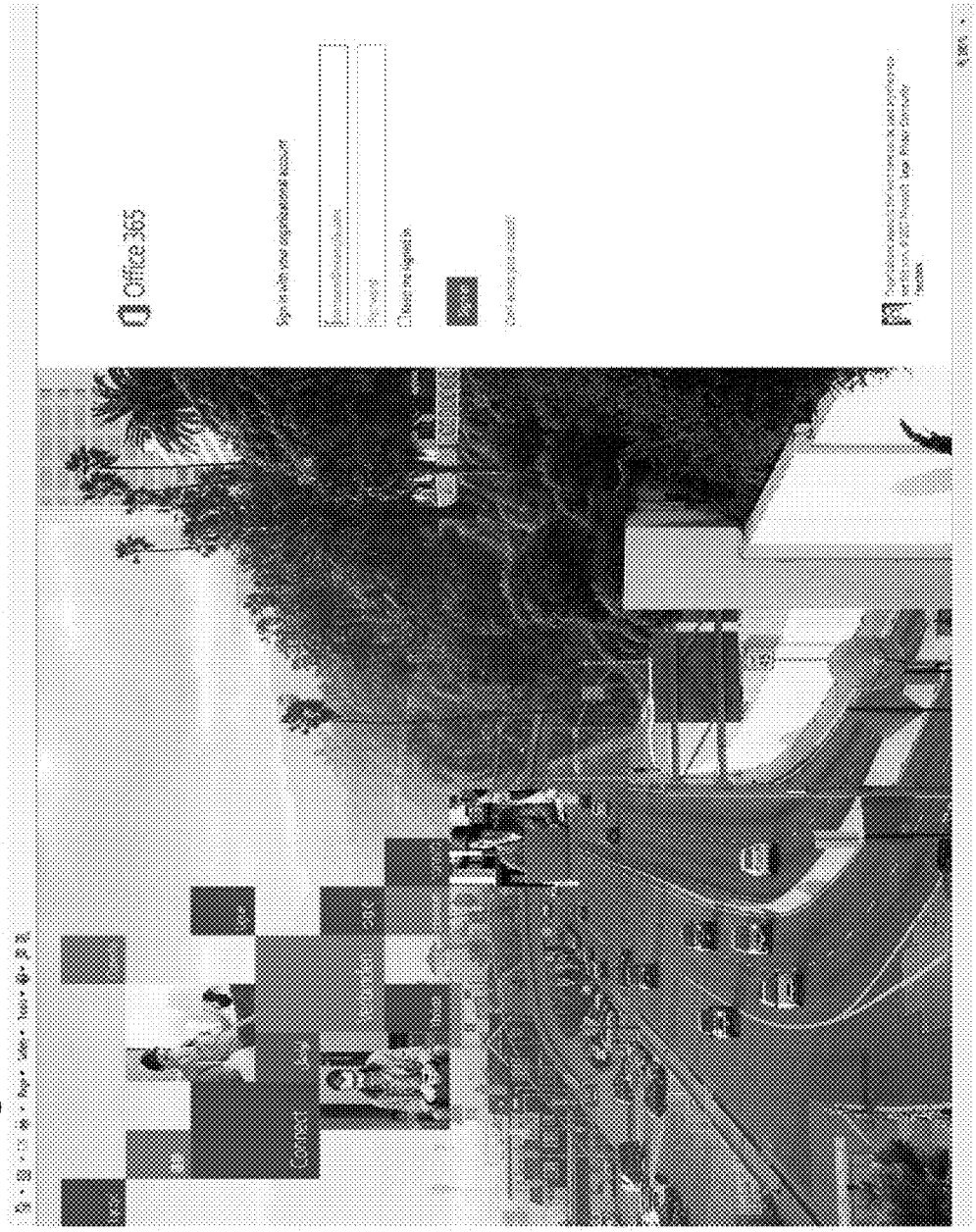
FIGS. 9A-9Q illustrate examples of how to setup and use particular example software applications.
Figure 9C:
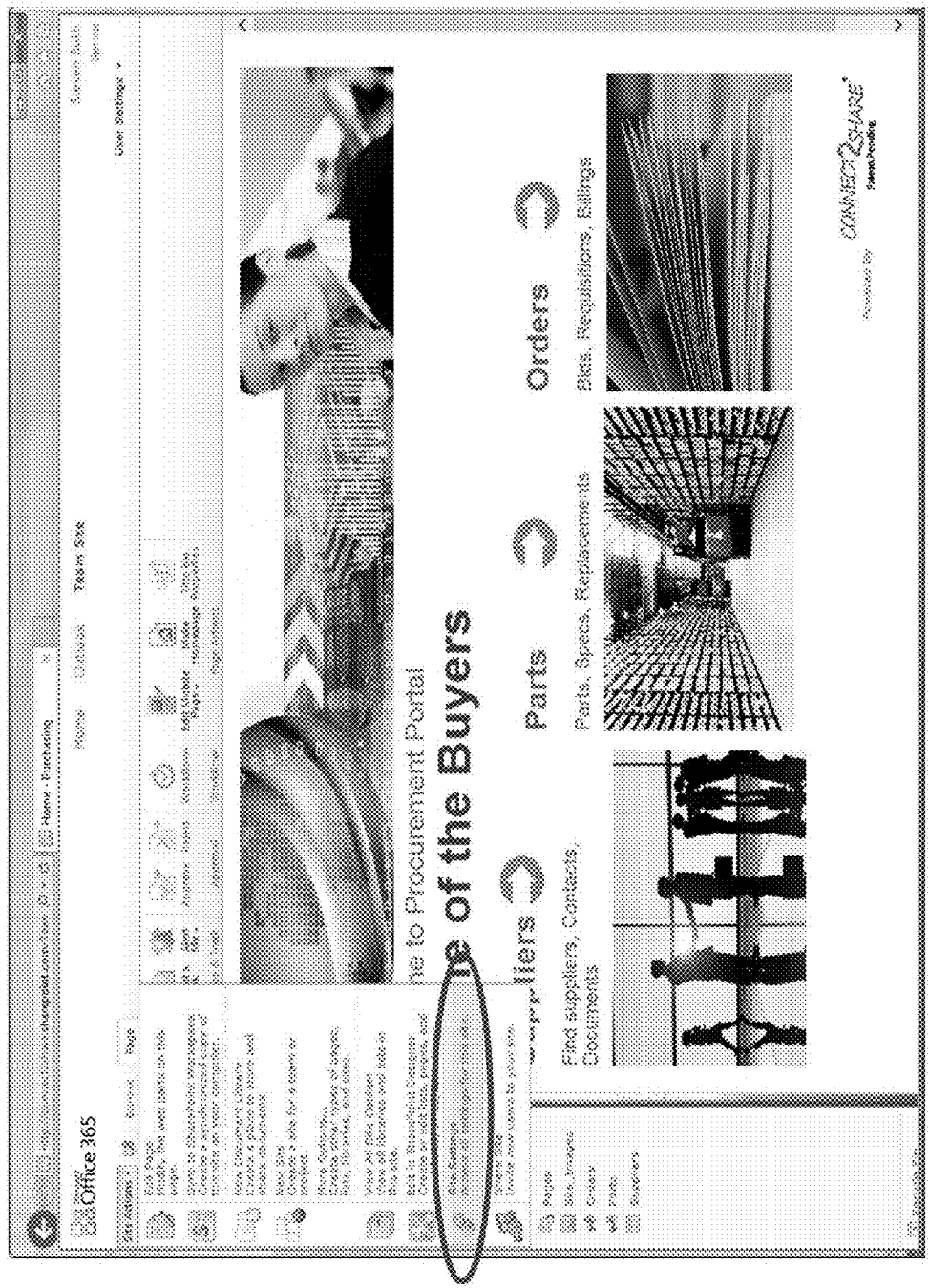
Figure 9D:
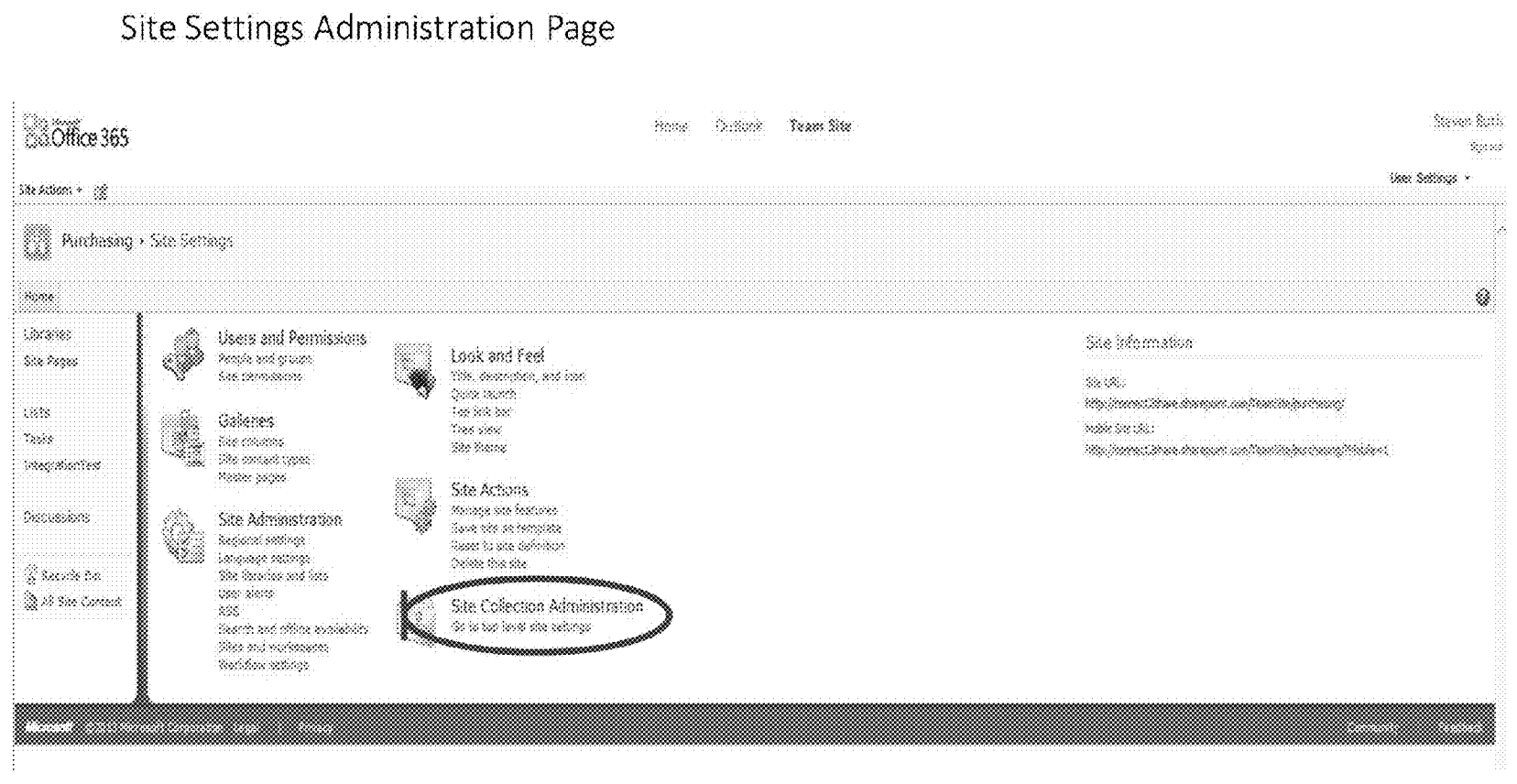
Figure 9F:
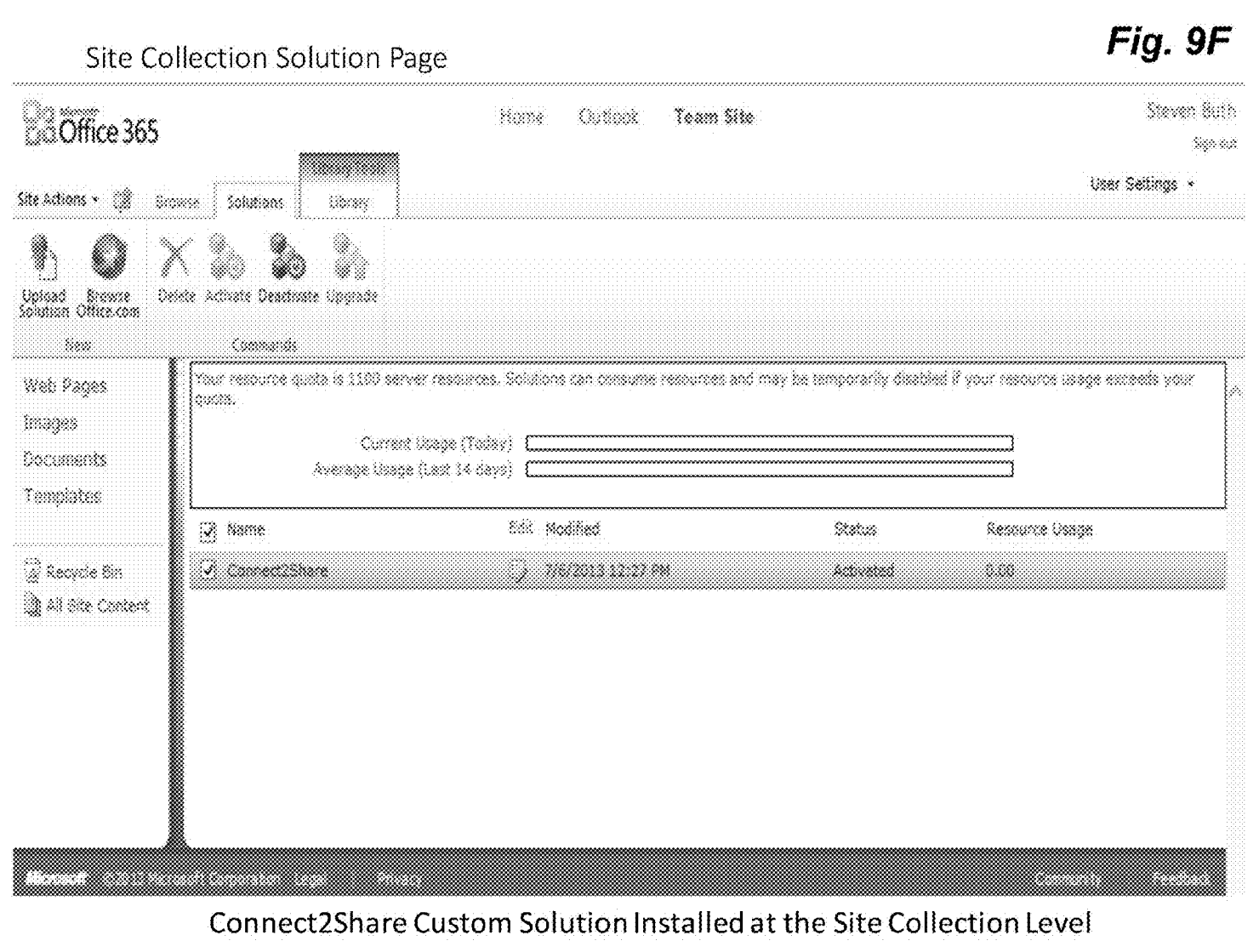
Figure 9G:
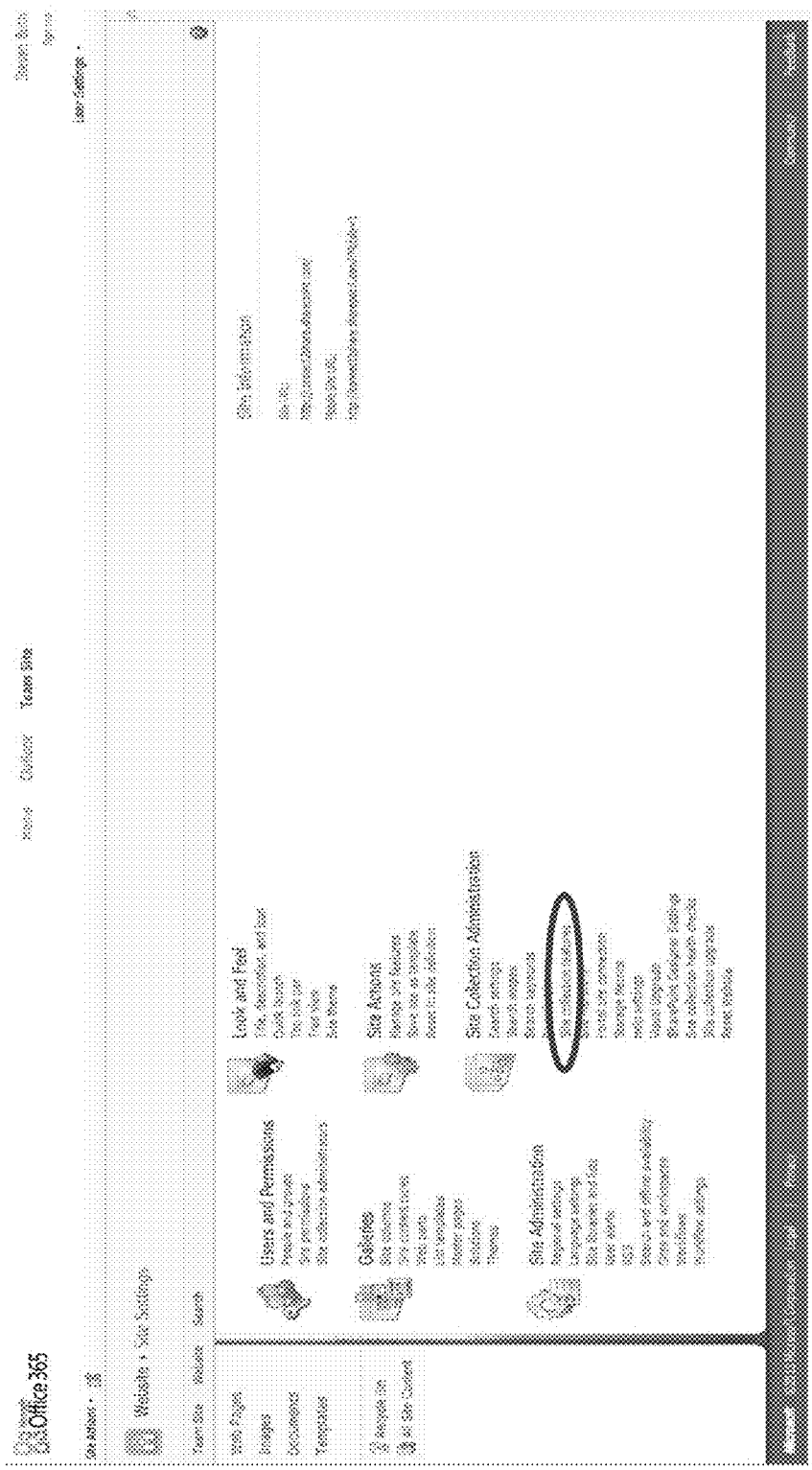
Figure 9H:
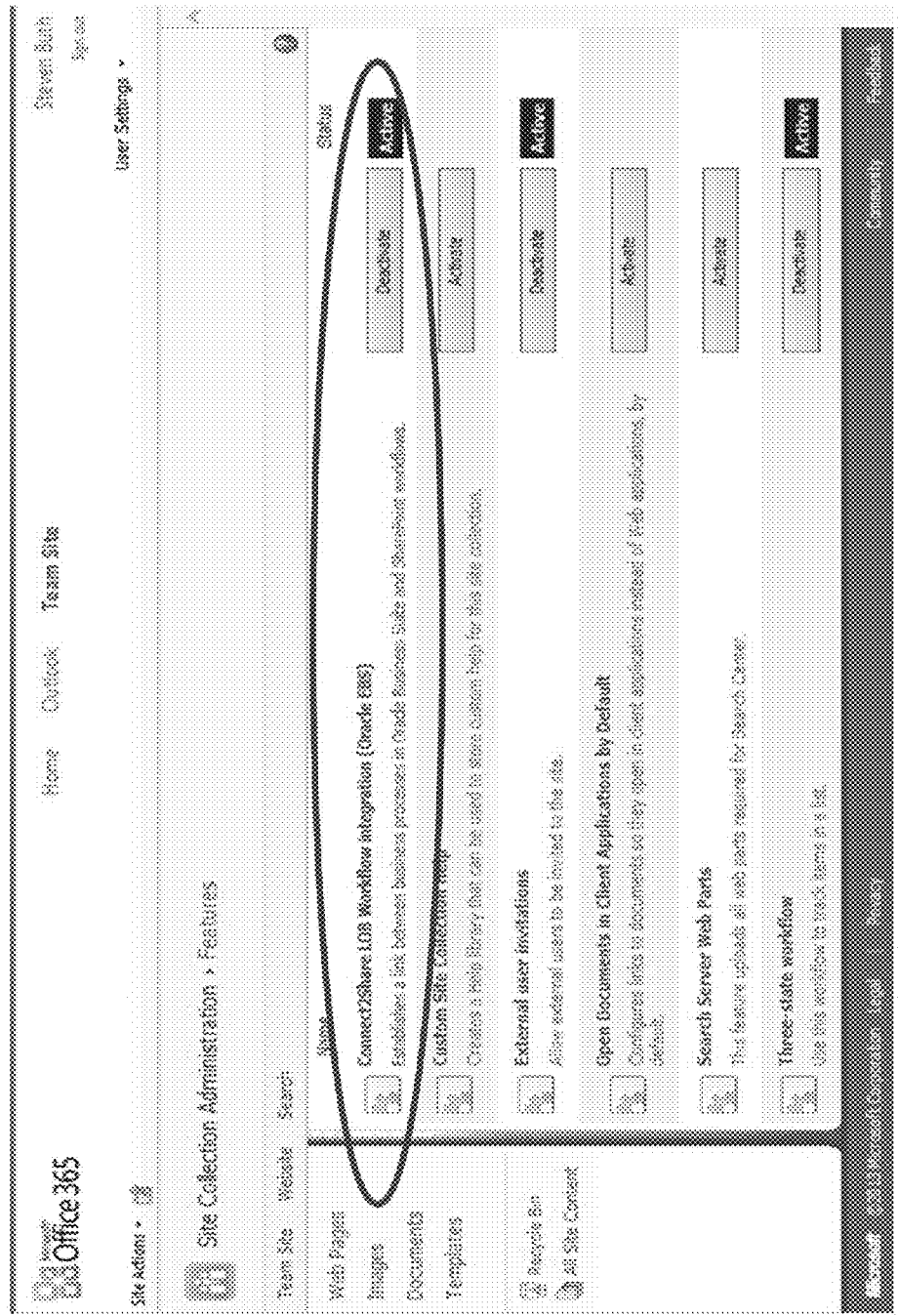
Figure 9J:
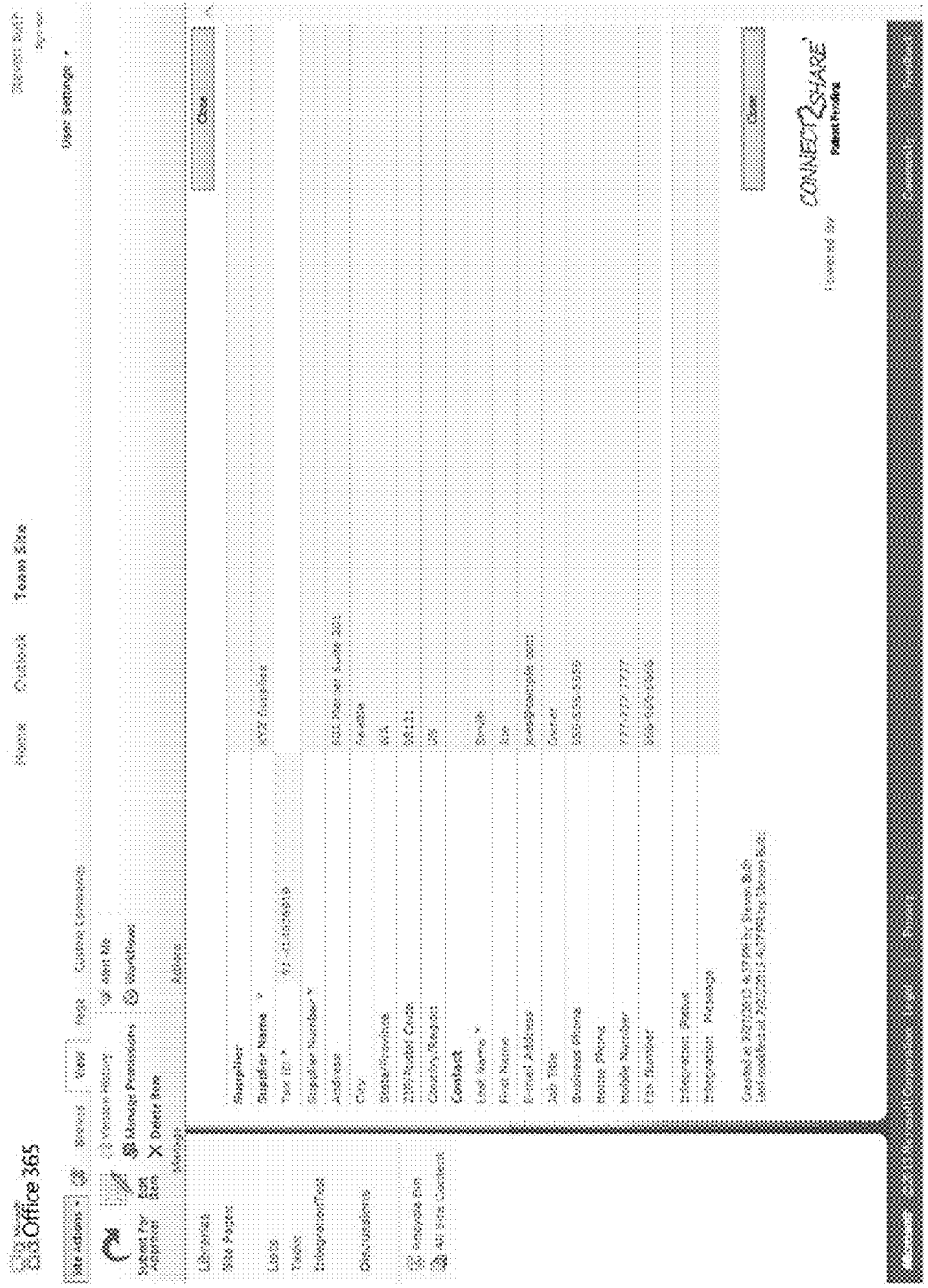
Figure 9K:
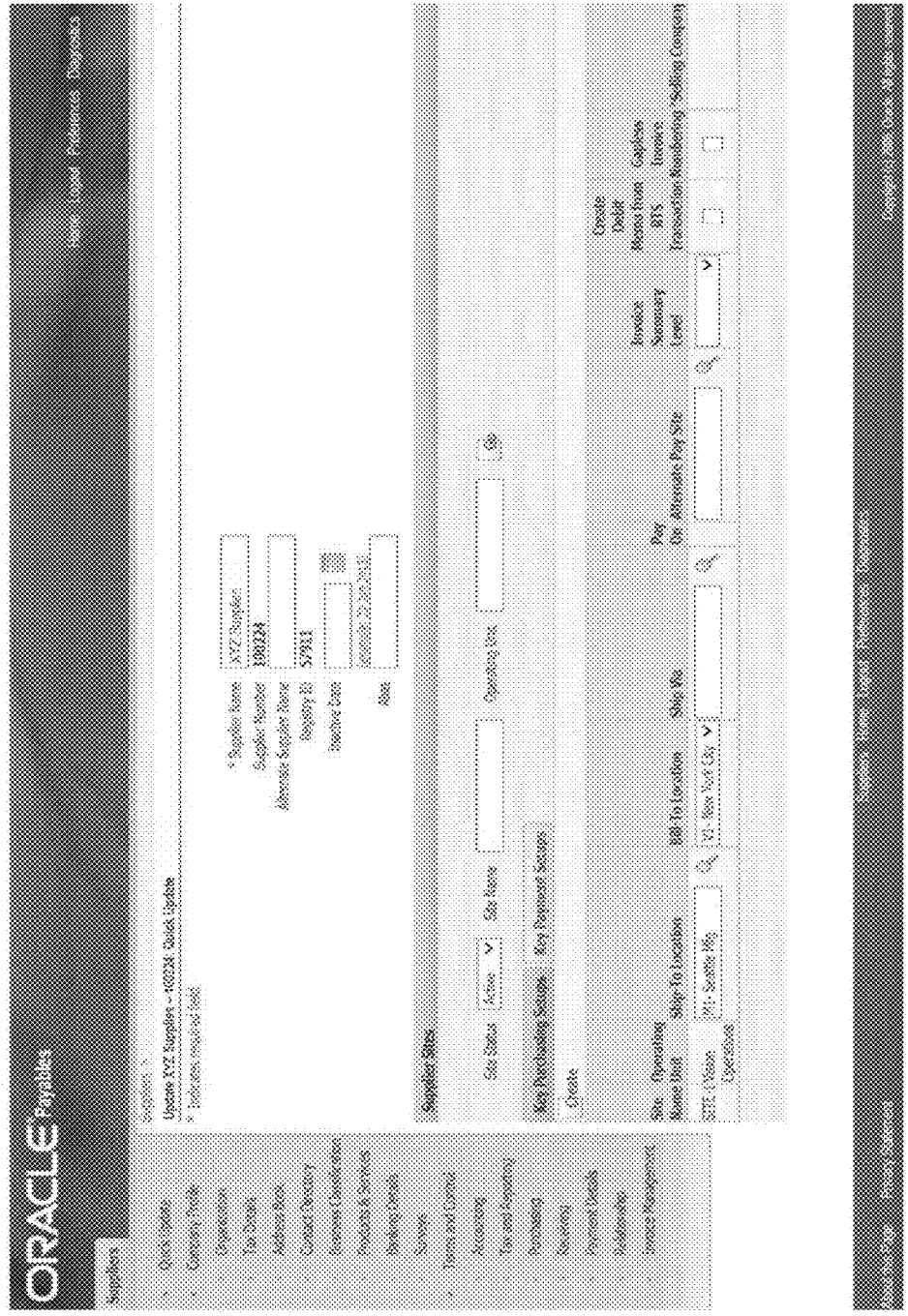
Figure 9M:
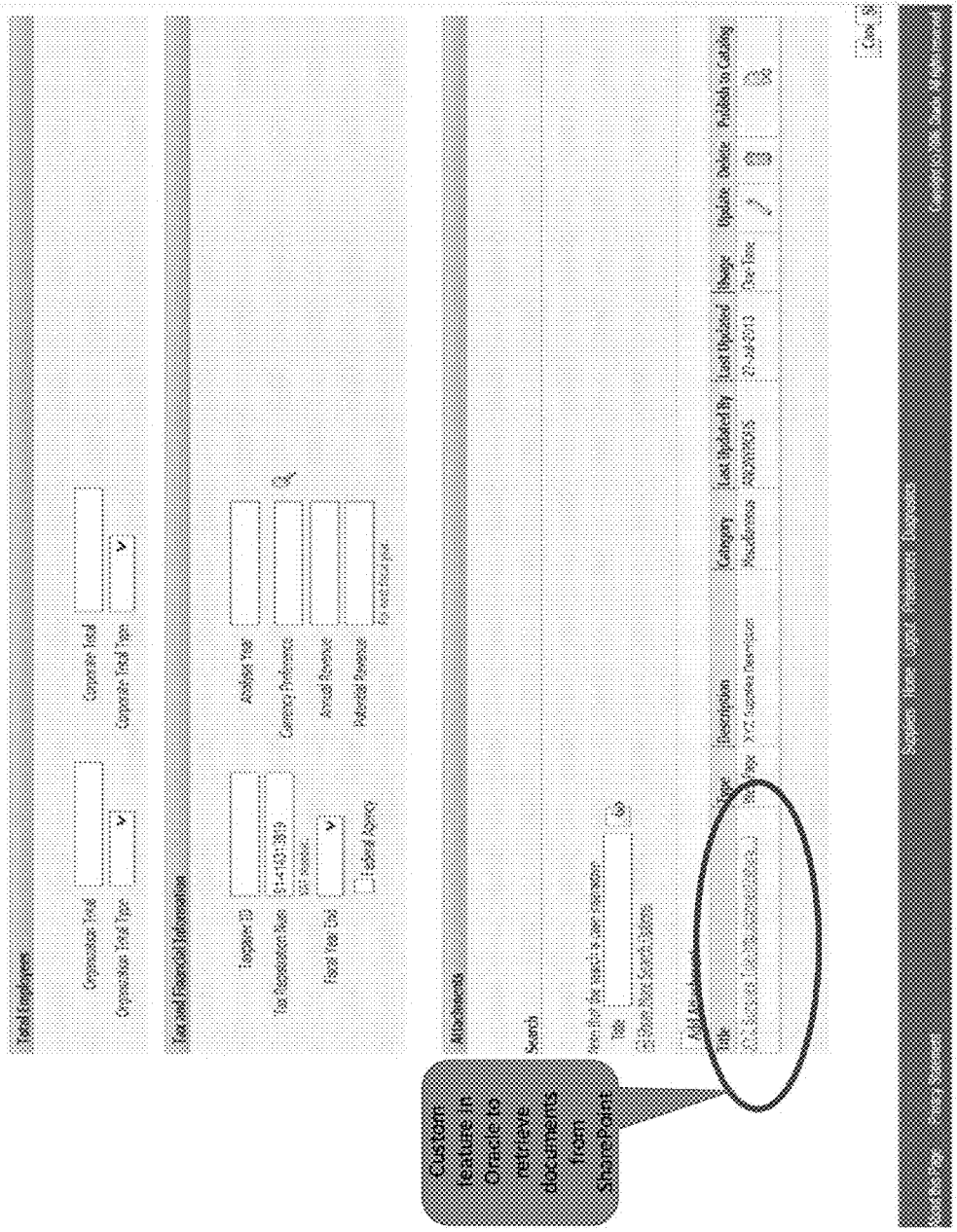
Figure 9N:
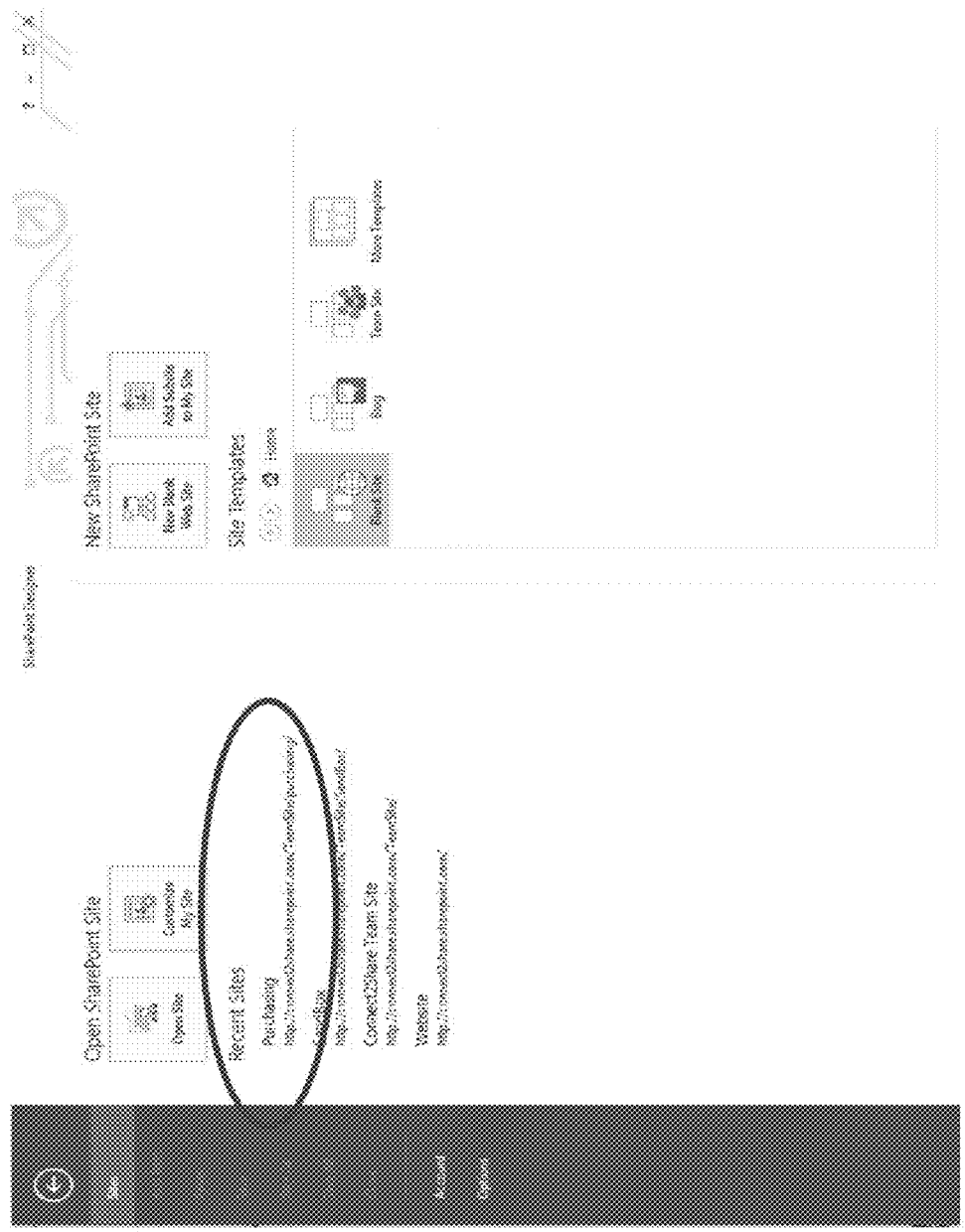
Figure 9O:
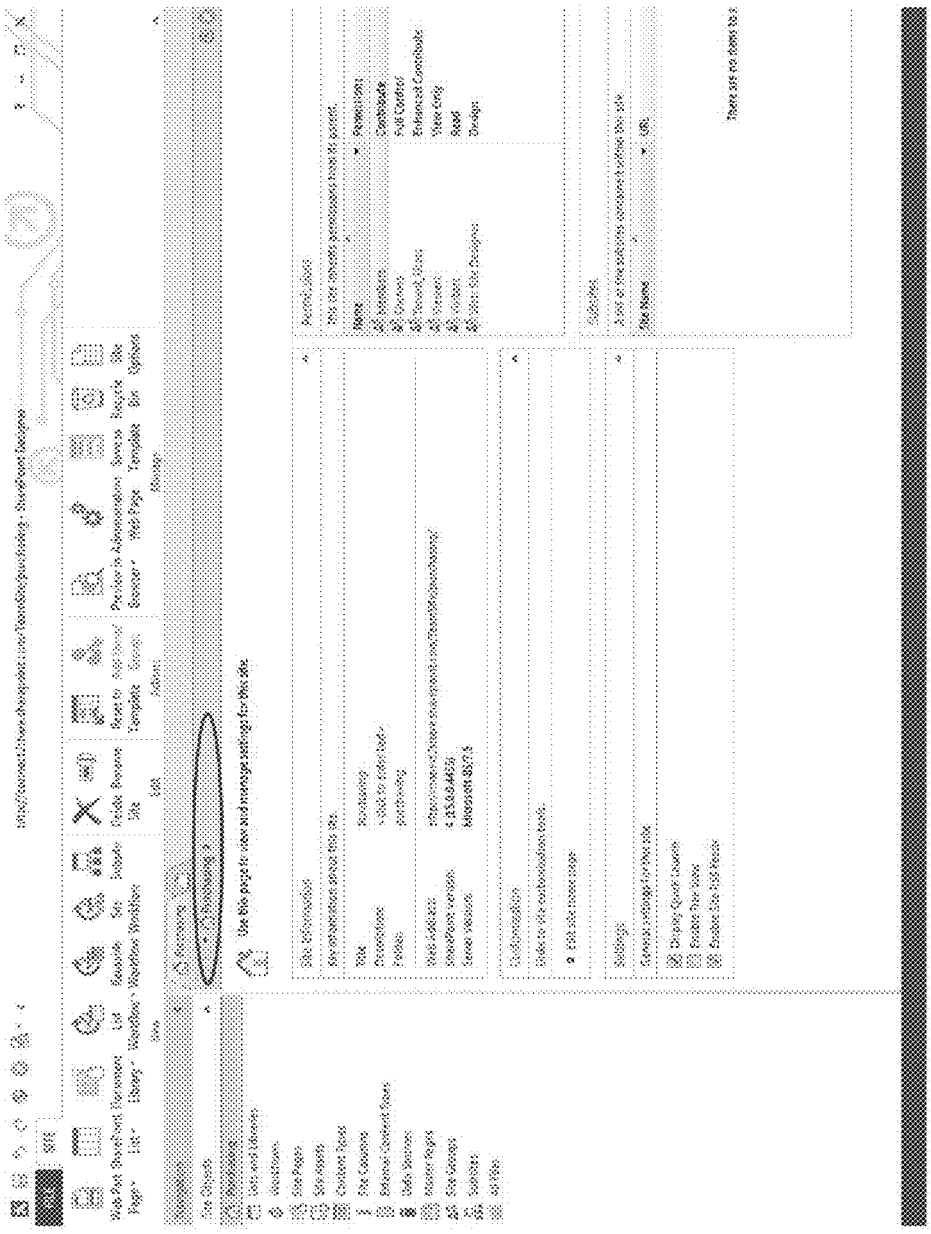
Figure 9P:
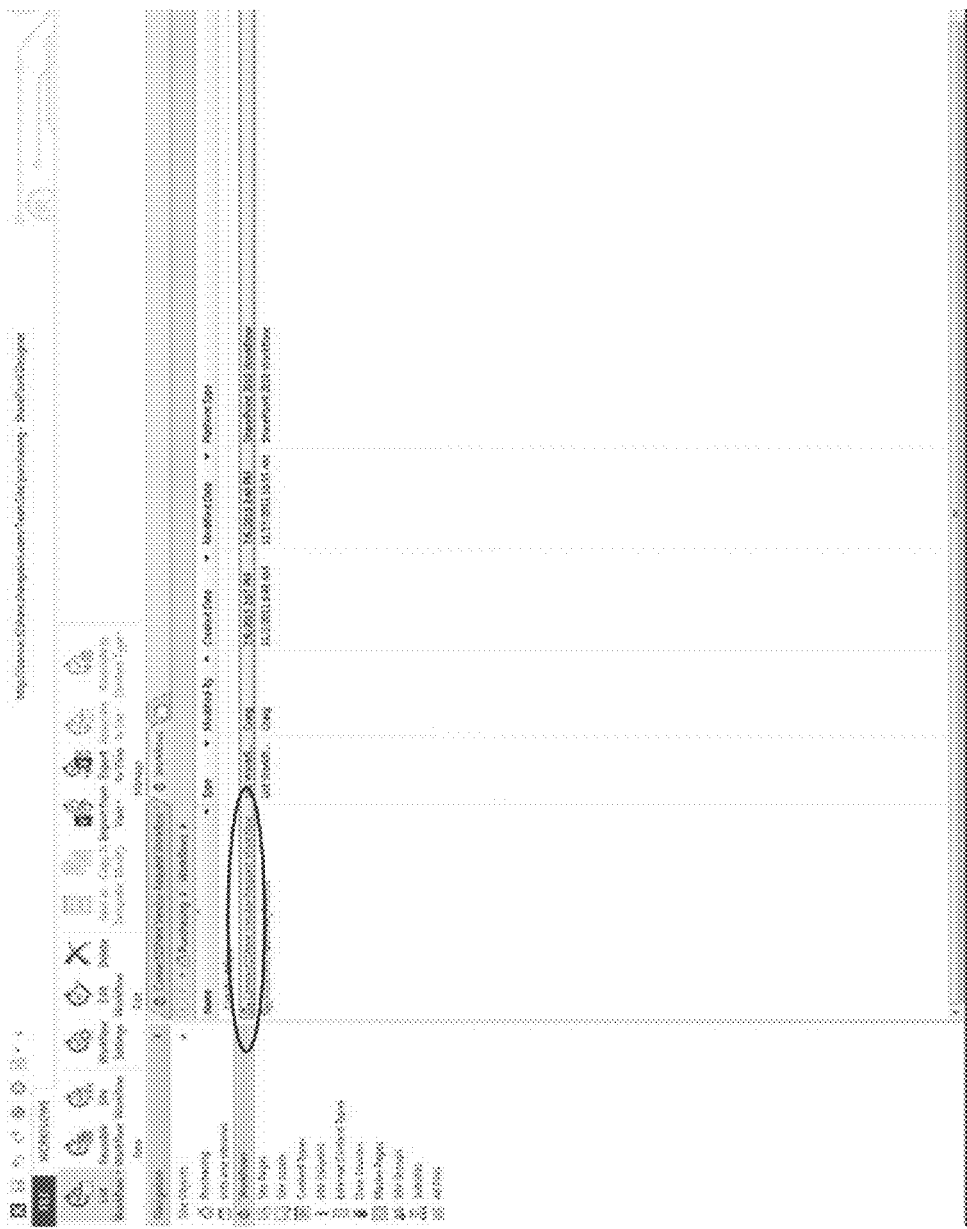
Figure 9Q:
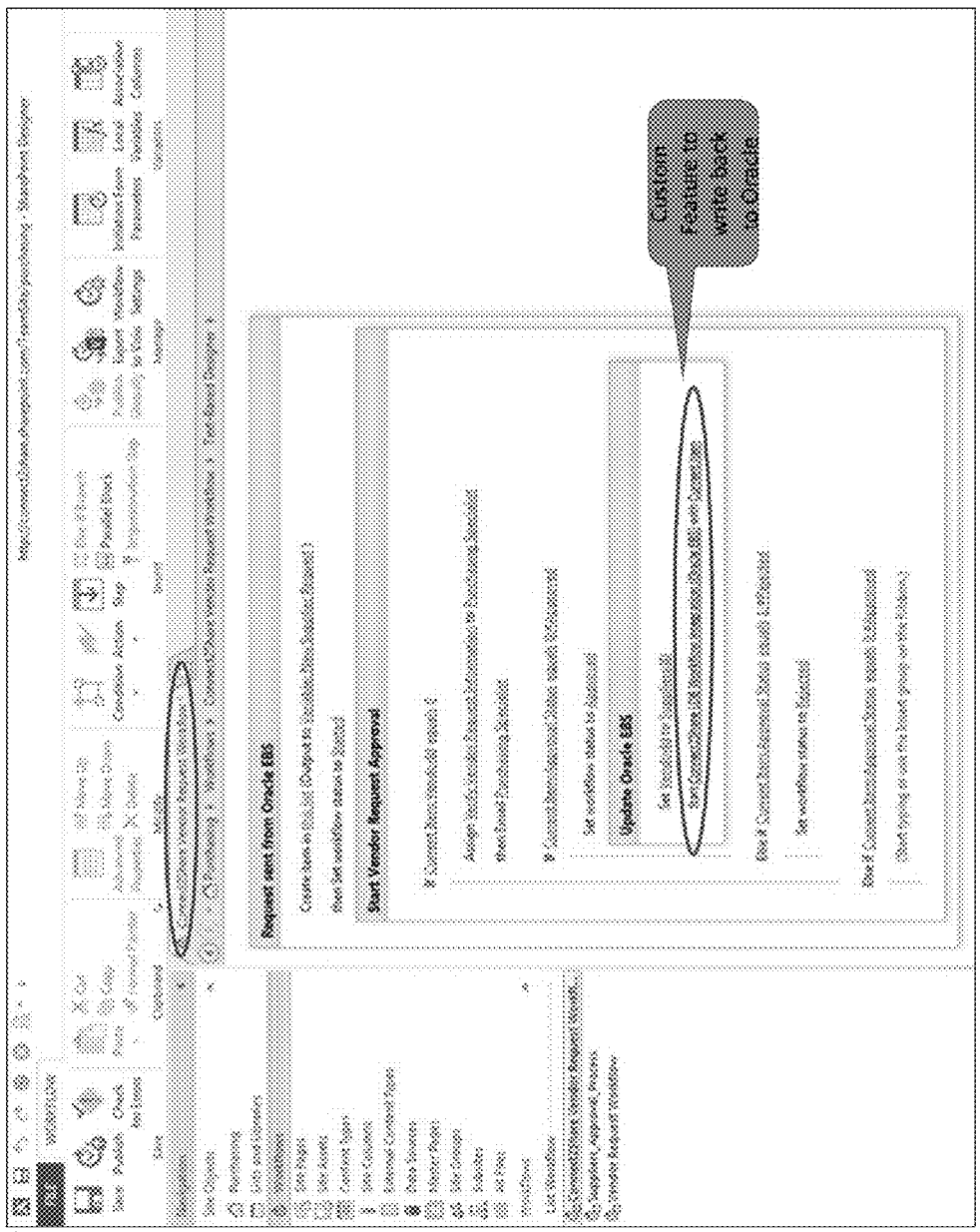

FIGS. 9A-9Q illustrate examples of how to setup and use particular example software applications. In particular, FIG. 9A describes how to install an OES application embodiment provided by an online version of SharePoint. FIG. 9B describes a login process for a SharePoint Administrator. FIG. 9C illustrates how selecting the highlighted/circled area takes the administrator into the configuration area for SharePoint add-ons. FIGS. 9D-9E illustrate how to get to a Site Collection Administration area, and FIG. 9F illustrates a selection for a C2S system being added into SharePoint to enhance functionality. FIGS. 9G-9H illustrate a confirmation of the location and activation for the C2S system's custom components.

FIG. 9I illustrates how a user of an OES application embodiment can fill out and save information for later use in an EB application, such as for a new supplier workflow in a manner to that described with respect to FIGS. 11A-11E. FIG. 9J then illustrates how the user of the OES SharePoint application can see the EB Oracle application information in SharePoint, and FIGS. 9K-9L illustrate that data created in SharePoint has now been instantiated into the Oracle system and can be seen and used by Oracle users.

FIG. 9M illustrates an example of how to create a workflow on the OES SharePoint application, which invokes an EB Oracle application workflow as part of the process, with SharePoint Designer having taken the Administrator user to the appropriate business process (in this example, "Purchasing"). FIG. 9N then shows how to select the Workflows area of the purchasing application, FIG. 9O illustrates selecting the Connect2Share Vendor Workflow, and FIGS. 9P-9Q illustrates steps within the workflow, including the interaction with the C2S system and the EB Oracle application workflow.

In some embodiments, the described techniques facilitate integration of different enterprise applications so that metadata residing on one application may be associated with another application. The techniques provide for identifying key transactions in enterprise applications, with metadata and processes residing in a different application. For these transactions, the functionality is provided in both systems to connect the metadata and processes.

It is desirable to programmatically associate metadata residing in existing software applications (e.g., Microsoft stack OES applications) with transactions in enterprise business applications to enhance productivity and extend business functionality, by leveraging the flexibility of everyday office tools. The described techniques are directed to associating metadata residing in an OES application (e.g., a multi-purpose Web-based platform that allows for managing and provisioning of intranet portals, extranets and websites, document management and file management, collaboration spaces, social networking tools, enterprise search, business intelligence tooling, process/information integration, and third-party developed solutions) with transactional data residing in an enterprise business application.

Figure 14:
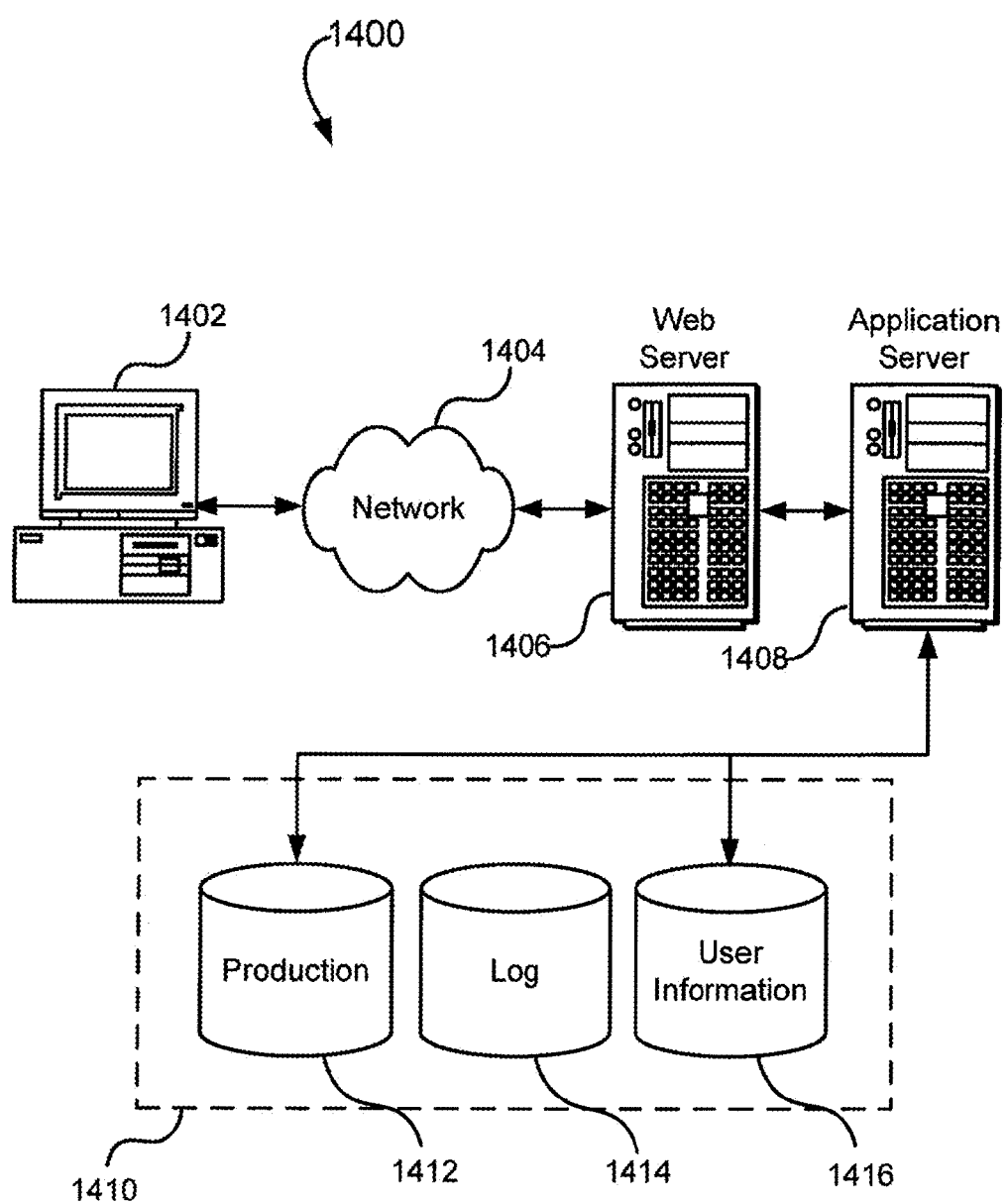
FIG. 14 is a diagram illustrating an example environment in which various embodiments may be implemented.

FIG. 14 illustrates an example of an environment 1400 for implementing aspects in accordance with various embodiments. As will be appreciated, although a Web-based environment is used for purposes of explanation, different environments may be used to implement various embodiments. The environment 1400 includes an electronic client device 1402, which can include any appropriate device operable to send and receive requests, messages, or information over an appropriate network 1404 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Communication over the network can be enabled by wired or wireless connections, and combinations thereof. In this example, the network includes the Internet, and the environment includes a Web server 1406 for receiving requests and serving content in response thereto, although for other networks, an alternative device serving a similar purpose could be used.

The illustrative environment includes at least one application server 1408 and a data store 1410. It should be understood that there can be several application servers, layers, or other elements, processes, or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, including handling data access and business logic for an application. The application server provides access control services in cooperation with the data store, and is able to generate content such as text, graphics, audio, and/or video to be transferred to a viewer, which may be served to the viewer by the Web server in the form of HTML, XML, or another appropriate structured language in this example. It should be understood that the Web and application servers are not required and are merely example components.

The data store 1410 can include several separate data tables, databases, or other data storage mechanisms and media for storing data relating to a particular aspect. For example, the data store illustrated includes mechanisms for storing production data 1412 and user information 1416, which can be used to serve content for the production side. The data store also is shown to include a mechanism for storing log data 1414, which can be used for reporting, generating statistics, and other such purposes. It should be understood that there can be many other aspects that may need to be stored in the data store, such as for page image information and access right information, which can be stored in any of the above-listed mechanisms as appropriate or in additional mechanisms in the data store 1410. The data store 1410 is operable, through logic associated therewith, to receive instructions from the application server 1408 and obtain, update, or otherwise process data in response thereto. In one example, a viewer might submit a search request for a certain type of item. In this case, the data store might access the user information to verify the identity of the viewer, and can access the catalog detail information to obtain information about items of that type. The information then can be returned to the viewer, such as in a results listing on a Web page that the viewer is able to view via a browser on the user device 1402. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature.

Figure 13:
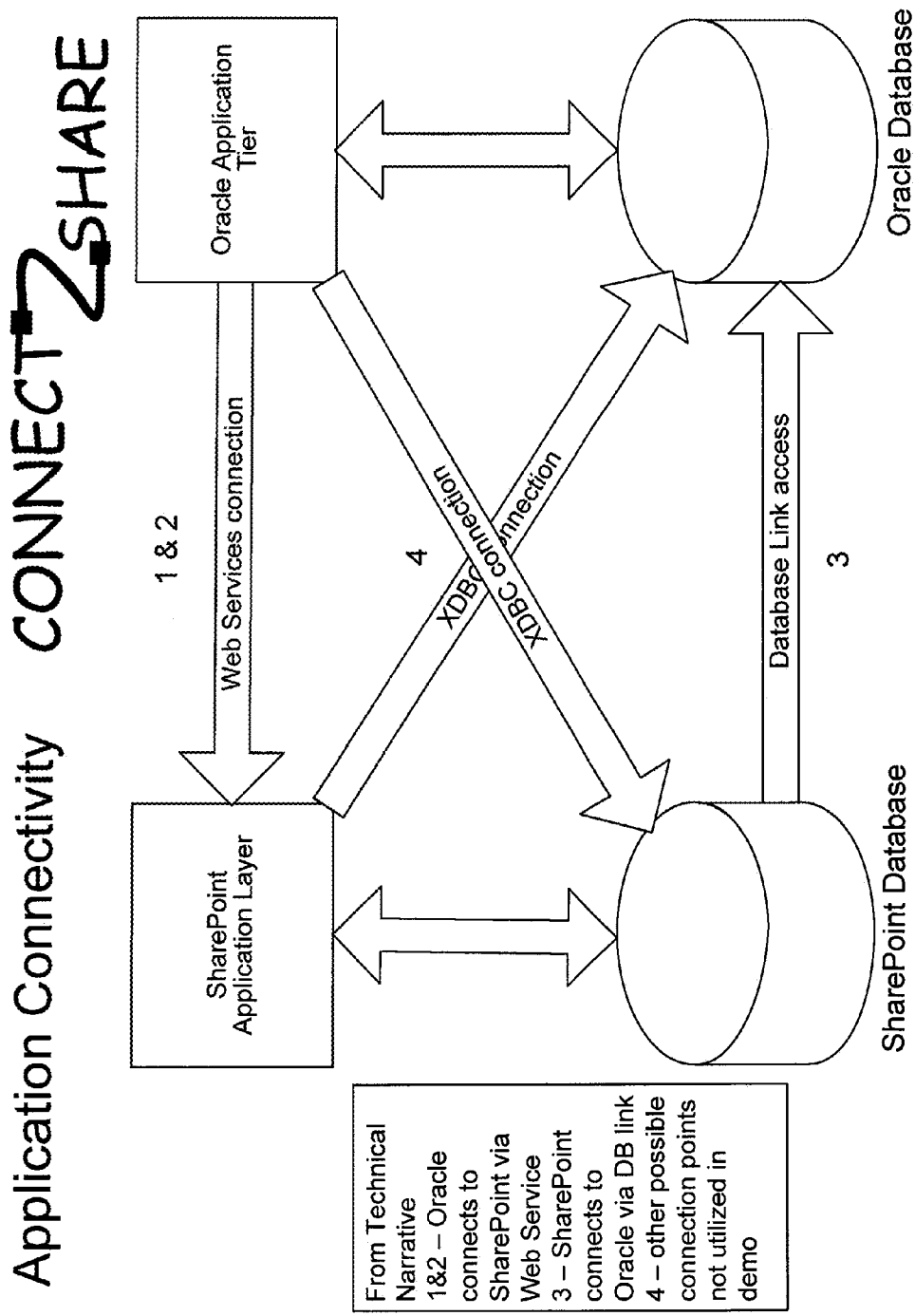
FIG. 13 is a diagram illustrating an example integration between two applications.
Figure 15:
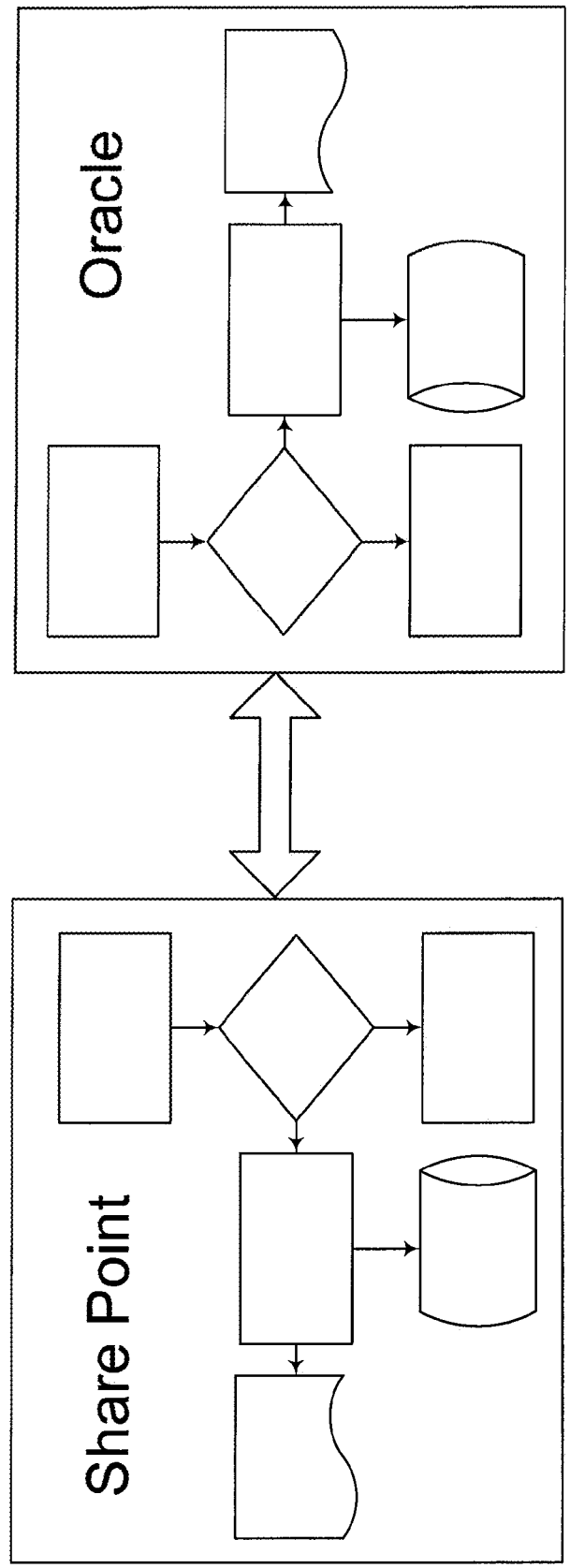
FIG. 15 is a diagram illustrating an example integration between two applications.

In some embodiments, the implementation of inter-application integration provides for Oracle and SharePoint integration that enables reading and writing operations between each application, as illustrated in FIG. 15. The integration allows connecting a large enterprise business application Oracle Business Suite with Microsoft SharePoint. The synergy of these two integrated applications provides for extension and enhancement of the business functionality of Oracle's Enterprise Applications. In one embodiment, the data may be pulled from an enterprise business database management system and used by a Web-based multi-purpose platform. FIG. 13 is a diagram illustrating interactions between two integrated applications. The narrative below provides a description of some of the interactions between the two systems from the SharePoint perspective as illustrated in FIG. 13.

Oracle queries SharePoint for Vendor # from Part #;

Oracle calls web service call through SOAP to query the SharePoint list where the part # to Vendor # data exists. The web service interface may, for example, be part of an API provided by SharePoint;

Oracle Adds a Task to a SharePoint list that initiates a re-approval work flow;

Oracle calls another web service call through SOAP to add data to a list, with the data that is added being a task item added to a task list. In this example, the task list is set up to automatically start an approval workflow process when a new task item is added to that list;

SharePoint connects to Oracle and calls a stored procedure to kick off an Oracle workflow. On approval, the approval workflow process starts the code that connects to the Oracle database and starts a stored procedure that resides in Oracle.

Additional details regarding example use cases and corresponding inter-application integration and inter-workflow integration are included in U.S. Provisional Patent Application No. 61/681,500, filed Aug. 9, 2012 and entitled "Application Integration Techniques," which is hereby incorporated by reference in its entirety.

It will be appreciated that the details of the various examples described above are provided for the purpose of illustration, and that the described inventive techniques are not limited to such details.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. It will similarly be appreciated that the data structures discussed above may be structured in different manners, including for databases or user interface screens/pages or other types of data structures, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited therein. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A system, comprising:
   one or more processors of one or more computer systems;
   an inter-connector program, wherein the inter-connector program is configured to, when executed by at least one of the one or more processors, enable interactions between a first application program of a first type and a second application program of a second type by:
      receiving information from a first defined workflow being performed using a workflow engine executing in the first application program, the received information related to a request for indicated response information from the second application program; and
      in response to the received information, determining that the request for the indicated response information is authorized, the determining being based on at least one factor from a group including the indicated response information, the first defined workflow, a user that initiated performance of the first defined workflow, and a location of the first application program; and
   the second application program, wherein the second application program is configured to, when executed by at least one of the one or more processors, provide the indicated response information by:
      in response to the determining by the inter-connector program that the request for the indicated response information is authorized, initiating performing a second defined workflow using a workflow engine executing in the second application program, the performing of the second defined workflow including obtaining the indicated response information; and
      sending a response for the first application program that includes the obtained indicated response information, to enable the first defined workflow to perform additional defined steps based at least in part on the obtained indicated response information.

2. The system of claim 1 wherein the receiving of the information from the first defined workflow includes receiving one or more electronic communications sent over one or more networks from a computing system on which the first application program is executing to at least one of the one or more computer systems having the at least one processor on which the inter-connector program is executing, and wherein the sending of the response for the first application program includes sending one or more response electronic communications over the one or more networks to the computing system on which the first application program is executing.

3. The system of claim 1 wherein the performing of the second defined workflow further includes using messaging capabilities of the second application program to interact with one or more users of the second application program.

4. The system of claim 1 further comprising the first application program, wherein the first application program is configured to, when executed by at least one of the one or more processors:
   perform a first defined workflow using a workflow engine of the first application program, the performing of the first defined workflow including automatically performing one or more defined steps that are a subset of a plurality of defined steps of the first defined workflow and initiating the request for the indicated response information from the second application program; and
   in response to the sent response that includes the obtained indicated response information, perform additional defined steps of the plurality of defined steps to complete the performing of the first defined workflow, the performing of the additional defined steps being based at least in part on the obtained indicated response information included in the sent response and including providing output available to one or more users of the first application program.

5. The system of claim 1 wherein the determining that the request for the indicated response information is authorized is based at least in part on the indicated response information and includes determining that one or more access criteria associated with the indicated response information are satisfied.

6. The system of claim 1 wherein the determining that the request for the indicated response information is authorized is based at least in part on the first defined workflow and includes determining that the first defined workflow is authorized to obtain the indicated response information.

7. The system of claim 1 wherein the determining that the request for the indicated response information is authorized is based at least in part on the user that initiated performance of the first defined workflow and includes determining that the user is authorized to obtain the indicated response information.

8. The system of claim 1 wherein the determining that the request for the indicated response information is authorized is based at least in part on the location of the first application program and includes determining that the location of the first application program satisfies one or more access criteria associated with the indicated response information.

9. The system of claim 1 wherein the inter-connector program and the second application program each includes software instructions for execution by at least one of the one or more processors.

10. The system of claim 1 wherein the inter-connector program consists of one or more means for performing the enabling of the interactions between the first application program of the first type and the second application program of the second type, and wherein the second application program consists of one or more means for performing the providing of the indicated response information.

11. A computer-implemented method comprising:
receiving, by one or more computer systems, information from a first defined workflow being performed using a workflow engine executing in a first application program, wherein the received information is related to a request for indicated response information from a second application program, and wherein the one or more computer systems are executing the second application program and an inter-connector program to manage interactions between the first and second application programs;
in response to the received information, determining that the request for the indicated response information is authorized, wherein the determining is performed by the one or more computer systems and is based on at least one factor from a group including the indicated response information, the first defined workflow, a user that initiated performance of the first defined workflow, and a location of the first application program;
in response to the determining that the request for the indicated response information is authorized, performing, by the one or more computer systems, at least a portion of a second defined workflow using a workflow engine executing in the second application program and obtaining the indicated response information; and
sending, by the one or more computer systems, a response for the first application program that includes the obtained indicated response information, to cause the first defined workflow to perform additional defined steps based at least in part on the obtained indicated response information.

12. The computer-implemented method of claim 11 wherein the receiving of the information from the first defined workflow includes receiving one or more electronic communications that are sent over one or more networks from a separate computing system on which the first application program is executing to at least one of the one or more computer systems, and wherein the sending of the response for the first application program includes sending one or more response electronic communications over the one or more networks to the separate computing system on which the first application program is executing.

13. The computer-implemented method of claim 11 wherein the performing of the second defined workflow further includes using messaging capabilities of the second application program to interact with one or more users of the second application program.

14. The computer-implemented method of claim 11 further comprising:
performing, by at least one computing system executing the first application, the first defined workflow using the workflow engine of the first application program, including automatically performing one or more defined steps that are a subset of a plurality of defined steps of the first defined workflow and initiating the request for the indicated response information from the second application program; and
in response to the sent response that includes the obtained indicated response information, performing, by the at least one computing system, additional defined steps of the plurality of defined steps to complete the performing of the first defined workflow, the performing of the additional defined steps being based at least in part on the obtained indicated response information included in the sent response and including providing output available to one or more users of the first application program.

15. The computer-implemented method of claim 11 wherein the determining that the request for the indicated response information is authorized is based at least in part on the indicated response information and includes determining that one or more access criteria associated with the indicated response information are satisfied.

16. The computer-implemented method of claim 11 wherein the determining that the request for the indicated response information is authorized is based at least in part on the first defined workflow and includes determining that the first defined workflow is authorized to obtain the indicated response information.

17. The computer-implemented method of claim 11 wherein the determining that the request for the indicated response information is authorized is based at least in part on the user that initiated performance of the first defined workflow and includes determining that the user is authorized to obtain the indicated response information.

18. The computer-implemented method of claim 11 wherein the determining that the request for the indicated response information is authorized is based at least in part on the location of the first application program and includes determining that the location of the first application program satisfies one or more access criteria associated with the indicated response information.

19. A non-transitory computer-readable medium having stored contents that cause one or more computer systems to perform a method, the method comprising:
receiving, by the one or more computer systems, information from a first defined workflow being performed using a workflow engine executing in a first application program, wherein the received information is related to a request for indicated response information from a second application program, and wherein the one or more computer systems are executing an inter-connector program to manage interactions between the first and second application programs;
in response to the received information, determining that the request for the indicated response information is authorized, wherein the determining is performed by the one or more computer systems and is based on multiple factors from a group including the indicated response information, the first defined workflow, a user that initiated performance of the first defined workflow, and a location of the first application program;
in response to the determining that the request for the indicated response information is authorized, initiating, by the one or more computer systems, performing at least a portion of a second defined workflow using a workflow engine executing in the second application program, including obtaining the indicated response information; and
sending, by the one or more computer systems, a response for the first application program that includes the obtained indicated response information, to cause the first defined workflow to perform additional defined steps based at least in part on the obtained indicated response information.

20. The non-transitory computer-readable medium of claim 19 wherein the receiving of the information from the first defined workflow includes receiving one or more electronic communications that are sent from a computing system on which the first application program is executing to at least one of the one or more computer systems, wherein the sending of the response for the first application program includes sending one or more response electronic communications to the computing system on which the first application program is executing, and wherein the stored contents include software instructions that, when executed by the one or more computer systems, cause the one or more computer systems to perform the method.

* * * * *